United States Patent
Yamakawa

(10) Patent No.: US 7,085,013 B2
(45) Date of Patent: *Aug. 1, 2006

(54) IMAGE PROCESSING APPARATUS INCLUDING LOW-LINEAR-DENSITY DOT REGION DETECTION UNIT, AND IMAGE FORMING APPARATUS INCLUDING THE SAME

(75) Inventor: Shinji Yamakawa, Kanagawa (JP)

(73) Assignee: Ricoh Company, Ltd. (JP)

( * ) Notice: Subject to any disclaimer, the term of this patent is extended or adjusted under 35 U.S.C. 154(b) by 345 days.

This patent is subject to a terminal disclaimer.

(21) Appl. No.: 10/662,415

(22) Filed: Sep. 16, 2003

(65) Prior Publication Data

US 2004/0061882 A1 Apr. 1, 2004

Related U.S. Application Data

(63) Continuation of application No. 10/152,841, filed on May 23, 2002, now Pat. No. 6,655,861.

(30) Foreign Application Priority Data

May 25, 2001 (JP) ............................. 2001-157506
May 13, 2002 (JP) ............................. 2002-137710

(51) Int. Cl.
 *H04N 1/40* (2006.01)
 *H04N 1/409* (2006.01)
 *G06T 5/00* (2006.01)
 *G06T 5/30* (2006.01)

(52) U.S. Cl. ............... 358/2.1; 358/3.24; 358/3.27; 382/173; 382/264; 382/257

(58) Field of Classification Search .............. 358/3.26, 358/3.27, 1.9, 2.1, 3.21, 3.1, 462, 3.24; 382/260, 382/261, 257, 264, 173, 176, 199, 205
See application file for complete search history.

(56) References Cited

U.S. PATENT DOCUMENTS

| 5,206,718 | A |   | 4/1993  | Yamakawa         |         |
|-----------|---|---|---------|------------------|---------|
| 5,359,433 | A |   | 10/1994 | Nagase et al.    |         |
| 5,381,241 | A | * | 1/1995  | Kawanaka et al.  | 358/462 |
| 5,666,443 | A |   | 9/1997  | Kumashiro        |         |
| 5,801,844 | A |   | 9/1998  | Yamakawa et al.  |         |

(Continued)

FOREIGN PATENT DOCUMENTS

EP 0 454 495 A1 10/1991

(Continued)

*Primary Examiner*—Scott A. Rogers
(74) *Attorney, Agent, or Firm*—Dickstein Shapiro Morin & Oshinsky LLP

(57) ABSTRACT

An image processing apparatus includes a maximum/minimum density detecting unit which detects a center pixel of a matrix of N×N pixels in image data that has a maximum or minimum density. A determination unit determines whether the absolute value of a difference between an average of densities of diagonal pixels of the matrix and a density of the center pixel is larger than a threshold value. A peak pixel detecting unit detects peak pixels of the matrix, each peak pixel being the center pixel having a maximum or minimum density, and the absolute value of the difference with respect to the center pixel being larger than the threshold value. A dot region detecting unit detects one of neighboring pixels of the matrix as being a dot region based on the number of the peak pixels in a target region and the number of the peak pixels in each of neighboring regions.

8 Claims, 28 Drawing Sheets

U.S. PATENT DOCUMENTS

| | | |
|---|---|---|
| 5,809,366 A | 9/1998 | Yamakawa et al. |
| 5,982,940 A | 11/1999 | Sawada |
| 6,014,462 A | 1/2000 | Yamakawa |
| 6,268,935 B1* | 7/2001 | Kingetsu et al. ............ 358/2.1 |
| 6,529,629 B1* | 3/2003 | Li et al. ...................... 382/176 |
| 6,631,210 B1* | 10/2003 | Mutoh et al. ............... 382/176 |
| 6,674,906 B1* | 1/2004 | Han et al. ................... 382/199 |
| 6,798,906 B1* | 9/2004 | Kato ........................... 382/176 |
| 2002/0051209 A1* | 5/2002 | Yamada ...................... 358/2.1 |
| 2003/0048476 A1* | 3/2003 | Yamakawa .................. 358/1.9 |

FOREIGN PATENT DOCUMENTS

| | | |
|---|---|---|
| EP | 1262913 A1 * | 12/2002 |
| JP | 2115988 | 4/1990 |
| JP | 2778669 | 4/1990 |
| JP | 58-153456 | 12/1993 |
| JP | 8-149289 | 6/1996 |
| JP | 8-149291 | 6/1996 |
| JP | 8-149294 | 6/1996 |
| JP | 8-204968 | 8/1996 |
| JP | 9-51432 | 2/1997 |

* cited by examiner

600-DPI LINE PATTERN WHEN READ
AT RESOLUTION OF 600 DPI

400-DPI LINE PATTERN WHEN READ
AT RESOLUTION OF 600 DPI

FIG.9
BPa  BPb  BPc  BPd
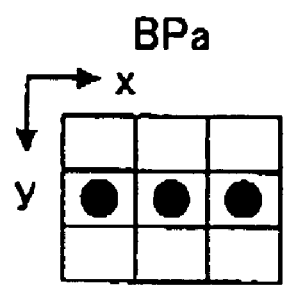 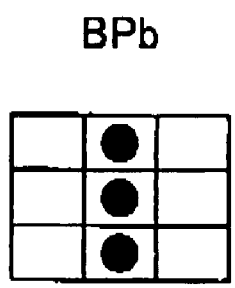 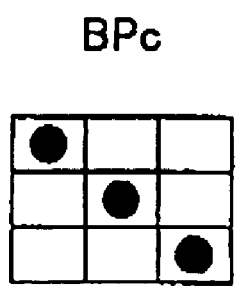 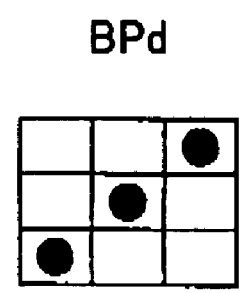
WPa  WPb  WPc  WPd
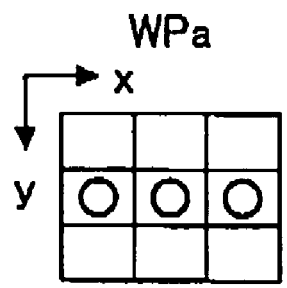 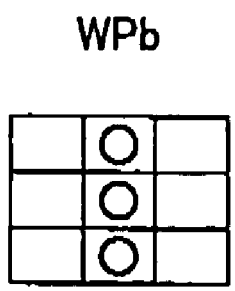 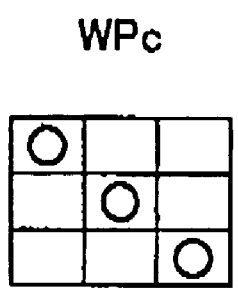 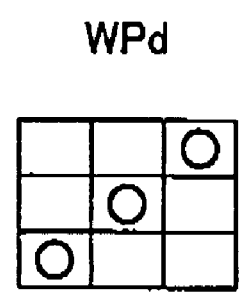

FIG.10
WBP
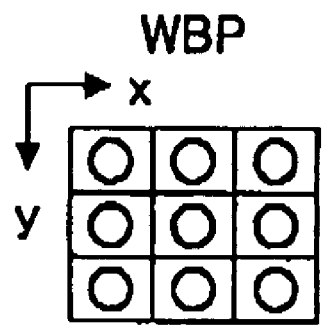
RDPa
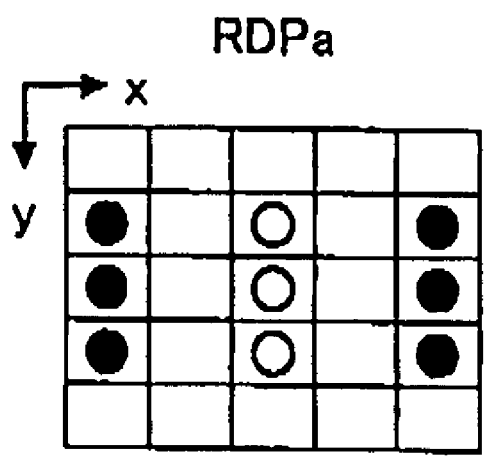
RDPb
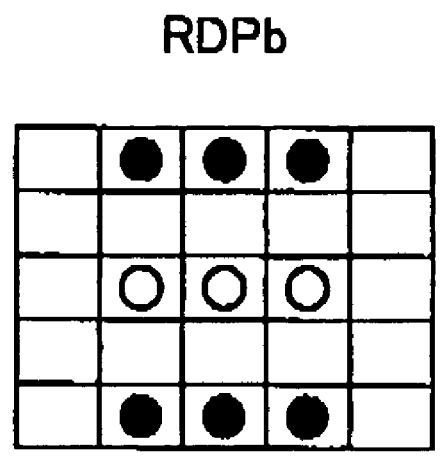
BBP
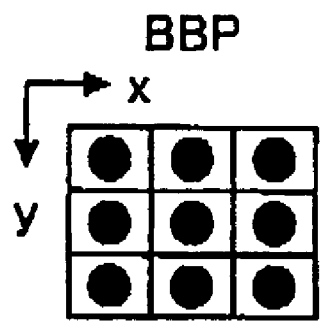

FIG.11

HIGH DENSITY (BLACK)

LOW DENSITY (WHITE)

HIGH DENSITY (BLACK)

LOW DENSITY (WHITE)

A

FIG.16
pm1
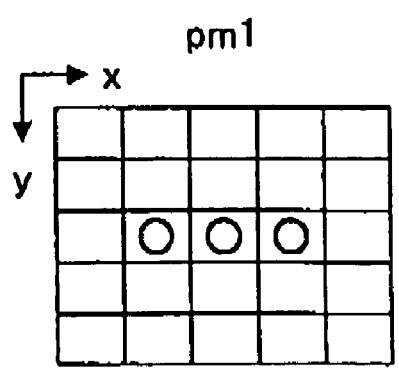
pm2
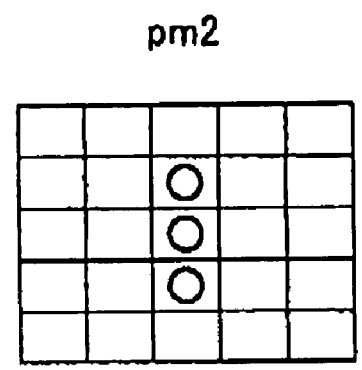
pm3
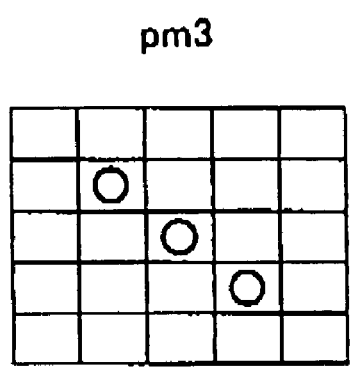
pm4
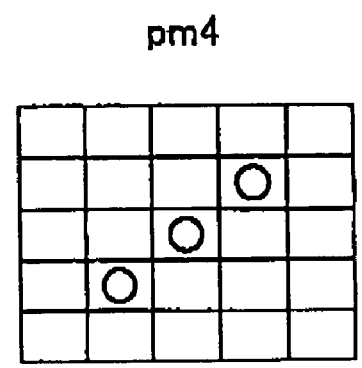

FIG.22
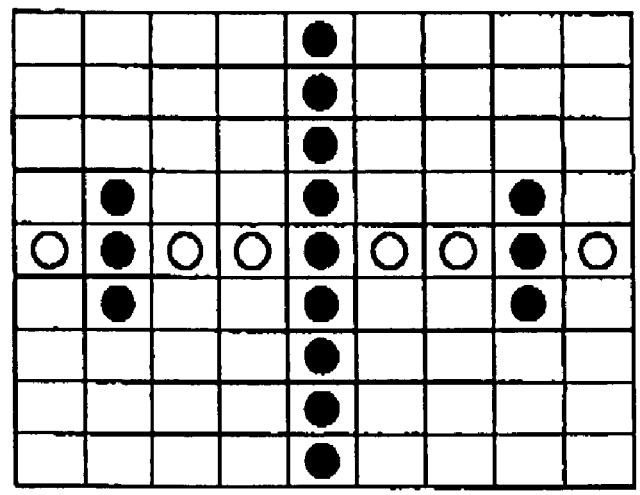
(a)
200 LINE
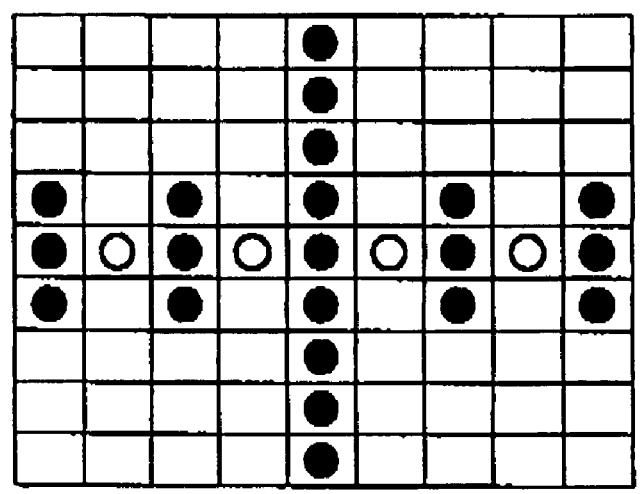
(b)
300 LINE

| a1 | a2 | a3 | a4 | a5 | a6 | a7 |
|----|----|----|----|----|----|----|
| b1 | b2 | b3 | b4 | b5 | b6 | b7 |
| c1 | c2 | c3 | c4 | c5 | c6 | c7 |
| d1 | d2 | d3 | d4 | d5 | d6 | d7 |
| e1 | e2 | e3 | e4 | e5 | e6 | e7 |
| f1 | f2 | f3 | f4 | f5 | f6 | f7 |
| g1 | g2 | g3 | g4 | g5 | g6 | g7 |

IMAGE PROCESSING APPARATUS INCLUDING LOW-LINEAR-DENSITY DOT REGION DETECTION UNIT, AND IMAGE FORMING APPARATUS INCLUDING THE SAME

This application is a continuation of U.S. patent application Ser. No. 10/152,841, filed May 23, 2002, and issued as U.S. Pat. No. 6,655,861 on Dec. 2, 2003, the entirety of which is incorporated herein by reference.

BACKGROUND OF THE INVENTION

1. Field of the Invention

The present invention relates to an image processing apparatus which detects a character, in particular, large dots, in image data and performs a suitable image processing for the detected image, an image reading apparatus equipped with the image processing apparatus, an image forming apparatus equipped with the image processing apparatus, and a color copier equipped with the image processing apparatus.

2. Description of the Related Art

For example, Japanese Patent No. 2778669 discloses an image processing method that uses the technology of the type as mentioned above. In this image processing method, when detecting a dot in image data, the computation of a peak pixel is performed for the pixels of the image data which are located at predetermined positions.

Moreover, Japanese Laid-Open Patent Application No. 8-149294 discloses an image processing method that is known and is of the above type. In this image processing method, the computation of a peak pixel is performed for the pixels of the image data which are located at predetermined positions by using a plurality of matrices. Japanese Laid-Open Patent Applications No. 8-149289, No. 8-204968 and No. 8-149291 disclose image processing methods that are also known and of the above type. In these image processing methods, the determination of a dot in image data is performed by detecting the periodicity. Furthermore, Japanese Laid-Open Patent Application No. 9-51432 discloses an image processing method which is known and is of the above type. In this image processing method, the determination of a dot is made when a predetermined periodicity difference is small.

However, in each of the above-mentioned conventional methods, when detecting a low-linear-density dot (100 or less lines), the difference between the low-linear-density dot and a small character in the image data becomes very small. It is difficult that each of the conventional methods performs the segmentation of a small character and a dot. Each of the conventional methods does not take into consideration for the segmentation of a small character and a dot in image data when detecting a low-linear-density dot.

SUMMARY OF THE INVENTION

An object of the present invention is to provide an improved image processing apparatus in which the above-described problems are eliminated.

Another object of the present invention is to provide an image processing apparatus that can easily and correctly perform the segmentation of a small character and a dot even when the linear density is low.

Another object of the present invention is to provide an image processing apparatus that segments image data into a low-linear-density dot region and a normal dot region and performs selectively one of a first image processing for the low-linear-density dot region and a second image processing for the normal dot region, so that it can create good picture quality.

Another object of the present invention is to provide an image forming apparatus that outputs the processed image with good picture quality by using an image processing apparatus that easily and correctly performs the segmentation of a small character and a dot.

The above-mentioned objects of the present invention are achieved by an image processing apparatus that processes image data and outputs the processed image data, the image processing apparatus comprising: a maximum/minimum density detecting unit detecting whether a center pixel of a matrix of N×N pixels in the image data has a maximum or minimum density among the pixels of the matrix; a center pixel selecting unit selecting one of neighboring pixels of the matrix adjacent to the center pixel as being an active center pixel; a diagonal pixel selecting unit selecting one of pairs of diagonal pixels of the matrix at positions symmetrical with respect to the center pixel as being active diagonal pixels; a determination unit determining whether the absolute value of a difference between an average of densities of all the pairs of diagonal pixels selected by the diagonal pixel selecting unit and a density of the center pixel selected by the center pixel selecting unit is larger than a predetermined threshold value; a peak pixel detecting unit detecting peak pixels of the matrix, each peak pixel being the center pixel detected as having the maximum or minimum density by the maximum/minimum density detecting unit, and the absolute value of the difference with respect to the center pixel determined as being larger than the threshold value by the determination unit; and a dot region detecting unit detecting one of the neighboring pixels including the peak pixels as being a dot region based on a relationship between the number of the peak pixels in a two-dimensional target region and the number of the peak pixels in each of two-dimensional neighboring regions of the target region.

The above-mentioned objects of the present invention are achieved by an image processing apparatus that includes a low-linear-density dot region detection device and an image processing device, the image processing device processing image data and outputting the processed image data, the low-linear-density dot region detection device comprising: a maximum/minimum density detection unit detecting whether a center pixel of a matrix of N×N pixels in the image data has a maximum or minimum density among the pixels of the matrix; a determination unit determining whether the absolute value of a difference between an average of respective densities of all pairs of diagonal pixels of the matrix at positions symmetrical with respect to the center pixel and a density of the center pixel is larger than a predetermined threshold value; a peak pixel detection unit detecting peak pixels of the matrix, each peak pixel being the center pixel detected as having the maximum or minimum density, and the absolute value of the difference with respect to the center pixel determined as being larger than the threshold value; a peak pixel erasing unit making the detected peak pixels inactive when a periodicity between the detected peak pixels is below a fixed value; and a low-linear-density dot region detecting unit detecting one of neighboring pixels of the matrix, including a target center pixel, as being a low-linear-density dot region based on a relationship between the number of the peak pixels in a two-dimensional target region and the number of the peak pixels in each of two-dimensional neighboring regions of the target region, wherein the image processing device performs selectively one of a first image processing for pixels of the low-linear-density dot region detected by the low-linear-density dot region detection device and a second image processing for pixels of another dot region of the image data.

The above-mentioned objects of the present invention are achieved by a color copier that includes an image processing apparatus, an image reading device and an image printing device, the image reading device reading an image data from a document by color separation and supplying the image data to the image processing apparatus, and the image printing device forming a reconstructed image based on a processed image data output by the image processing apparatus and printing the reconstructed image, the image processing apparatus comprising: a maximum/minimum density detecting unit detecting a center pixel of a matrix of N×N pixels in the image data that has a maximum or minimum density among the pixels of the matrix; a center pixel selecting unit selecting one of neighboring pixels of the matrix adjacent to the center pixel as being an active center pixel; a diagonal pixel selecting unit selecting one of pairs of diagonal pixels of the matrix at positions symmetrical with respect to the center pixel as being active diagonal pixels; a determination unit determining whether the absolute value of a difference between an average of densities of all the pairs of diagonal pixels selected by the diagonal pixel selecting unit and a density of the center pixel selected by the center pixel selecting unit is larger than a predetermined threshold value; a peak pixel detecting unit detecting peak pixels of the matrix, each peak pixel being the center pixel detected as having the maximum or minimum density by the maximum/minimum density detecting unit, and the absolute value of the difference with respect to the center pixel is determined as being larger than the threshold value by the determination unit; and a dot region detecting unit detecting one of the neighboring pixels including the peak pixels as being a dot region based on a relationship between the number of the peak pixels in a two-dimensional target region and the number of the peak pixels in each of two-dimensional neighboring regions of the target region.

According to the image processing apparatus of the present invention, the computation of peak pixels is performed not from the data of pixels at predetermined positions of the matrix but from the data of pixels chosen from the pixels at the positions symmetrical about the center pixel. The segmentation of a small character and a dot will become easy to perform. It is possible for the present invention to prevent the incorrect determination of a small character as being a dot. It is possible for the present invention to easily detect a low-linear-density dot region with good accuracy.

Moreover, according to the image processing apparatus of the present invention, the segmentation of a dot region and a low-linear-density dot region can be easily and correctly performed, and improvement in picture quality is attached by switching one of a first image processing and a second image processing to the other for each region based on the result of the segmentation.

Furthermore, according to the image forming apparatus of the present invention, the segmentation of a small character and a dot in the image data can be performed by using the image processing apparatus that easily and correctly segments image data into a small character and a dot, and the image forming apparatus can output the processed image with good picture quality.

BRIEF DESCRIPTION OF THE DRAWINGS

Other objects, features and advantages of the present invention will be apparent from the following detailed description when read in conjunction with the accompanying drawings.

FIG. 9 is a diagram for explaining a set of 3 by 3 pixel matrix patterns used for pattern matching which is performed by a black-pixel continuation detector and a white-pixel continuation detector in FIG. 4.

FIG. 10 is a diagram for explaining a set of pixel matrix patterns used for white background isolation which is performed by a white background detector.

FIG. 11 is a diagram for explaining a set of pixel matrix patterns used for white background detection.

FIG. 16 is a diagram for explaining a pattern matching performed by the color-pixel determination unit in FIG. 6.

FIG. 22 is a diagram for explaining a set of line patterns used for gray pixel detection.

FIG. 24 is a diagram for explaining a process performed by a third dot peak detector.

DETAILED DESCRIPTION OF PREFERRED EMBODIMENTS

A description will now be provided of preferred embodiments of the present invention with reference to the accompanying drawings.

1. First Preferred Embodiment 1.1 Digital Full Color Copier

Figure 1:
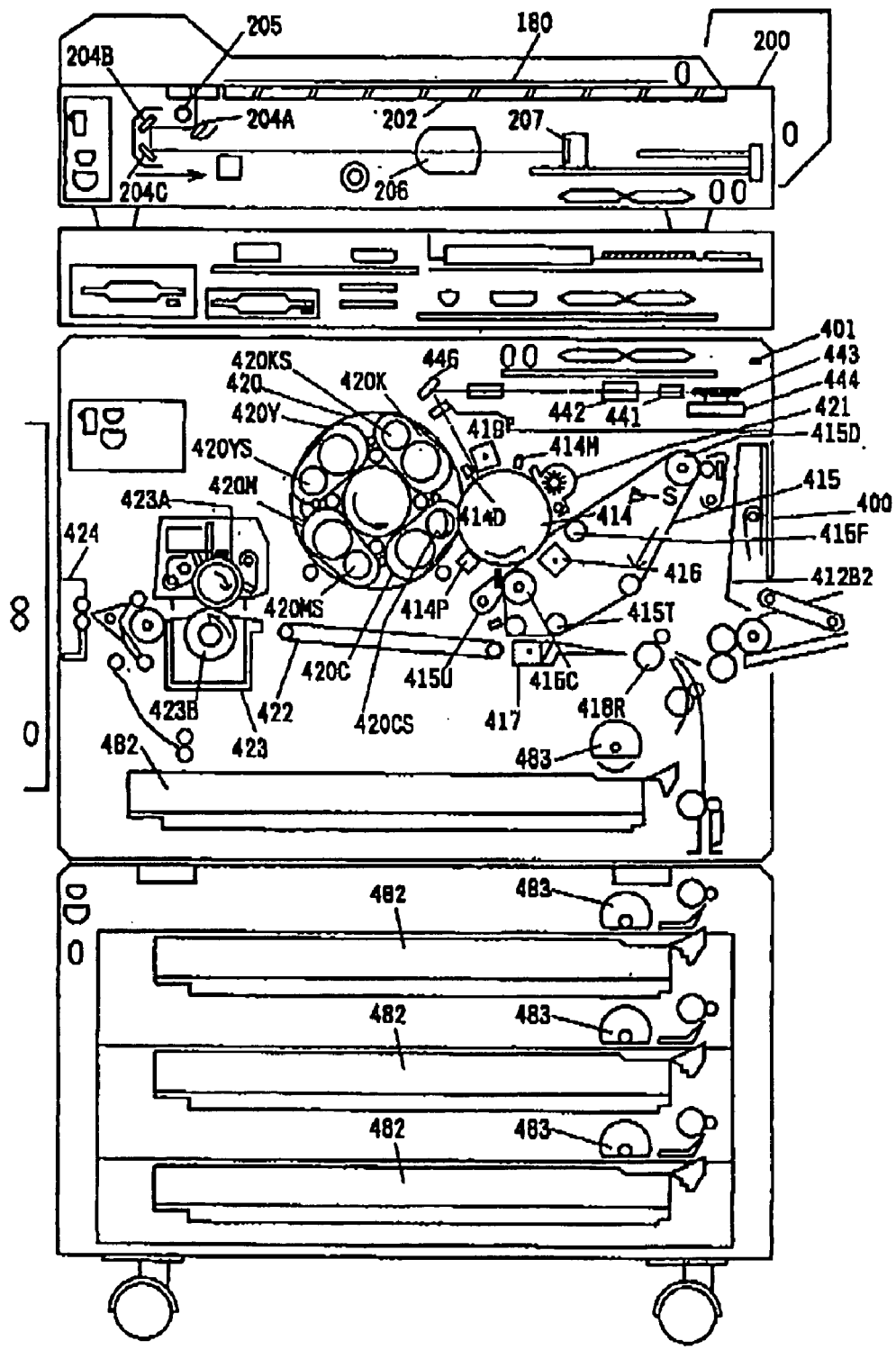
FIG. 1 is a cross-sectional view of a digital full-color copier in which a first preferred embodiment of the image processing apparatus of the present invention is provided.

FIG. 1 shows the configuration of a digital full-color copier in which the first preferred embodiment of the image processing apparatus of the present invention is provided.

The digital full-color copies concerning the present embodiment includes a color image reading apparatus (a color scanner) 200 and a color image printing apparatus (a color printer) 400.

As shown in FIG. 1, the scanner 200 reads an original image of the document 180 on the contact glass 202 by focusing the light reflected from the document, illuminated by the lamp 205, onto the color sensor 207 via the mirrors 204A, 204B, and 204C and the lens 206. The color sensor 207 produces green (G) and red (R) and blue (B) color-separated image signals by reading the original image for every color separation light. The color sensors 207 in the present example are constituted by a three-line CCD sensor that outputs the image signals of B, G and R. The three-line CCD sensor reads the image for every color selection light. The color separated image signals of B, G and R, which are obtained with the scanner 200, are supplied to the image processing unit (not shown). After the color conversion processing is performed, the image processing unit produces the color image data of black (Bk), cyan (C), magenta (M) and yellow (Y). The color image data is used by the color printer 400. The toner images of Bk, C, M and Y corresponding to the color image data are piled up and formed on the intermediate transfer belt, and it is transferred to a copy sheet. The scanner 200 receives a timing signal synchronized with operation and timing of the color printer 400 and controls the lighting and mirror optical system, including the lamp 205 and the mirrors 204A, 204B and 204 so as to scan the document in the direction of the left arrow. The scanning of the document is repeated at the scanner 200 for every color, and the image signals of B, G and R are obtained. And the color printer 400 visualizes the image one by one using the corresponding toner each time one of the color image data of Bk, C, M and Y is obtained. These toner images are piled up on the intermediate transfer belt, and the full-color image of the four colors is formed by the color printer 400.

The optical writing unit 401 is provided as an exposure unit in the color printer 400. The color image data from the scanner 200 are converted into the optical signals, and each optical signal corresponds to the document image of one color. The optical writing is performed and an electrostatic latent image is formed on the photoconductor drum 414. The optical writing unit 401 includes the laser light device 441 and a laser drive control unit (not shown) that controls the laser emission of the laser light device 441. The polygon mirror 443, the motor 444 to rotate the mirror 443, the f θ lens 442, and the reflective mirror 446 are also provided in the optical writing unit 401. The photoconductor drum 414 is rotated counterclockwise as indicated by the arrow in FIG. 1. Around the periphery of the photoconductor drum 414, the photoconductor cleaning unit 421, the charge removing lamp 414M, the charging unit 419, the potential sensor 414D to detect the potential of the latent image on the photoconductor drum, the selected developing device of the revolver developing device 420, the development density pattern detector 414P, and the intermediate transfer belt 415 are arranged.

The revolver developing device 420 includes the BK developing device 420K, the C developing device 420C, the M developing device 420M, the Y developing device 420Y, and the revolver rotation drive unit (not shown) that achieves the counterclockwise rotation of the revolver developing device 420 as indicated by the arrow. In order to visualize the electrostatic latent image, the surface of the photoconductor drum 414 is contacted by the sleeve of the developing agent. The developing sleeves 420KS, 420CS, 420MS and 420YS are provided in the developing devices 420K, 420C, 420M and 420Y, respectively. Each developing sleeve includes the developing paddle which is rotatable in order to finish the setting and agitate the developing agent. In the standby state, the revolver developing device 420 is set at the position where the BK developing device 420K performs the development. When the copying operation is started, the scanner 200 starts the reading of the BK image data from a predetermined timing. Based on this image data, the optical writing and the latent image formation by the laser light are started. In the following, the electrostatic latent image that is formed with, for example, the Bk image data is called the Bk latent image. The above processing is repeated for each of the image data of C, M and Y in the same manner. In order for the Bk developing device 420K to start the development on the photoconductor drum from the beginning of the Bk latent image, before the end of the latent image is reached, the rotation of the developing sleeve 420KS is started, and the Bk latent image is developed by the Bk toner. And the development operation for the Bk latent image regions is continued subsequently. After the end of the Bk latent image passes through the Bk latent image regions on the photoconductor drum, the operation of the Bk developing device 420 is promptly terminated. From the development position of the preceding color to the development position of the following color, the operation and rotation of the revolver developing device 420 is driven. The rotating operation is completed at least before the leading edge of the latent image based on the image data of the following color is reached.

When the formation cycle of the image is started, the photoconductor drum 414 is rotated in the counterclockwise direction indicated by the arrow, and the intermediate transfer belt 415 is rotated clockwise by the drive motor (not shown). With the rotating operation of the intermediate transfer belt 415, the formation of each of the BK toner image, the C toner image, the M toner image and the Y toner image is performed one by one in this order. These toner images are sequentially piled up on the intermediate transfer belt 415 in the order of BK, C, M, and Y.

The formation of the BK image is performed as follows. The charging unit 419 provides the corona electric discharge to the photoconductor drum 414 so that the surface thereof is uniformly charged at −700V to the negative polarity. Then, the laser diode 441 performs the raster exposure of the photoconductor drum 414 based on the Bk image signal. The uniformly charged surface of the photoconductor drum is exposed to the laser light when the raster exposure is performed. At the portion of the photoconductor drum that is exposed to the laser light, the electric charge proportional to the exposure light quantity is removed, and the electrostatic latent image is formed. The Bk toner in the revolver developing device 420 includes the ferrite carrier. The Bk toner is charged to the negative polarity by mixing it with the ferrite carrier, and the BK developing sleeve 420KS of the developing device is biased to the potential in which the a. c. potential and the negative d. c. potential are superimposed, against the metallic conductive layer (not shown) of the photoconductor drum 414 by using the power supply circuit (not shown). As a result of the bias voltage, the Bk toner does not adhere to the portion of the photoconductor drum 414 where the electric charge 414 remains. The Bk toner adheres only to the exposed portion of the photoconductor drum 414, and the Bk latent image is formed thereon. Namely, a visible Bk image is formed.

The intermediate transfer belt 415 is provided with the drive roller 415D, the counter roller 415T, the cleaning roller 415C and the driven roller 415F. The intermediate transfer belt 415 is rotated by the drive motor (not shown). The Bk toner image is transferred from the photoconductor drum 414 to the intermediate transfer belt 415 in contact with the photoconductor drum 414 with the uniform rotating speed of the belt 415. The surface of the intermediate transfer belt 415 is charged by the belt-transfer corona-discharge device 416 (which is also called the belt transfer part). In the following, the transfer of the image from the photoconductor drum 414 to the intermediate transfer belt 415 is called the belt transfer. In order for re-use of the photoconductor drum 414, the remaining toner on the surface of the photoconductor drum 414 is cleaned by the cleaning unit 421. The toner collected with the cleaning unit 421 is stored in the exhaust toner tank (not shown).

The belt cleaning device 415U includes an entrance seal, a rubber braid and a discharge coil. Also it includes the connecting/disconnecting mechanism of the entrance seal or the rubber braid. When the belt transfer of the images of the second, third and fourth colors is carried out after the end of the belt transfer of the Bk image of the first color, the entrance seal and the rubber braid are separated from the intermediate transfer belt side by the connecting/disconnecting mechanism.

The paper-transfer corona-discharge device (called the paper transfer device) 417 is provided to transfer the toner image on the intermediate transfer belt 415 to the copy sheet. By using the corona-discharge method, the paper transfer device 417 applies the AC+DC component or the DC component to the copy sheet and the intermediate transfer belt.

The copy sheets of various sizes are contained in the copy sheet cassettes 482 in the paper feeding block. From the cassette which contains the copy sheets of a specified size to the feeding roller 483, the copy sheet is conveyed one by one to the direction of the registration roller pair 418R. In addition, reference numeral 412B indicates the paper tray for a manual image forming operation of an OHP paper, pasteboard, etc. At the starting timing of the image formation the copy sheet is delivered from the paper tray one by one. The copy sheet is waiting at the nip portion of the registration roller pair 418R. And the paper transfer device 417 sends it The tip of the toner image on the intermediate transfer belt 415, and the transferring of the image is performed at this time. The operation of the registration roller pair 418R is started so that the color images are in agreement at the tip of each image, and the positioning of the copy sheet and the resulting image is performed. Thus, the color image on the intermediate transfer belt is transferred to the copy sheet each time the belt passes through the paper transfer device 417 with the top surface connected with the right potential. At this time, the copy sheet is charged by the right electric charge with the corona electric discharge current, and most toner pictures are transferred to the copy sheet. The operation continues, and when passing separation charge removing device with the charge removing brush which is arranged on the left-hand side of the paper transfer device 417, the charge of the copy sheet is removed at the separation from the intermediate transfer belt 415, and the copy sheet is moved to the paper conveyance belt 422. The copy sheet with the image transfer performed in the four-color toner images is conveyed from the intermediate transfer belt side to the paper conveyance belt 422 by the fixing assembly 423. The fixing of toner is carried out for the toner image at the unit of the fixing roller 423A and the pressurization roller 423B. The fixing temperature is controlled to a predetermined temperature.

The discharge roll pair 424 is provided to eject the copy sheet out of the color copier, and the copy sheet is sent to the copy tray (not shown) and it is stacked thereon.

In addition, the surface of the photoconductor drum 414 after the end of the belt transfer is cleaned by the brush roller and the rubber braid of the photoconductor cleaning unit 421. Moreover the charge removing thereof is carried out by the charge removing lamp 414M. After the transferring of the toner image to the copy sheet, the intermediate transfer belt 415 contacts the braid surface of the cleaning unit 415U. The belt surface is cleaned by the removing mechanism. In the case of the repeated copy operation, the scanning and the image formation on the photoconductor drum are repeated for each of the four color images of one copy sheet.

The digital full-color copier shown in FIG. 1 receives a print command and print data from a host, such as a personal computer, through the LAN or the parallel I/F. The digital copier can print out a color image by using the color printer 400 (the image output). Moreover, the digital copier can read image data from a document by using the scanner 200 and transmit the image data to a remote facsimile, and can receive image data from a remote facsimile. The digital copier is a multi-function image forming apparatus which can carry out the scanning, copying, facsimile and printing functions. The digital copier is connected to the public telephone network through the internal switchboard PBX in order to achieve the facsimile communications. The digital copier can also communicate with a management server of a service center via the public telephone network.

1.2 Electric System 1.2.1 The Outline of Electric System

Figure 2:
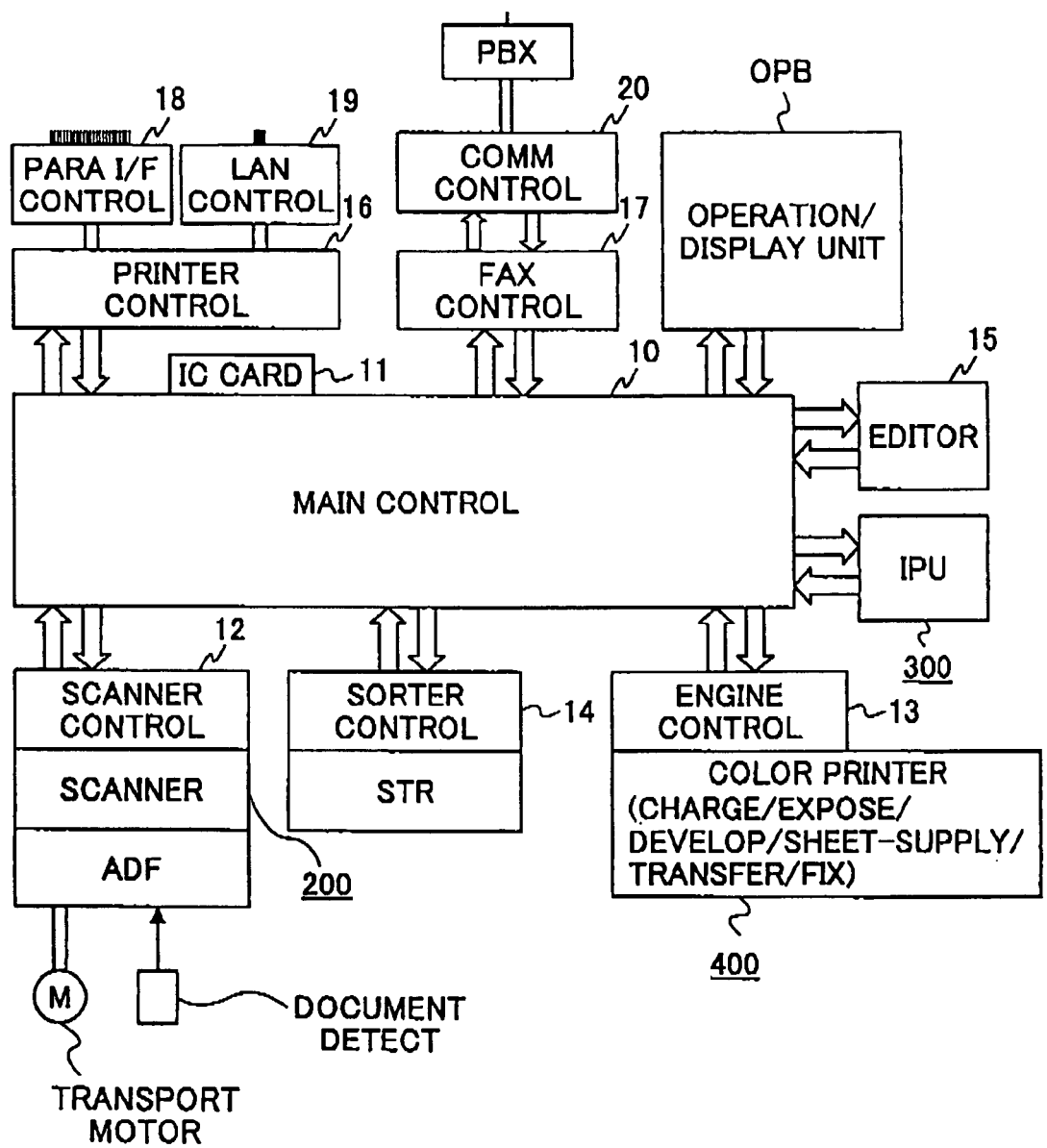
FIG. 2 is a block diagram of an electric control system of the digital full-color copier in FIG. 1.

FIG. 2 shows the outline of the electric control system of the digital full-color copier of FIG. 1 in which the main controller 10 is centered on the control system.

The main controller 10 controls the entire digital ful-color copier. The main controller 10 is connected to distributed control devices, which include an operation/display board OPB to provide on the display the operational message to the operator and the function from the operator which performs setting input control, an editor 15, a scanner 200 to receive a document image and write it to the image memory, and an optional ADF unit. The scanner controller 12 performs the imaging of the document image from the image memory. The printer controller 16, the image-processing unit (IPU) 300 and the color printer 400 are provided. In order to control the charging, the exposure, the developing, the feeding, the transferring, the fixing, and the copy sheet conveyance, the engine controller 13 which controls the imaging is connected as the distributed control device. Each distributed control device and the main controller 10 are exchanging the condition data of the device and the operational command if needed. Moreover, the main motor required for paper conveyance etc. and various clutches are also connected to the driver which is not illustrated in the main controller 10.

In addition, reference numeral 11 is an integrated circuit (IC) card, and reference numeral 14 is a sorter controller. The integrated circuit card 11 is used for management of the copy number of sheets for every department of a company, for example. In the color printer 400, the electric circuit which drives the mechanism, the control circuits and various sensors are provided including the paper feeding mechanism and the control circuits to control the charging of the photoconductor drum 414, the image exposure by the laser writing unit, the development, the transferring, the fixing and the sheet ejection. The printer controller 16 analyzes the printing image data and the print command from the outside, such as a personal computer, and expands the image data into a bit map in the state that can print as image data. The print controller 16 sends the printing image data through the main controller 10 to the printer 400 so that the image data is printed on the copy sheet. The printing image data and the print command are received at the printer controller 16 through the LAN control unit 19 and or the parallel I/F control unit 18. In order to carry out the reception and the print operation, the LAN control unit 19 and the parallel I/F control unit 18 are provided.

The facsimile controller 17 sends a control signal to the main controller 10 when the facsimile transmitting command is present. The scanner 200 and the IPU 300 are driven through the main controller 10. The facsimile image is read by the scanner 200, and the presence of the facsimile image to be transmitted is notified to the communication control 20 and the PBX. It is sent to the communication circuit. The calling of the facsimile is received from the communication circuit and it is notified. When the facsimile image is received, the printer 400 is driven through the main controller 10, and the image data is printed out.

Figure 3:
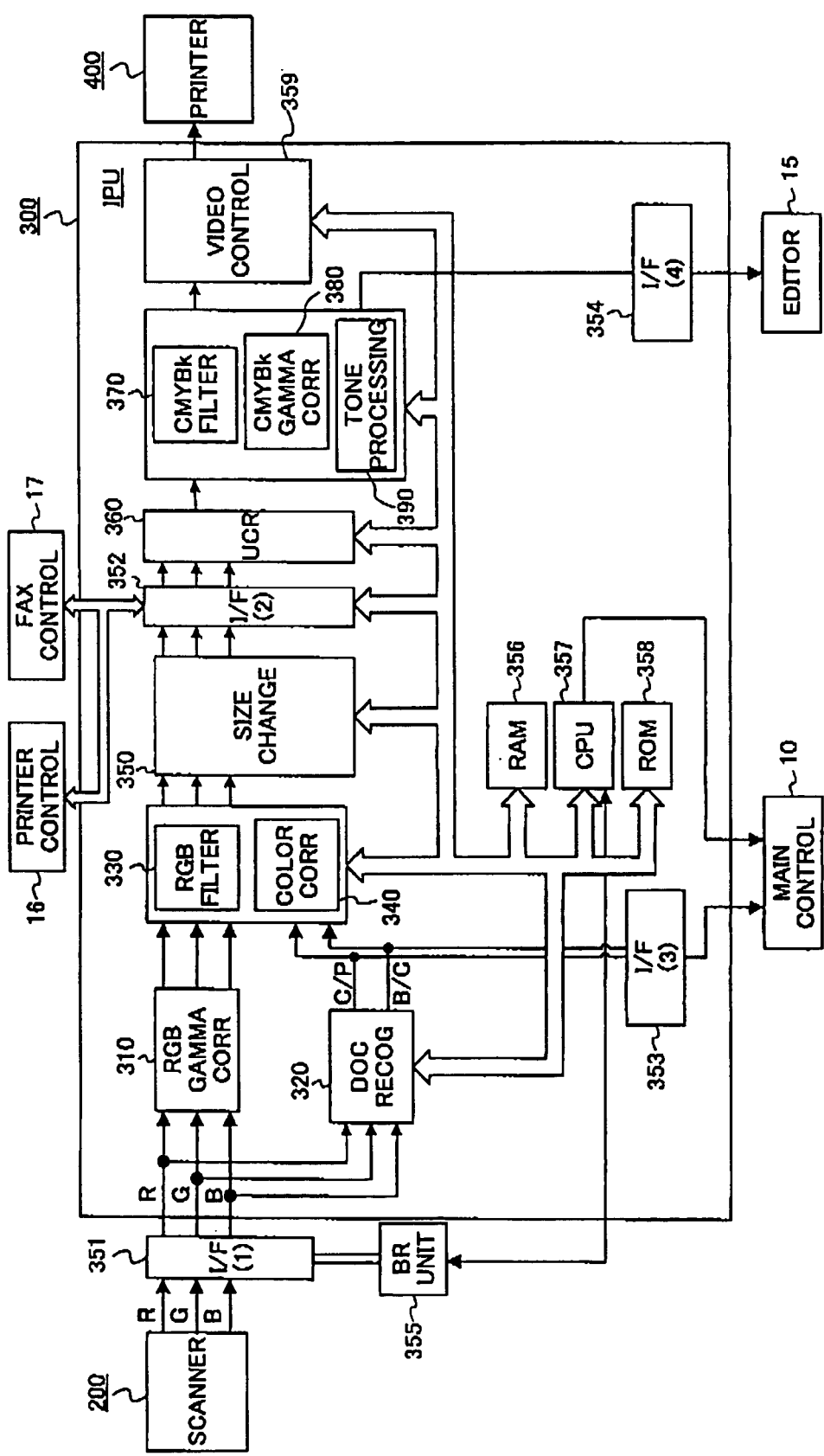
FIG. 3 is a block diagram of an image processing unit of the electric control system in FIG. 2.

The configuration of the image-processing unit (IPU) 300 is shown in FIG. 3. As shown in FIG. 3, the R, G and B image data which are output from the scanner 200 are supplied through the image data interface (1) 351 to the IPU 300. In addition, when the BR image data of B or R monochrome is recorded, the BR unit 355 is directed, and the selection and collection of the R, G, and B image data with the image record processing in this mode are performed. This description will be omitted.

The R, G, and B image data, which are given to the IPU 300, are supplied the RGB gamma compensation unit 310. The reflectance data (R, G, B) are converted to the density data (R, G, B) by the unit 310. The document recognition unit 320 performs the image region recognition of the image based on the density R and G and B data. The image region is a character region (region of a character or a line drawing), or a pattern region (a photograph and picture). It is determined whether the region of the target pixel is a character region or a pattern region, and the document recognition unit 320 outputs a C/P signal and a B/C signal, through the RGB filter unit 330 and the interface (3) 353, to the main controller 10.

In addition, the C/P signal and the B/C signal are defined as follows.

C/P signal: a 1-bit signal.
 "1" indicates a character edge region.
 "0" indicates a pattern region.

B/C signal: a 1-bit signal.
 H ("1") indicates a colorless image region.
 L ("0") indicates a color image region.

Figure 4:
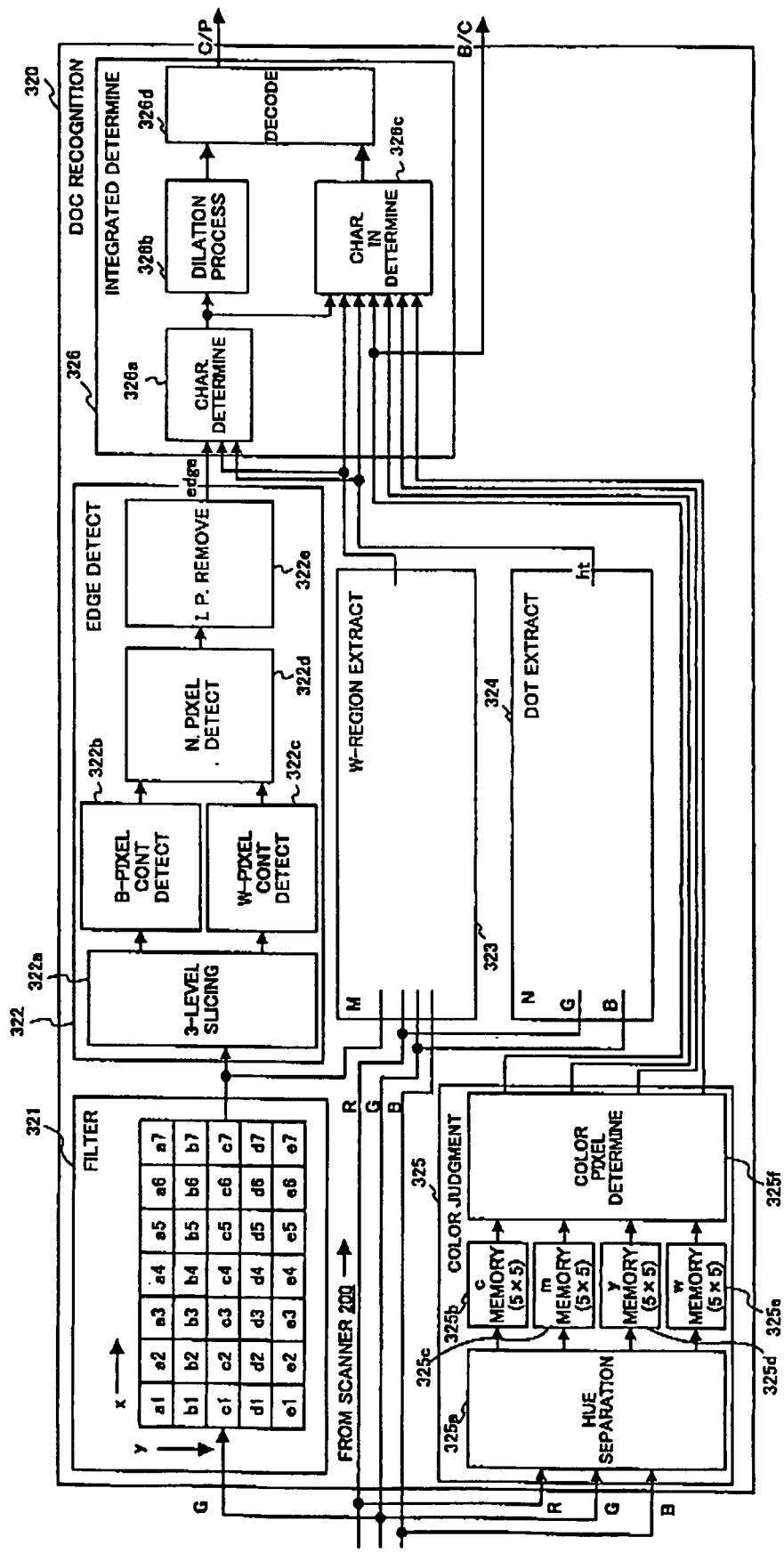
FIG. 4 is a block diagram of a document recognition unit of the image processing unit in FIG. 3.

1.2.2 Document Recognition Unit 320 (FIG. 4)

The function of the document recognition unit 320 is shown in FIG. 4. The document recognition unit 320 carries out the character edge detection, the pattern detection, and the color/non-color region detection, and generates the C/P signal, indicating the character edge region or the pattern region, and the B/C signal, indicating the color/non-color region.

The document recognition unit 320 generally includes the filter unit 321, the edge extraction unit 322, the white region extraction unit 323, the dot extraction unit 324, the color determining unit 325, and the integrated determination unit 326. In addition, the following description concerning the present embodiment is given by assuming that it is the case in which the reading resolution of the scanner 200 is 600 dpi.

1.2.3 Filter Unit 321

The filter unit 321 is mainly provided in order for the extraction of the edge of a character, and the filter unit 321 rectifies the G image data supplied by the scanner 200. The image data read by the scanner 200 is presented, and it may be fading by the performance of a lens etc., the edge emphasis filter is covered. However, the image which emphasizes the edge on the document is spread through a copying device widely. It is not necessary to emphasize the line pattern for the halftone representation. A line pattern is emphasized. If it keeps, a pattern (gradation expression region by the line pattern) will be extracted as the edge. The necessity of not emphasizing arises since erroneous determination to character edge may be carried out.

Figure 8A:
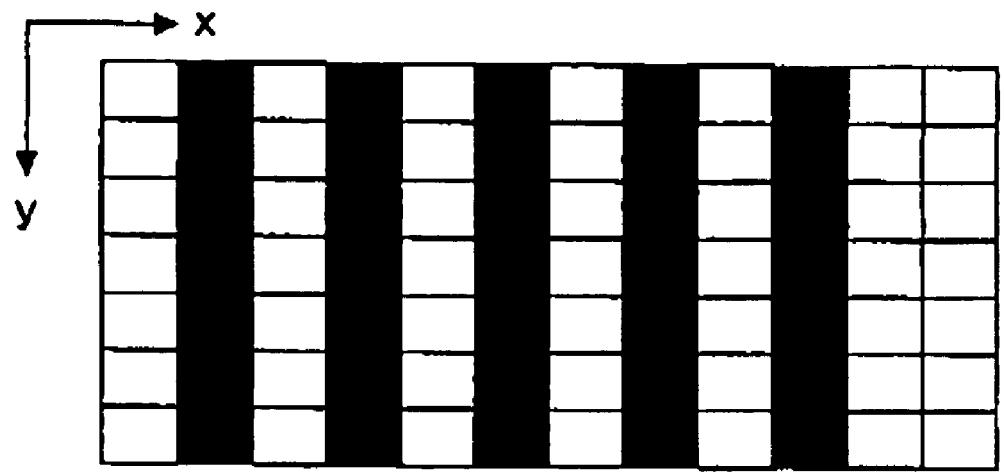
FIG. 8A and FIG. 8B are diagrams for explaining the difference between a 600-dpi line pattern and a 400-dpi line pattern.
Figure 8B:
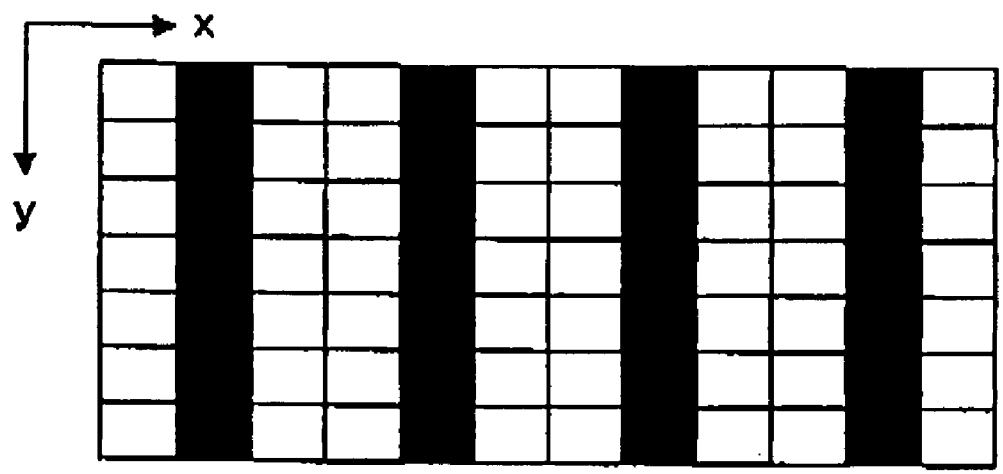

Moreover, as shown in FIG. 8A and FIG. 8B, the repetition periodicity of the line-pattern A of 600 dpi and the repetition periodicity of the line pattern B of 400 dpi differ, and it is difficult to make the image region emphasized by using the same filter coefficients. Therefore, the periodicity of a picture pattern is detected and the two kinds of filter coefficients of them are switched from one to the other by the result of the detection.

In addition, in FIG. 8A and FIG. 8B, the sum of the width of one white block and the width of one black block in the main scanning direction x is the line pattern pitch (width: constant pixels of a predetermined number), or periodicity, and at the time of a low-density halftone, the white block width spreads and the black block width becomes narrow. As the halftone density increases to a high density, the white block width becomes narrow the black block width spreads.

In the present embodiment, the matrix of N×N pixels which is processed by the filter unit 321 is comprised of seven pixels in the matrix scanning direction x five pixels in the sub-scanning direction y (the mechanical document scanning direction of the scanner 200).

FIG. 4 shows the configuration of the filter unit 321 in the present embodiment. In the filter unit 321, the filter coefficients a1–a7, b1–b7, c1–c7, d1–d7, and e1–e7 are provided for the respective pixels of the 5×7-pixel matrix. There are two sets of coefficient groups (coefficient matrix) A and B. The following coefficient group A of the coefficients for filter processing is provided to control and emphasize the pattern of the line-pattern A of 600 dpi of FIG. 8A as well as the edge of a character. It is to emphasize. The following coefficient group B of the coefficients for filter processing is provided to control and emphasize the pattern of the line-pattern B is 400 dpi of FIG. 8B as well as the edge of a character. The filtering result is expressed by the sum of the density of the target pixel and the results of the filtering calculation using the coefficients A or B. The image data is thus emphasized by the filter unit.

Coefficient Group A:

0 −1 0 −2 0 −1 0
   0 −1 0 −2 0 −1 0
   0 −1 −1 20 −1 −1 0
   0 −1 0 −2 0 −1 0
   0 −1 0 −2 0 −1 0.

Coefficient Group B:

−1 0 0 −2 0 0 −1
   −1 0 0 −2 0 0 −1
   −1 0 −1 20 −1 0 −1
   −1 0 0 −2 0 0 −1
   −1 0 0 −2 0 0 −1.

In addition, the transverse direction is the row of the main scanning direction x, and the direction of length is the row of the sub-scanning direction y. The coefficients of the 1st line is of the filter 321 on FIG. 4 in the group of the number groups A and B. It is the coefficients a1–a7 of the 1st line of the coefficient matrix, and is the coefficient group A. The center of the 3rd line of the coefficient group A or B, or "20" in the coefficient matrix is the coefficient c4 of the pixel of the center of c1–c7 of the block of the filter unit 321, that is the coefficient of the target pixel. The product which carried out the multiplication of the value which the image data of the pixel to each coefficient of the matrix total (the sum of products) of (total 7×5=35 pixels) is the target pixel (pixel to which c4 is addressed).

The coefficient group A is in the pitch of the line-pattern A of 600 dpi (FIG. 8A) in which the negative coefficients (of small values) are distributed and zero (coefficient of a large value) is among them. The coefficients are distributed and 20 (a very large coefficient) are directed in the target pixel because of edge emphasis. Thereby, the image data (target pixel) is the region of line-pattern A. The weighted average value which hits to it and is drawn when it is black/edge between whites (the sum of products) compared with the time of being the character edge which is not line-pattern A, it becomes a quite low value.

The coefficient group B is in the pitch of the line-pattern B of 400 dpi (FIG. 8B) in which the negative coefficients (coefficients of small values) are distributed and 0 (coefficient of a large value) is among them. The coefficients are distributed and 20 (a very large coefficient) is in the target pixel because of edge emphasis. Thereby, the image data (target pixel) is the region of line-pattern B. When it is the black/edge between whites of a region, the weighted average value (the sum of products) which hits to it and is drawn turns into a quite low value compared with the time of being the character edge which is not the line-pattern B.

In addition, when one of the following conditions 1 and 2 is met, the filter unit 321 performs the filter processing as follows. Namely, when the possibility of being the line-pattern of 400 dpi of FIG. 8B is high, the filter unit 321 performs the filter processing using the coefficients B. When the possibility of being not the line-pattern of 400 dpi of FIG. 8B is high, the filter unit 321 performs the filter processing using the coefficients A.

Conditions 1 (used to determine whether it is the thin region (the white section in FIG. 8B) of the 400-dpi line-pattern B):

(D[3][1]<D[3][2]) &
   (D[3][7]<D[3][6]) &
   (ABS(D[3][2]−D[3][4])
   >(ABS(D[3][4]−D[3][1])) &
   (ABS(D[3][6]−D[3][4])
   >(ABS(D[3][4]−D[3][7])) &

Conditions 2 (used to determine whether it is the depp region (the black section in FIG. 8B) of the 400-dpi line-pattern B):

(D[3][1]>D[3][2]) &
   (D[3][7]>D[3][6]) &
   (ABS(D[3][2]−D[3][4])
   >(ABS(D[3][4]−D[3][1])) &
   (ABS(D[3][6]−D[3][4])
   >(ABS(D[3][4]−D[3][7])).

In the above formulas, D [i][j] means the value which indicated by the image data of the pixel at the position of x=i and y=j on the pixel matrix of x and y distribution. For example, D [3][1] is the value which indicated by the image data of the pixel to which the coefficient "a3" of the coefficient matrix in the block of the filter unit 321 in FIG. 4. "&" means the logical product "AND". "ABS" means the function to take an absolute value. The target pixel is the D [4][3].

1.2.4 Edge Extraction Unit 322

The character region is a region including the pixels of high level density and the pixels of low level density (in the following, called the black pixels and the white pixels) of low level density. Such a region continues in an edge of a character. The processing of extracting such black pixels and white pixels is performed by the edge extraction unit 322, and the character edge is detected based on the continuity.

1.2.5 3-Level Density Slicing Unit 322*a*

First, two types of threshold values TH1 and TH2 are used by the 3-level density slicing unit 322*a*, and the G image data to which the unit 321 carried out the filter processing of the character edge emphasis region (the edge extraction unit 322). The input data is formed into one of the 3 level values. For example, when the image data is expressed by 256 gradation (0=white) from 0 to 255, the threshold values TH1 and TH2 are set as TH1=20 and TH2=80.

In the 3-level density slicing unit 322*a*, when the input data<TH1, the input data is converted to the value of the 3 level values which expresses the pixel data to which it is addressed as a white pixel. When the conditions TH1<=the input data<TH2 are met, the input data is changed to the value of the 3 level values which expresses the pixel data to which it is addressed as a gray pixel. When TH2<=the input data, the input data is changed to the value of the 3 level values which expresses the pixel data to which it is addressed as a black pixel.

1.2.6 Black Pixel Continuation Detection Unit 322*b* and White Pixel Continuation Detection Unit 322*c*

The black pixel continuation detection unit 322*b* and the white pixel continuation detection unit 322*c* are provided for the image data after the 3-level density slicing. About the unit where the unit and white pixel on which it is based, and which are resembled, and a black pixel follows continue, it is the pattern matching, respectively. In this pattern matching, it is at this preferred embodiment. The patterns BPa–BPd and WPa–WPd of the 3×3-pixel matrix are used as shown in FIG. 9. The black dot in the pattern in FIG. 9 is indicated as the black pixel. The white circle therein is indicated as the blank pixel, that is the white pixel. The region with no round mark is indicated as the pixel that is not asked any of a black pixel, a gray pixel and a white pixel. The pixel in the center of the matrix of the 3×3 pixels is the target pixel.

The black pixel continuation detection unit 322b detects the black pixel with which the distribution of the contents of the image data is indicated in FIG. 9. If matched with either of the distribution pattern BPa–BPd, the target pixel at that time is detected as the "black continuation pixel". Similarly, the white pixel distribution patterns WPa–WPd in FIG. 9 are used by the white pixel continuation detection unit 322c. If matched with whether it is a gap, the target pixel at that time is detected as the "white continuation pixel".

1.2.7 Neighboring Pixel Detection Unit 322d

The neighboring pixel detection unit 322d performs the processing based on the detection results from the black pixel continuation detection unit 322b and the white pixel continuation detection unit 322c. In the neighboring pixel detection unit 322d, it is detected whether the neighboring pixels in the vicinity of the target pixel include a black continuation pixel or a white continuation pixel. Based on the results of this detection, it is determined whether the region of the target pixel is an edge region or a non-edge region. Specifically, in the neighboring pixel detection unit 322d of this preferred embodiment, when the region of the target pixel includes at least one black continuation pixel and at least one white continuation pixel in the block of a 5×5-pixel matrix, respectively, it is determined that it is an edge region. Otherwise it is determined that the region is a non-edge region.

1.2.8 Isolated Point Removal Unit 322e

The character edge exists continuously, and the edge that is isolated from the character is detected by the isolated point removal unit 322e as being a non-edge region. For the pixel that is determined as being an edge region, the isolated point removal unit 322e outputs the edge signal "1" (which indicates the edge region). For the pixel that is determined as being a non-edge region, the isolated point removal unit 322e outputs the edge signal "0" (which indicates the non-edge region).

1.3 White Region Extraction 1.3.1 White Region Extraction Unit 323

Figure 21:
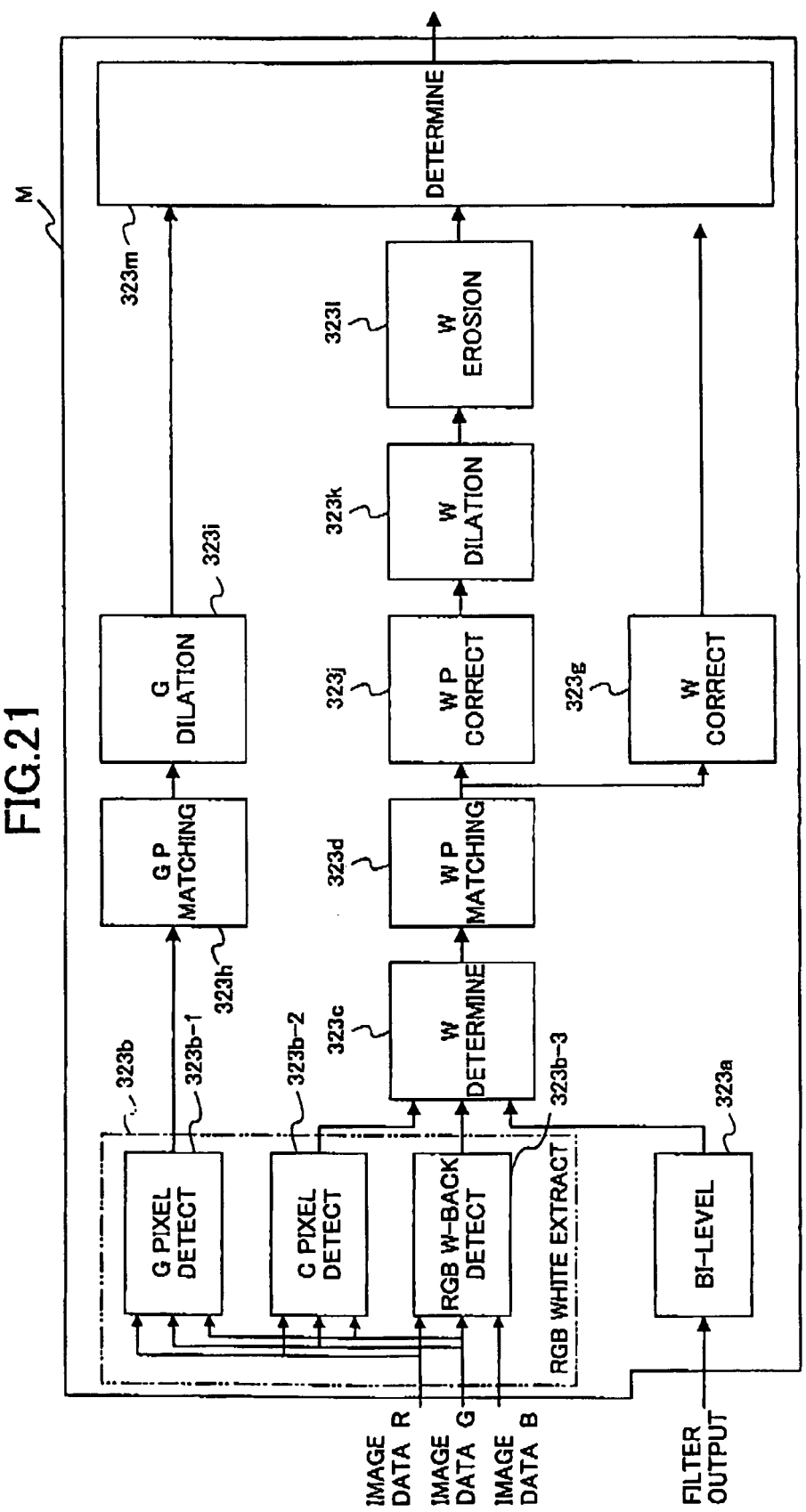
FIG. 21 is a block diagram of the white-region extracting unit in FIG. 4.

The white region extraction unit 323 in FIG. 4 includes, as shown in FIG. 21, the bi-level unit 323a, the RGB white extraction unit 323b, the white determining unit 323c, the white pattern matching unit 323d, the white pattern compensation unit 323j, the white dilation unit 323k, the white erosion unit 323l, the white compensation unit 323g, the gray dilation unit 323i and the gray pattern matching unit 323h, and the determination unit 323m. In addition, the white region extraction unit 323 in FIG. 4 corresponds to the block M in FIG. 21.

1.3.2 Bi-Level Unit 323a

The bi-level unit 323a uses the edge emphasis output of the picture density data (G image data) of the filter unit 321, and it is converted into the 2-level value with the threshold value thwsb. The bi-level unit 323a generates a bi-level white determining signal that is referred to by the white pattern matching unit 323d for the generation of the white data (which processing is indicated at step S7 in the flow-chart of FIG. 5).

In addition, the edge emphasis output in the present embodiment is the 256 gradation data of 0–255 wherein "0" indicates white data with no density value, and an example of the threshold value thwsb is 50. When the edge emphasis output is smaller than the threshold value thwsb=50, the bi-level unit 323a determines that it is a bi-level white pixel and generates the bi-level white determining signal "1". Otherwise (when the edge emphasis output is above 50), the bi-level unit 323a generates the bi-level white determining signal "0".

1.3.3 RGB White Extraction Unit 323b

The RGB white extraction unit 323b performs: 1) RGB white background detection: 2) color background detection; and 3) gray pixel detection. The RGB white extraction unit 323b performs the image data determination as to whether the image data is a white region or a gray region (middle density region).

1) RGB White Detection.

In the RGB white detection, a white region is detected is based on the R, G, and B image data. The operation of the white background separation is made active. That is, it is initiated about the processing of the white background separation. Specifically, as in the pattern WBP of FIG. 10, it is the 3×3-pixel matrix. If the target pixel of the R, G and B image data (the center pixel of the 3×3-pixel matrix) is smaller than the threshold value thwss, it is determined as being a white region by the white pattern matching unit 323d. It generates the white determining signal "1" (active) as in Step S3 of FIG. 10.

In addition, the R, G and B image data is expressed by the 256 gradation value from 0 to 255 (0=white), and the threshold value thwss meets the condition: thwss<thwsb, and an example of the threshold value thwss is 40. When the image data R, G and B is smaller than thwss=40, it is determined as being a white background region, and the white background determining signal "1" is generated. Otherwise, the white background determining signal "0" is generated.

2) Color Background Detection

The color background detection is performed in order to avoid the determination of a thin color region to be a white background.

Figure 11:
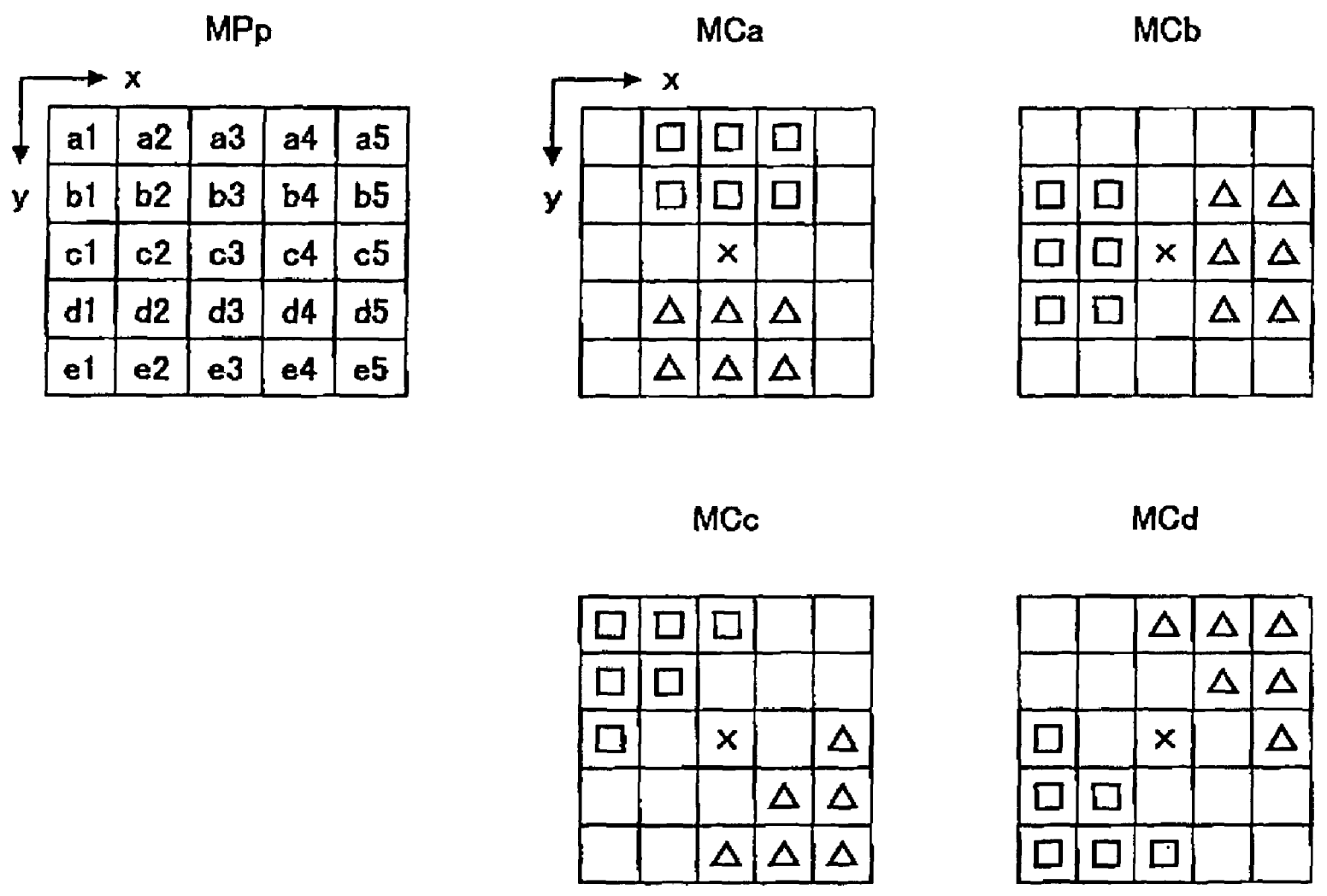

A. The indication of each pixel of the 5×5-pixel matrix centering on the target pixel is given as shown in the pattern MPp of FIG. 11. The target pixel (the x-marked pixel of MCa–MCd) has the RGB differences (the differences of the maximum and the minimum of the RGB image data of each pixel). If the difference of the maximum and the minimum is larger than the threshold value thc, the color pixel determining signal a "1" is generated, and it is considered as a color pixel. If the difference is below the threshold value thc, the color pixel determining signal a "0" is generated, and it considered as a monochrome pixel.

B. Either of the neighboring pixels group Δ (inside of MCa–MCd of FIG. 11) of one side of the target pixel are one side white seal that all of the R, G, and B image data are below the threshold value thwc. The constant signal b "1" is generated. It is considered as a white pixel. Otherwise the constant signal b "0" is generated, and it is considered as a non-white pixel. The threshold value thwc in this case is 20.

C. Neighboring pixels group □ of the other side of the target pixel (inside of MCa–MCd of FIG. 11) are the other side white seal that all of R of that pixel, G, and B image data are below the threshold value thwc. The constant signal c "1" is generated. It is considered as a white pixel. Otherwise the constant signal c "0" is generated and it is considered as a non-white pixel.

D. In either of the patterns MCa–MCd of FIG. 11, a AND (exclusive NOR of b and c)="1". When this condition is met, the condition a="1" (the target pixel is a color pixel) and the b and c are in agreement, it is detected at this time (the both sides of the target pixel are white pixels or the both sides are non-white pixels), the color background determining signal d "1" for the target pixel is generated. The color background detection signal d at this time indicates white. It is referred to by the pattern matching unit 323*d* (Step S6 of FIG. 10).

For performing the pattern matching processes A–D, the surroundings of a black character are RGB reading when it is slightly alike by the position gap and becomes coloring, it is for not gathering that with a color. In the position of coloring of the surroundings f the black character, they are (exclusive NOR of b and c), and one side of the both sides of the target pixel serves as a white pixel, another side serves as non-white pixel. In this case, the color background detection signal d="0" is generated. It becomes the non-color background.

In addition, the target pixel is with a white ground about the circumference. At the time of the surrounded color pixel, it is the color background detection signal d="1". It becomes the color background and a line is a lump. A color pixel thin even place is detected as being the color background. Although a place white originally is not completely read by white in the place where the line is complicated, as described above. It does not judge with a color pixel by the processing A. When the RGB difference is small, it is the threshold value thwc and the concentration is set up more severely than the outstanding white ground (for example, thwss=40, thwsb=50). It is determined whether it is a white background or not by the processing of thwc=20.

In addition, the peak white pixel detection may be performed on the occasion of color background detection. The peak white pixel detection is performed. The peak white pixel of a small white region is undetectable by the RGB white detection is detected based on the 5×5-pixel matrix distributions RDPa and RDPb of G image data shown in FIG. 10. Specifically, the computation is performed based on the 5×5-pixel matrix distribution RDPa as follows:

miny=min (G[1][2], G[1][3], G[1][4], G[5][2], G[5][3], G[5][4]).

Namely, the black dot of the 5×5-pixel matrix distribution RDPa is shown in FIG. 10, and the minimum density miny in the attached pixel group is extracted. And the computation which follows is performed:

maxy=max (G [3][2], G [3][3], G [3][4]).

Namely, the white circle of the 5×5-pixel matrix distribution RDPa is shown in FIG. 10, and the highest density maxy in the attached pixel group is extracted. Next, the following computation is performed:

mint=min (G [2][1], G [3][1], G [4][1], G [2][5], G [3][5], G [4][5]).

Namely, another 5×5-pixel matrix distribution RDPb is shown in FIG. 10 and the minimum density mint of the black dot in the attached pixel group is extracted. And the following computation is performed:

maxt=max (G [2][3], G [3][3], G [4][3]).

Namely, the white circle of the 5×5-pixel matrix distribution RDPb is shown in FIG. 10, and the highest density max t in the attached pixel group is extracted. Here, min( ) is the function which detects the minimum value, max( ) is the function which detects the maximum value.

Next, the following computation is performed:

OUT=((miny−maxy)>0)#((mint−maxt)>0).

Namely, one of the values of (miny−maxy) and (mint−maxt) that is a positive value and larger is detected as the lower peak detection value OUT. When this value of OUT is larger than a certain threshold value, it is detected as being the lower peak white pixel with respect to the target pixel (the center pixel of RDPa or RDPb). Thus, the lower peak pixel is detected, and the difficulty in the RGB white detection of the above 1) is compensated.

1.3.4 White Determining Unit 323*c*

The contents of the state variables MS and SS[I] used for a white determination are updated. It is shown in the flowchart in FIG. 5. Here, the state variable MS indicates the current line of the image data for processing). The state variable SS[I] indicates the previous line of the image data before one line of the current line for processing. Each variable indicates a 4-bit white background information (the degree of white) that is generated in the processing shown in the flowchart of FIG. 5.

The highest value of the value which the state variables MS and SS[I] express is set to 15. This means the whitest grade and the minimum value is 0. Namely, the state variables MS and SS[I] are at the maximum, so that it is the data in which a white grade is shown and the indicated value is large. At the time of a copy operation start, both the state variables MS and SS[I] are reset to 0. They are initialized. The state variable in front of one line of the target pixel which is a candidate for processing first in processing of FIG. 5. Namely, the pixel in front of 1 pixel on the same line of the white information SS[I] and the target pixel (precedence). The pixels are compared (Step S1), and the state variable MS, i.e., the white information, on the processed pixel is checked. If the white information SS in the previous line [I] is larger, the target pixel is temporary in it. Otherwise, it considers as the white background information MS (Step S2) that is the state variable M of the precedence pixel. Let the variable S be the temporary white information MS on the target pixel.

The white information on the neighboring pixels depends this. It means choosing the information near white. After starting copy operation, it is determined whether it is in the white region, i.e., a white ground, by performing the RGB white detection. It is detected whether the output of the white determining signal is equal to the value "1". The white information SS[I] on the pixel in the previous line is updated to 15 (Step S3, S4). It is considered as the white information MS 15 of the target pixel as being 15 (Step S5). And the white information MS is based on the current line (target line) of the line memory LMP shown in FIG. 12. It is written to the main scanning position (F) of the target pixel of the line memory, and is a pixel in front of one line. The white information SS[I] is based on the previous line of the line memory LMP in FIG. 12. It is written to the main scanning position (F) of the target pixel of the line memory on the previous line (Steps S3–S5).

Next, it is the pixel in the previous line that is indicated by the white information SS[I] to the pixel. It is made to spread as follows (Steps S14–17). Here, [I] indicates the main scanning position of the target pixel, and [I-1] indicates the position of the preceding pixel of the target pixel in the main scanning direction x.

When the condition SS[I−1]<SS[I]−1 is met, the equation SS[I−1]=SS[I]−1 is set to the line memory (Steps S14, S15). When the condition SS[I−2]<SS[I]−2 is met, the equation SS[I−2]=SS[I]−2 is set to the line memory (Steps S16, S17, S14–S15). Next, when the condition SS[I−3]<SS[I]−3 is met, the equation SS[I−3]=SS[I]−3 is set to the line memory (Steps S16, S17, S14–S15). Similar procedure is repeated. Finally, when the condition SS[I−5]<SS[I]−15 is met, the equation SS[I−5]=SS[I]−15 is set to the line memory (Steps S16, S17, S14–S15). The minimum value MIN of these values of the white information SS[I] is 0, and when it is below 0 it is reset to zero. This is the same in the below-mentioned step S13.

The main scan which is made in the previous line and the target pixel is processed in the steps S14–S17. The white information SS before the position is the main scanning direction from it about the white information MS on the target pixel. It is updated by the value lowered at the rate of reduction per pixel position, and is the white background of the target pixel. Behind the main scan, the information spreads at the rate of reduction in the main scanning direction x in front of one line (white). However, this is the case where the way of the white information in front of one line is a small value. For example, the pixel in front of one line is detected by the RGB white detection, and it is detected as a white background (white region). Since the white information in this respect is 15 and is the highest value when detecting, rewriting is not performed. When the target pixel is updated and it becomes that whose it is detected as being not a white background, it is detected by the RGB white detection. The white determining signal d="0" for the target pixel is generated.

In the steps S3–S6, the color background detection signal d="1" for the target pixel is generated. Two values which are the output of the non-color background but the bi-level white are detected, and the bi-level unit 323a outputs the determining signal="1".

When the steps S5 and S14–S17 are performed. The white propagation processing is performed. A target pixel when in agreement with neither of the conditions is the color background or un-2 value. At the time of bi-level imaging, the white information MS on a target pixel is carried out-one (Step S13). The white grade update only 1 to weak white information. The minimum value MIN of the white information MS is 0. It comes out, it is, and when becoming less than zero, it limits to 0. It is a front when this course has been progressed. Step S5 of and 14–17 are performed. That is, white propagation processing is performed. By generation of the above white information MS, it sets on the line memory LMP, and is a state variable. (White information) A neighboring pixels can be made to spread white information through MS. This white Generation of the ground information MS is color data (R, G, and all the B image data) as mentioned above. Generation of the white information MS on color correspondence of FIG. 5 of the system of step S3-4-5-14-17 based on the RGB white determining signal expressed as a white ground when smaller than thwss=40 is included. a ts threshold value—and the edge emphasis output (output of the filter unit 321) of density data (G image data)—a threshold value—when smaller than thwsb=50, generation of the white information MS on density correspondence of FIG. 5 of the system of step S7-13-5-14-17 based on the white ground and the bi-level white determining signal is included This white determining unit 323c is 1RGB white ground in RGB white extraction unit 323b first. The 1RGB white detection is white seal Sadanobu until it detects a white region by detection. Number "1" It is generated. it corresponds to this and is generation (step S3-) of the white information MS dealing with a color. It does not operate until it starts 4-5-14-17 (execution of Step S4). This is the edge emphasis place of the filter unit 321 about the region where the determination with a white region is not obtained. It is a white pixel (white block) by white pattern matching which is described by the G image data. It is for preventing carrying out a erroneous determination. When the edge emphasis filter unit 321 is applied to the thin character of the color ground, it is the day of the character circumference. Since serves as a value (white) with a level lower than original image data (the color background), it is a filter. It is when white pattern matching is carried out by the data after edge emphasis processing of a unit 321.

Generation of ᛏand the white information MS dealing with density (step S7-13-5-14-17) If it is based on seeing and a white region determining is carried out, although it will be easy to carry out the erroneous determination of the character circumference of the color ground to a white ground To generation of the white information MS on the color correspondence (step S3-4-5-14-17) Therefore, it is determined whether the white pixel (white block) later mentioned to the region to which the determination with a white region is obtained. The white information MS is made into the highest value so that white pattern matching of a ᛝsake may be applied, and it is step S3. When it is not a white ground in step S3, it is determined that about white conditions still in detail in less than [step S6]. Since the white information MS which is one parameter for, and applying white pattern matching or determining no is adjusted, it has prevented carrying out a erroneous determination to a white pixel (white block) by white pattern matching which G image data after edge emphasis processing of the filter unit 321 mentions later. For example, when the possibility of a color pixel is high, the white information MS is lowered (Step S1). When there may also be doubt of 3) and a color pixel, it is with a hold (with no change) about the white information MS. It is a white pixel by white pattern matching mention later by carrying out (Step S11-13). It prevents carrying out a erroneous determination to (a white block), and the data of the character circumference is original image data. It has prevented becoming a value with a low level (white) from (the color background). The place where a character is dense is the processing (Step S3-5, 6-10, and 14-1). Since the white information MS is made to update and spread by 7), a dense character region is a pattern and misdetermination. The possibility that a law will be carried out decreases. Moreover, the complicated character (for example) "Writing" etc.—a sentence Then, the inside of a character is, although white detection may not be able to be performed in 1RGB white detection. 3 the peak white pixel detection detects with white, and it is YE of Step S12 about the white information MS. Since S output holds in the course which goes straight on to Step S5 and limits to a white tendency A possibility that the erroneous determination of the inside of the complicated character will be carried out to a pattern becomes low. Moreover, it is at the time of the color pixel by which the target pixel was surrounded with the white ground in the circumference as touched previously. The color background detection signal d=which is the output of the 2 color background detection "1" It becomes the color background and the line A color pixel thin even place [complicated] can be detected as being the color background, and it is a target pixel. The threshold value thwc as which the circumference regards whether it is white is set up low (thwc=20), and it is a thin color pixel. The circumference of a (target pixel) checks a white background or no strictly, and makes a thin color background pixel. The possibility that the erroneous determination of the inside of the complicated character will be carried out to a pattern since it is detectable Furthermore, it can be made low. As mentioned above, it is a color by the ability detecting a thin color pixel more strictly as being the color background, the time of detecting with the ground—Step S13 from Step S6 of FIG. 5—progressing—a state—strange several—a possibility of lowering MS and determining the color background to be white can be made low—in addition, the step S As opposed to the threshold value thwss when generating the white determining signal referred to by 3 (for example, 40). The threshold value thwsb when generating the bi-level white determining signal referred to as and Step S7 For example, when it does not judge with the color background by making 50 into a large value (step S6:N) Probability it is considered by the bi-level unit 323a that is white is made high at O), and it is the step of FIG. 5. A possibility of progressing to 10 from S7, raising the state variable MS, and determining with a white region is made high. namely, the 1RGB white detection—a threshold value—it judges with white by thwss=40 When probability performs a low severe white determining and judges with a white ground there, it is Step S of FIG. 5. Possible [judge/by three to four or less processing,/raise the state variable MS and/a character background to be white and] The sex is made high.

When the determination of a white background is not performed by the severe white determining, the possibility of detecting the thin color pixel of whether being the color background conversely as the color background may be caused by performing the color background determining severely. Namely, the threshold value with the probability higher when it does not become the determination with the color background with reference to the result of the color background detection judged shortly to be white—the loose white determining of thwsb=50 is performed. The possibility of raising the state variable MS with reference to the bi-level unit 323a is the white determination, and the determination of a character background to be white is made high (Steps S7–10).

The background density irregularity is still thinner than the color background and the thin color pixel detected since there is this processing (Steps S6–S10). For example, when the irregularity is in the background of a document like a projection, it is controlled that fine ground irregularity of the document is interlocked with and the state variable MS changes in 2 values, and changing finely the determination by the white pattern matching unit 323d by controlling the white pixel in the scanning direction. Consequently, when the background is thin as the color background, it is lost that fine ground irregularity of the document is interlocked with, and the fine color omission (white background) appears.

1.3.5 White Pattern Matching Unit 323d

The white pixel which continued by block of the 5×5-pixel unit centering on the target pixel exists. The determination as to whether it is a white background pixel or not is performed. The following formula is met with respect to the target pixel. When carried out, the target pixel is temporarily determined as a white pixel, and the white pattern matching is performed:

(non-color pixel & (white information MS>=thw1 (13)) & bi-level white) # (non-color pixel & (white information MS>=thw2 (1)) & peak white pixel & bi-level white).

Figure 5:
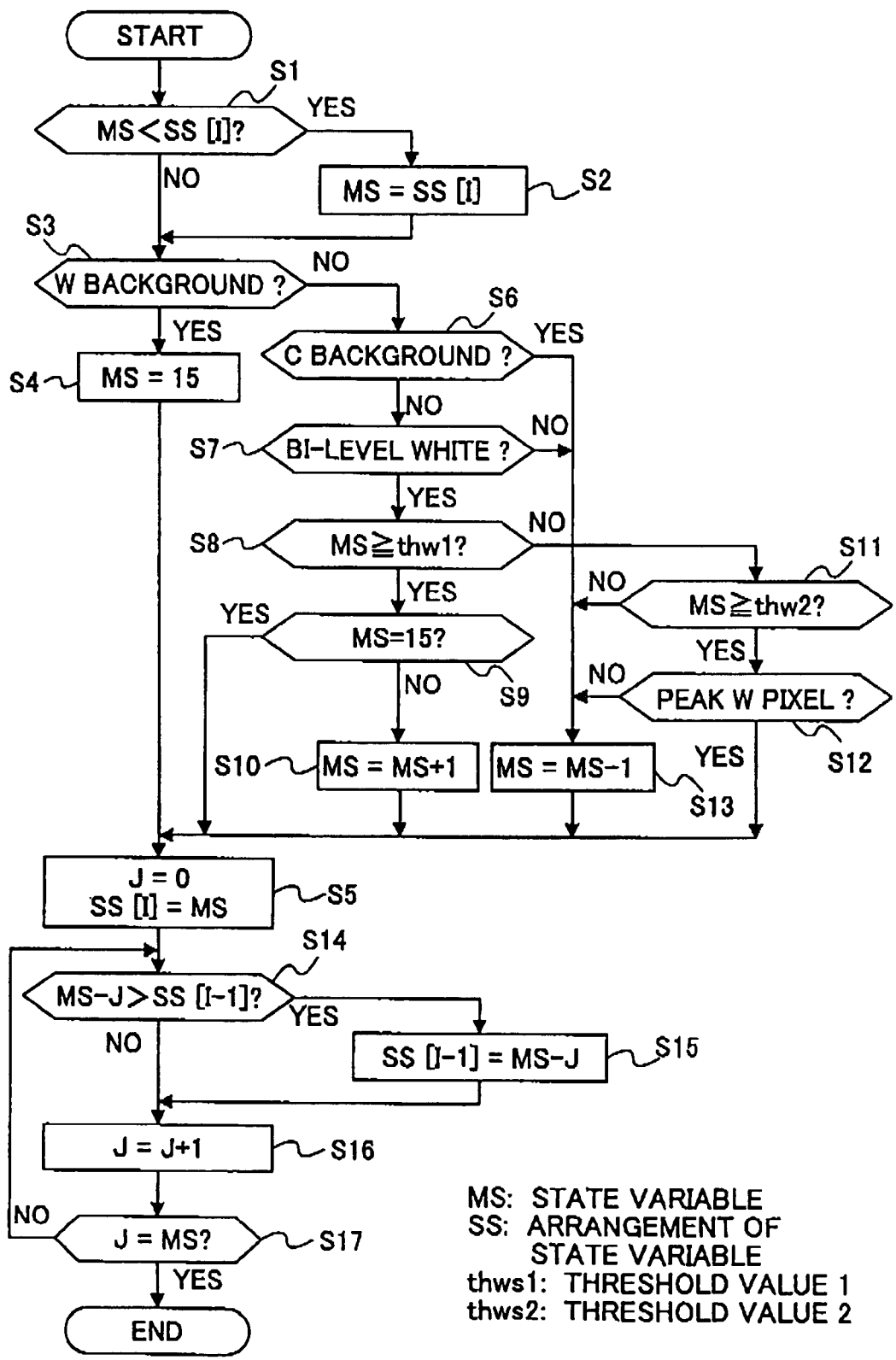
FIG. 5 is a flowchart for explaining a state-variable renewing process related to state variables MS and SS[I] used for white determination.

The target pixel is checked that meets the condition of the above formula in the steps S5 and S14–S17 of FIG. 5. It is set as the object of the white propagation processing in these steps. The "white information MS [I]" is the white information MS on the target pixel which is checked after and white propagation processing. However, this MS [I] indicates the white information which finished the white propagation processing, and "I" indicates the position of the main scanning direction x of the target pixel which performs the checking, and the position of the main scanning direction x of the target pixel which computes the state variable MS by the white determining unit 323c is different. In the condition formula, "non-color pixel" indicates that the output of the color background detection signal d is "0", "bi-level white" indicates that the bi-level white determining signal of the bi-level unit 323a is "1" (bi-level white), and "peak white pixel" indicates that the peak white pix 1, respectively. "#" means the logical sum "OR". The white pattern matching is the output judged by the c ndition formula. The white circle in the continuity patterns PMPa–PMPd shown in FIG. 12 indicates a white pixel. Other blank pixels are "don't case" pixels. The white pixel distribution of the 5×5-pixel matrix centering on the target pixel is the pattern of FIG. 12. The target pixel is in the white pattern when it corresponds to PMPa, PMPb, PMPc or PMPd.

1.4 Gray Determining 1.4.1 Gray Pixel Detection

The color separation of R, G, B, Y, M, C and Bk is performed, and pixels with low density are detected for every color hue. The color separation is the same as that of the color determining mentioned below. The G image data which is after the filter processing is compared with the threshold value thgr. When the G image is larger, or when the color pixel detection of the RGB white extraction is performed as being a color pixel, the following operation will be performed. And when the image data meet the following conditions, the image data is determined as a gray pixel. Here, the threshold value differs for every color, and this is because the maximum density of ink differs.

4.1) R-Y color hue region boundary (ry)

$R-2*G+B>0$ 4.2) Y-G color hue region boundary (yg)

$11*R-8*G-3*B>0$ 4.3) G-C color hue region boundary (gc)

$1*R-5*G+4*B<0$ 4.4) C-B color hue region boundary (cb)

$8*R-14*G+6*B<0$ 4.5) B-M color hue region boundary (bm)

$9*R-2*G-7*B<0$ 4.6) M-R color hue region boundary (mr)

$R+5*G-6*B<0$ 4.8) Y pixel pixel determining (gry)

(color pixel) & (ry==1) & (yg==0) & (maximum of RGB<thmaxy)

4.9) G pixel determining (grg)

(color pixel) & (yg==1) & (gc==0) & (maximum of RGB<thmaxg)

4.10) C pixel determining (grc)

(color pixel) & (gc==1) & (cb==0) & (maximum of RGB<thmaxc)

4.11) B pixel determining (grb)

(color pixel) & (cb==1) & (bm==0) & (maximum of RGB<thmaxb)

4.12) M pixel determining (grm)

(color pixel) & (bm==1) & (mr==0) & (maximum of RGB<thmaxm)

4.13) R pixel determining (grr)

(color pixel) & (mr==1) & (ry==0) & (maximum of RGB<thmaxr)

4.14) when it is not color pixel (grbk)

(maximum of RGB<thmaxbk)

4.15) Gray pixel determination when any of the above conditions of 4.8–4.15 are met, it is determined as being a gray pixel.

In the above formulas, "==" is the notation of the C Language.

This processing is performed by the gray pixel detection unit 323b-1 of FIG. 21. The RGB white extraction unit 323b includes the gray pixel detection unit 323b-1, the color pixel detection unit 323b-2, and the RGB white detection unit 323b-3 as mentioned above, and each image data of R, G and B is supplied to each of these units.

The output of gray pixel detection unit 323b-1 is supplied to 323h of gray pattern matching units, and after the pattern matching result of gray pattern matching is supplied to gray dilation unit 323i and performs dilation processing, it is supplied to 323m of determination units.

Moreover, the outputs of the color pixel detection unit 323b-2, the RGB white detection unit 323b-3 and the bi-level unit 323a are supplied to the white determining unit 323c, the determination result of the white determining unit 323c is supplied to the white pattern matching unit 323d, and the pattern matching result is supplied to the white pattern compensation unit 323j and the white compensation unit 323g.

After the compensation result of the white pattern compensation unit 323h is further processed in the white dilation unit 323k and the white erosion unit 323l, it is supplied to the determination unit 323m, and the processing result of the white compensation unit 323g is supplied to the determination unit 323m as shown.

In addition, if the erosion processing is performed before carrying out the dilation processing by the gray dilation unit 323i, it will become possible to remove isolated dots. Moreover, the white pattern matching unit 323d, the white pattern compensation unit 323j, the white dilation unit 323k, the white erosion unit 323l, and the white compensation unit 323g are the configuration for detecting the boundary region between the white region and the non-white region. The output of the white compensation unit 323g indicates the line width, the output of the white erosion unit 323l indicates the white region, and the output of the gray dilation unit 323i indicates the inside density.

Then, in the determination unit 323m, the priority is attached and the determination is made for these three outputs, and the determination result is outputted to the subsequent units. In the present embodiment, the first priority is the line width information from the white compensation unit 323g, the second priority is the inside density information from the gray dilation unit 323i, and the third priority is the white region information from the white erosion unit 323l.

1.4.2 Gray Pattern Matching Unit 323h

In the gray pattern matching unit 323h, bk performs the following pattern matching as a place deeper than a gray pixel by making D into a gray pixel. Since copy documents are the line pattern of 200 thin lines, and the line pattern of 300 thin lines, the following patterns have been used for them so that a copy document may also carry out gray detection. What was in agreement with the following pattern serves as a gray pixel. The pattern at this time is shown in FIG. 22(a) and FIG. 22(b). FIG. 22(a) is a pattern for 200 lines. FIG. 22(b) is a pattern for 300 lines.

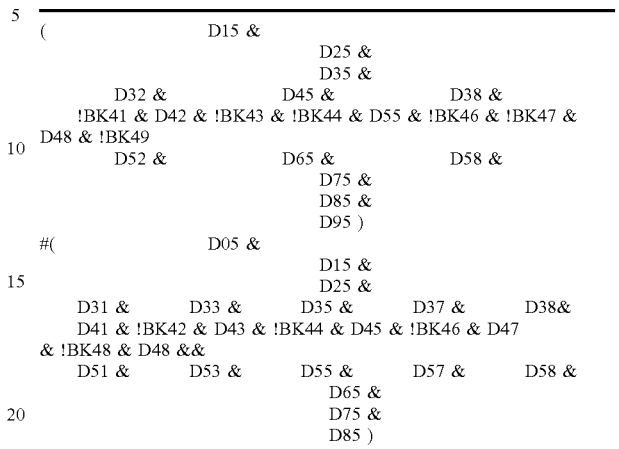

1.4.3 White Pattern Compensation Unit 323j

In the white pattern compensation unit 323j, the active pixels that are isolated in the white pixel pattern matching (1×1, 1×2, 2×1, 2×2, 1×3, and 3×1 white pixels) are set to the inactive pixels. This processing causes the isolated pixels to be removed.

1.4.4 White Dilation Unit 323k

In the white dilation unit 323k, the OR processing of 7×41 pixels is performed for the result of the compensation of the white pixel pattern matching.

1.4.5 White Erosion Unit 323l

In the white erosion unit 323l, the AND processing of 1×33 pixels is performed as a result of the white dilation by the white dilation unit 323k is performed. By performing the white dilation and white erosion, the inactive pixels which are left by the dilation as being a small area are removed. This determination result includes the result of the determination the boundary region and the non-white background to a white background portion and a boundary portion. In other words, it becomes a larger region than the white background.

1.4.6 White Compensation Unit 323g

Figure 12:
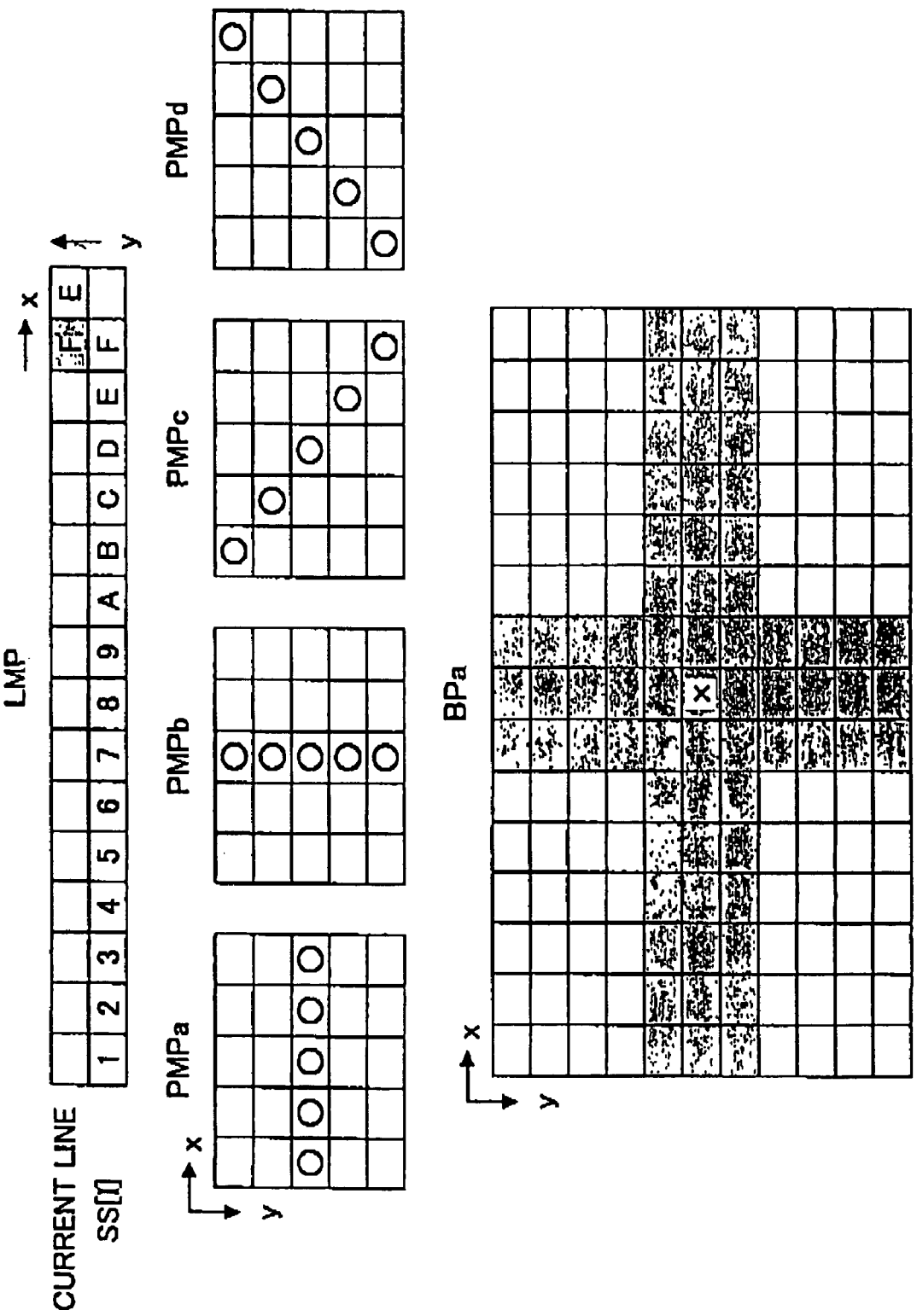
FIG. 12 is a diagram for explaining a current line of a line memory which is being processed.

In the white compensation unit 323g, in the 15×11 pixels centering on the target pixel which indicated by "x" of the block pattern BCP of FIG. 12, when one or more white candidate block exists in each 6×4-pixel region of the four corners, the white block compensation data is given to the target block. Let the region surrounded by the white background be a white region.

1.4.7 Gray Dilation Unit 323i

In the gray dilation unit 323i, the OR processing of 11×11 pixels is carried out to the result of the gray pattern matching. By this, it becomes a little large region to the gray region.

1.4.8 Determination Unit 323m

In the determination unit 323m, when the result of the white erosion unit 323l is active, when the result of the white compensation unit 323g is active, or when the result of the gray dilation unit 323i is inactive, it is determined as being a white background. The following formula indicates the processing of this determination.

result of white compensation # (result of white erosion & !result of gray dilation)

Here, in the result of the white compensation, the region surrounded by the white background is determined certainly as being a white region. In the result of the white erosion & ! the result of gray dilation, the thin place of density is made into the non-white region by making the deep black character circumference into a white region.

Figure 13:
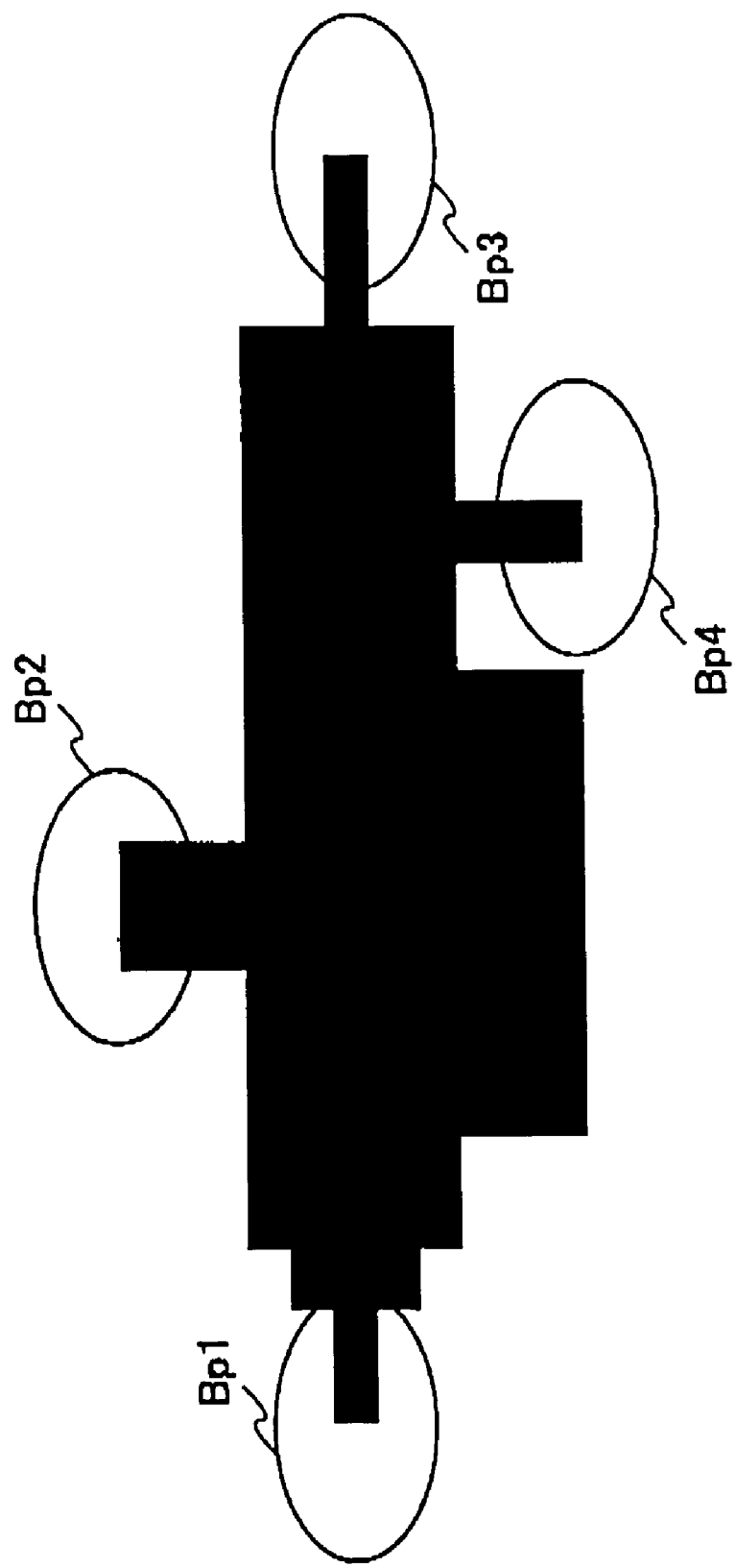
FIG. 13 is a diagram for explaining a process performed by a white region extracting unit.

In FIG. 13, the projections of black enclosed with the circles Bp1–Bp4 are transposed to a white block by the white block compensation which gives the target block the white block compensation data, when one or more white candidate block exists in each 6×4-pixel region of the four corners in the matrix of the 15×11 pixels centering on the target block.

1.5 Adjustment of Character/Photograph Finish Level

The white region extraction unit 323 generates the white information MS which is the state variable which expresses the degree of white corresponding to the white determining signal of the RGB white extraction unit 323b, the color background determining signal d, the peak white pixel detection signal, and the bi-level white determining signal of the bi-level unit 323a with the white determining unit 323c as mentioned above.

Based on the color background determining signal d, the white information MS, the bi-level white determining signal, and the peak white pixel detection signal, the target pixel defines a white pixel or no temporarily, and the white pattern matching unit 323d determines a white pixel by the white pixel distribution pattern matching to the pixel matrix containing the target pixel.

The white compensation unit 323g determines whether the target pixel is the boundary (white region or character region) of a black material and a white boundary using this result and based on the results of the black determining unit 323e and the black pattern matching unit 323f.

In addition, although the white region extraction unit 323 is the circuit configuration of FIG. 21 in the determination of a gray pixel, it is processed with the circuit configuration of FIG. 4 about the monochrome determining. The white determining signal (Step S3 of FIG. 5) of the RGB white extraction unit 323b for all the RGB image data of the target pixel "1" is generated if it is smaller than the threshold value thwss=40, and it is determined as being a white background.

If the threshold value thwss is larger, the probability of defining the white information MS on a large value will become high, and the "white region" is determined. The boundary of black material and a white boundary (the probability of extracting character region) becomes high (that is, the probability of xtracting a pattern region falls). It will become this contrary if the threshold value thwss is made small.

It will become this contrary if the threshold value thwsb is made small. "White region" after the image processing for expressing a character picture vividly is performed for the image data at the back process, if the threshold values thwss and thwsb are enlarged, the image processing with a high priority will be performed to the character region. The image processing for expressing a photograph and a pattern faithfully is performed to the image data of a non-white region, i.e., a pattern (photograph) region. In the subsequent process, if the threshold values thwss and thwsb are made small, the image processing with a high priority will be performed to a pattern (photograph). By the way, the color background determining signal d of the RGB white extraction unit 323b (step S6 reference of FIG. 5) is set to "1". The white information MS is low carried out to it being (the color background), as described above. The probability of the white region extraction becomes low. That is, the probability of extracting a pattern region becomes high.

The probability of detecting neighboring pixels (Δ and □ of FIG. 11) with a color pixel simultaneously if the threshold value thwc (for example, 20) is used by the processing B, it generates the color background determining signal d by the color background detection is made small (exclusive NOR of b and c) is set to "1". The probability becomes high and it is the color background determining signal d is set to "1". The probability of obtaining (the color background) becomes high and describes above. "White region" the probability of the extraction becomes low. That is, the probability of extracting a pattern region becomes high. Then, inside of the parameter adjustment adjusted in this preferred embodiment by operation of the key picture on the menu screen displayed on the menu display and liquid crystal display in the input mode by the key input in the operation/display unit OPB of FIG. 2 (the parameter specification key and the rise, down keys): "character/photograph level". It is made for matching to adjust the threshold values thwss, thwsb, and thwc as follows.

| Parameter | Character-Side Adjustment Value | | | Standard | Photograph-Side Adjustment Value | | |
|---|---|---|---|---|---|---|---|
| | 6 | 5 | 4 | 3 | 2 | 1 | 0 |
| thwss | 46 | 44 | 42 | 40 | 38 | 36 | 34 |
| thwsb | 56 | 54 | 52 | 50 | 48 | 46 | 44 |
| thwc | 26 | 24 | 22 | 20 | 18 | 16 | 14 |

Namely, the parameter in which the operator performs the adjustment setup in the operation/display unit OPB "character/photograph level" with the standard value (default) "3". It is written to the ROM 358 shown in FIG. 3 with the conversion table on which this default value expresses the relation between the character/photograph level, and the threshold values thwss, thwsb, and thwc. When the power supply is supplied to the IPU 300 which is shown in FIG. 3 and the CPU 357 initializes the IPU 300, the CPU 357 reads the default value of the character/photograph level from the ROM 358, the threshold values thwss, thwsb and thwc corresponding to it are read from the conversion table, and it is written to each addressing register to the threshold value of the RAM 356, and is used for the processing by the white region extraction unit 323. Then, if there is adjustment of the character/photograph level in the input from the operation board OPB and the value after adjustment is given to the CPU 357 from the main controller 10, the CPU 357 will read each value of the parameters thwss, thwsb, and thwc corresponding to the value after adjustment from the conversion table of the ROM 358, and will be written to the addressing register to the parameter of the RAM 356. When the threshold value is set as the standard value thwss=40, thwsb=50, and thwc=20, the operator using the operation board OPB "character/photograph level". If only the variable i (for example, 1) increases to the large value, the threshold values thwss, thwsb, and thwc are set to 2i (it is set to the value changed in the unit for 2), and the character priority direction is given.

On the contrary, the operator "character/photograph level" if only the variable i (for example, 1) decreases to the value small, the threshold values thwss, thwsb and thwc are set to 2i (unit for 2), and the photograph is set to the value changed in the direction of the point.

1.6 Dot Extraction

1.6.1 Dot Extraction Unit 324

Figure 23:
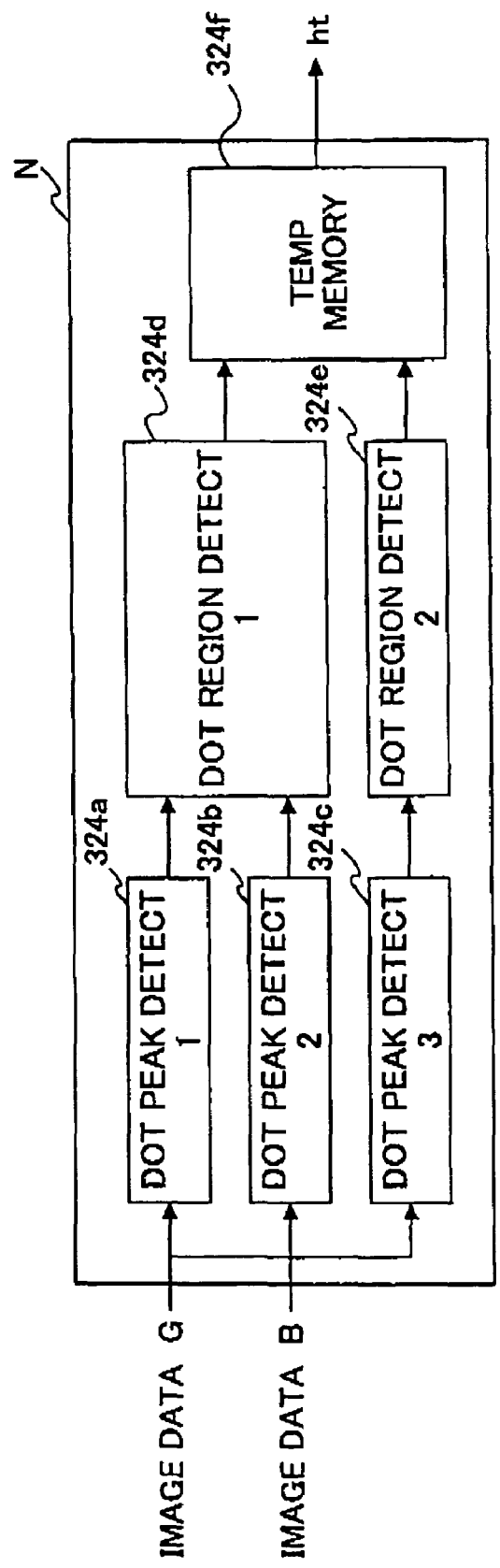
FIG. 23 is a block diagram of the dot extracting unit in FIG. 4.

The dot extraction unit 324 includes the temporary memory 324f, the 1st dot peak detection unit 324a, the 2nd dot peak detection unit 324b, the 3rd dot peak detection unit 324c, the 1st dot region detection unit 324d and the 3rd dot region detection unit 324e, as shown in FIG. 23.

In the 1st dot peak detection unit 324a and the 3rd dot peak detection unit 324c, the G image data is supplied. The B image data is supplied to the 2nd dot peak detection unit 324b. In the 1st dot region detection unit 324d, the detection result of the 1st dot peak detection unit 324a and the 2nd dot peak detection unit 324b is supplied. The detection result of the 3rd dot peak detection unit 324c is supplied to the 2nd dot region detection unit 324e. Moreover, the temporary memory 324f temporarily stores the detection results of the 1st and 2nd dot region detection units 324d and 324f therein. In addition, the dot extraction unit 324 in FIG. 4 corresponds to the block N in FIG. 23.

The 1st dot peak detection unit 324a is a detection circuit which detects a peak dot pixel which forms a peak dot region of the image based on the G image data from the pixel density information in the 2-dimensional local region of a predetermined size. When the following two conditions are simultaneously satisfied about the local region, the center pixel of that region is detected as being a peak dot pixel.

Conditions 1: the density level of the center pixel is the maximum (upper peak) or the minimum (lower peak) in the local region.

Conditions 2: the absolute value of the difference of the average of the density level of a pixel pair and the density level of the center pixel is above the threshold value "Th" about all the pairs of the pixels at positions symmetrical with respect to the center pixel.

Figure 14:
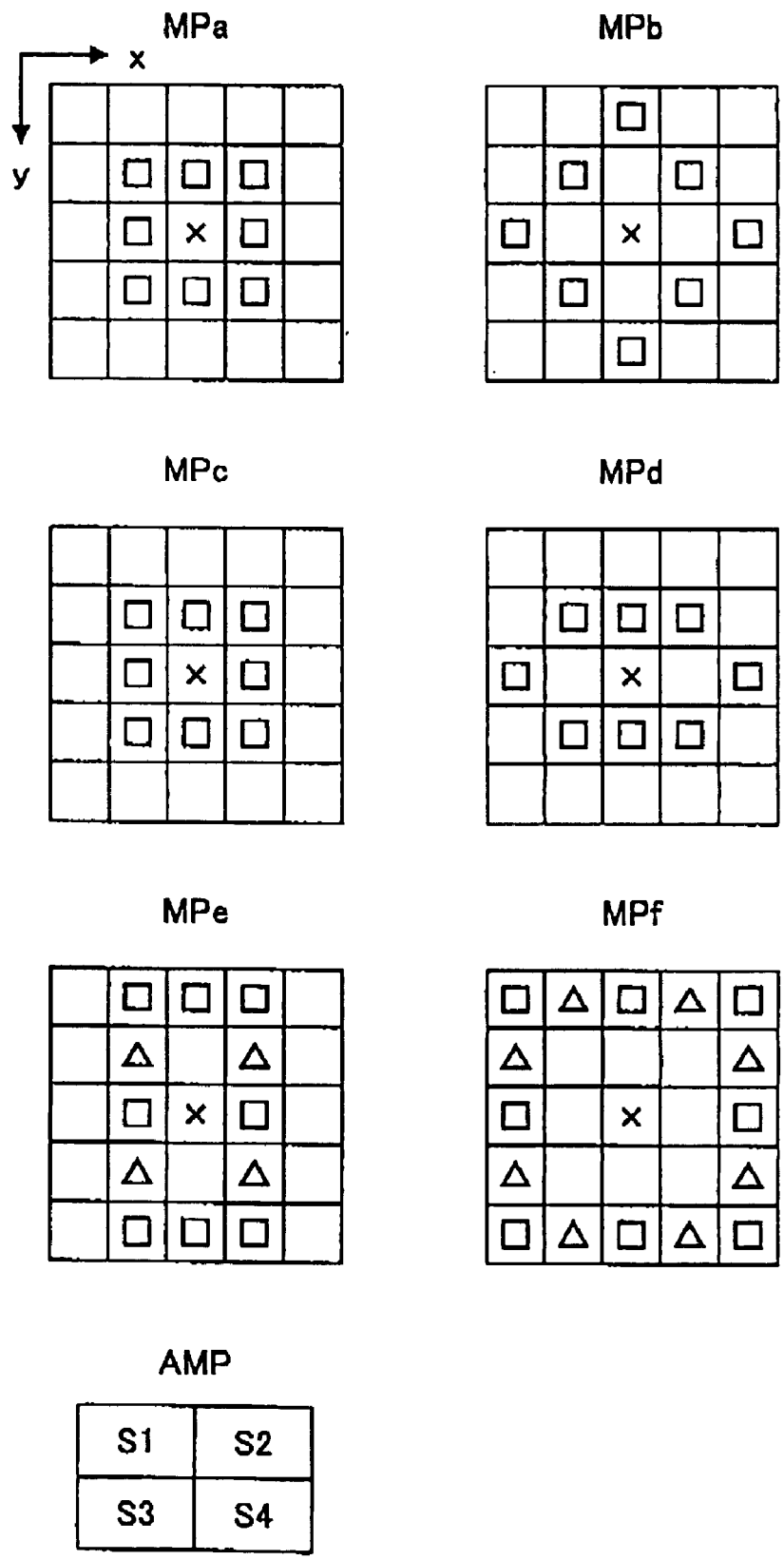
FIG. 14 is a diagram for explaining a detection process performed by a first peak detector of a dot extracting unit in FIG. 4.

With reference to FIG. 14, the detection processing of the 1st dot peak detection unit 324a is explained concretely.

In the following, the example is adopted as the mask of a 5×5-pixel matrix (generally, it is a matrix of N×N pixels) as a local region. The mark of each pixel of the 5×5-pixel matrix is as shown in the pattern MPp of FIG. 11, and the density Lc of the center pixel c3 used as the target pixel is the maximum or the minimum as compared with each density L1–L8 of the neighboring pixels. It is supposed that the following conditions are satisfied:

$abs(2Lc-L1-L8)>=Lth$ and $abs(2Lc-L2-L7)>=Lth$ and $abs(2Lc-L3-L6)>=Lth$ and $abs(2Lc-L4-L5)>=Lth$.

When the above conditions are met, the center pixel (Lc) of the mask is detected as a peak dot pixel. The abs function means taking the absolute value thereof. Lth is the threshold value (a fixed value).

Specifically, let the neighboring pixels be the pixels which are indicated by the rectangles in the neighboring pixels distribution patterns MPa or MPb shown in FIG. 14. When one of the peak dot pixel detection based on the neighboring pixels distribution patterns MPa and MPb detects with a peak dot pixel, the detected signal with which the peak dot pixel is expressed to the target pixel at that time (the center pixel c3) is given.

The two patterns are used because it corresponds to the linear density of a dot broadly. The pattern MPa is defined as follows.

L1=b2, L2=b3, and L3=b4, L4=c2, L5=c4, and L6=d2, L7=d3 and L8=d4. Here, it means making the density of the pixel b2 into the value of L1 of the peak dot pixel detection operation as being L1=b2. The pattern MPb is defined as follows.

L1=b2, L2=a3, and L3=b4, L4=c1, L5=c5, and L6=d2, L7=e3 and L8=d4. Moreover, since the expansion or reduction of the sub-scanning direction y may be performed according to the document scanning speed of the scanner 200, the quantity of the expansion or reduction of the sub-scanning direction y of a copy if given from the scanner 200 together with the image data. Then, at the time of reduction, for replacement with the patterns MPa and MPb, the patterns MPc and MPd shown on FIG. 14 are used. At the time of expansion, the patterns MPe and MPf shown on FIG. 14 are used.

In addition, the pixels which are indicated by the triangle mark in the patterns MPe and MPf are the circumference pixels that may be added. The 2nd dot peak detection unit 324b carries out the dot peak detection using the B data, and the function is same as 1st dot peak detection unit 324a. Although it reacts to almost all colors since the G image data is used for it, since the 1st dot peak detection unit 324a does not react to Y, it is an auxiliary thing aiming at detecting the dot peak of Y using the B image data in the 2nd dot peak detection unit 324c. The dot region detection 324c includes the 1st peak dot pixel detection 324a and the 2nd dot peak. The calculation of the upper and lower peak dot pixels detected by one of the pixel detection 324b is carried out for every 2-dimensional small region of a predetermined size, and let the sum of the peak dot pixels be the total numerical value P of the small region. The calculation of the value P is determined by all the pixels (or in the case of processing of a single pixel, the center pixel of the small region) of the small region to be a dot region, when the sum is larger than the threshold value Pth. The result of the determination is stored in the temporary memory 324f.

With reference to FIG. 24(a), the detection processing of the 3rd dot peak detection unit 324c is explained concretely.

The detection processing of this 3rd dot peak detection unit 324c is the example which is adopted the mask of a 7×7-pixel matrix (generally, a matrix of N×N pixels as a local region for the purpose of the detection more than 100 or less lines and 65 lines (newspaper dot). In the pattern of FIG. 24(c), the density Lc of the center pixel group used as the target pixel is the maximum or the minimum as compared with the density groups L1–L8 of the neighboring pixels. It is supposed that the following conditions are met.

$abs(2Lc-L1-L8)>=Lth$ and $abs(2Lc-L2-L7)>=Lth$ and $abs(2Lc-L3-L6)>=Lth$ and $abs(2Lc-L4-L5)>=Lth$.

When the above conditions are met, the center pixel (Lc) of the mask is detected as a peak dot pixel (peak pixel). The abs function means taking the absolute value thereof as mentioned above. Lth is the threshold value (a fixed value).

Specifically, let the neighboring pixels be the pixels as shown in FIG. 24(a) and be carried out the neighboring pixels distribution pattern. Based on the neighboring pixels distribution pattern, when one of the 1st and 2nd dot peak detection units 324*a* and 324*b* detects it as being a peak dot pixel, the detected signal with which the peak dot pixel is expressed to the target pixel at that time (the center pixel d4) is given. The two patterns are used because they correspond to the rate of dot area of a dot broadly. With reference to neighboring pixels, it asks for the density of the center pixel Lc as follows.

Lc=Min(d4, d3, d4, c4, e4).

When the above Lc is the maximum in the neighboring pixels, the pattern is as follows.

L1=Max (a1, a2, b1)
L2=Max (a3, a4, a5)
L3=Max (a6, a7, c7)
L4=Max (c1, d1, e1)
L5=Max (c7, d7, e7)
L6=Max (f1, g1, g2)
L7=Max (g3, g4, g5)
L8=Max (g6, g7, f7).

Here, L1=Max (a1, a2, b1) means making the maximum of the density of the pixels a1, a2, and b1 into the value of L1 of the peak dot pixel detection operation. Lc=Min (d4, d3, d4, c4, e4) means that Lc is the minimum of d4, d3, d4, c4 and e4.

Moreover, when the condition Lc=Max (d4, d3, d4, c4, e4) is met and this Lc is the minimum value in the neighboring pixels, the pattern is as follows.

L1=Min (a1, a2, b1)
L2=Min (a3, a4, a5)
L3=Max (a6, a7, c7)
L4=Max (c1, d1, e1)
L5=Max (c7, d7, e7)
L6=Max (f1, g1, g2)
L7=Max (g3, g4, g5)
L8=Max (g6, g7, f7).

Moreover, since the expansion of the sub-scanning direction y and reduction are performed according to the document scanning speed of the scanner 200, and the quantity of expansion or reduction in a copy is given from the scanner 200, together with the image data. Then, at the time of reduction, the pattern shown in FIG. 14(*b*) is used. At the time of expansion, the pattern shown in FIG. 14(*a*) is used. The operation formula of the 3rd dot peak detection unit 324*c* is not calculated by the 1-pixel data, but they are two or more pixels (operation of min and max), and refer to the target pixel for it. As for the dot of a low-linear-density, the periodicity of a shade becomes large (the area becomes large) is determined by referring to the neighboring pixels, thereby the influence of a noise is lessened, and the amount of arithmetic operations is reduced, and other block can be used now for an operation formula in common. Thus, the configuration of the apparatus becomes easy. The peak dot pixel where the 1st dot region detection unit 324*d* is detected by the 1st dot peak detection unit 324*a*. The total number of the peak dot pixels of the upper and lower peaks in the small region are determined as being a count value P. The calculation of this value P is performed (or in the case of processing of a single pixel, the center pixel of the small region) of the small region to be a dot region, when it is larger than the threshold value Pth. The result of determination is stored in the temporary memory 324*f* temporarily. The 1st dot region detection unit 324*d*, and if one of the 2nd dot region detection unit 324*e* is a dot region, according to the dot/non-dot determining result of the processed region near the small region currently observed (the feature information on surrounding), the threshold value Pth will be changed in adaptation In this preferred embodiment, the two values TH1 and TH2 (TH1>TH2) are prepared as the threshold value Pth. The value of one of these is chosen by the determination result of the processed region which is stored in the memory 324*f*, the target small region. That is, since the possibility of being a line drawing region is high when the neighboring region is judged to be a non-dot region, in order to reduce incorrect detection, the TH1 to which the conditions become severe is chosen as the threshold value Pth.

On the other hand, since the possibility of being a dot region is high when judged with a region being a dot region soon, the TH2 to which the conditions become loose is used as the threshold value Pth. In addition, the TH1 is chosen as an initial value of threshold value Pth. The distribution of the small region is shown in AMP on FIG. 14. Each of S1–S4 of the small region distribution pattern AMP is a small region (block) with a size of 4×4 pixels, and suppose that they are the small region which S4 is observing (the end of steps S1, S2, and S3).

When it is determined in all of the steps S1, S2 and S3 as being dot regions, it is used as the threshold value Pth for the determination of Th in the step S4. When at least one of S1, S2, and S3 is determined as being a non-dot region, the TH1 is chosen as the threshold value Pth. When it is determined as a dot region and as a non-dot by "1", the dot region detected signal ht "0" is outputted from the dot extraction unit 324.

However, this embodiment chooses the threshold value TH2 when it is determined as being a dot region in any one small regions of S1, S2, and S3, and only when all are determined as being a non-dot region, the threshold value TH1 may be selected.

Furthermore, the neighboring region for reference can also be set only to the step S1 or S2.

1.6.2 Color Determining Unit 325

When a color pixel (chromatic) and a black pixel (non-chromatic) in a document are detected, the relative reading gap of R, G, and B exists for the sampling of each color image data, or mechanical accuracy. This will be described with reference to FIG. 15.

Figure 15A:
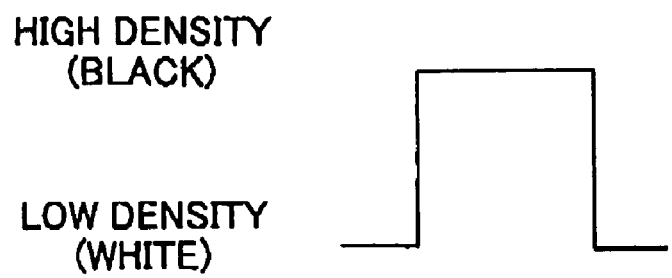
FIG. 15A, FIG. 15B and FIG. 15C are diagrams for explaining a process performed by a color determination unit in FIG. 4.
Figure 15B:
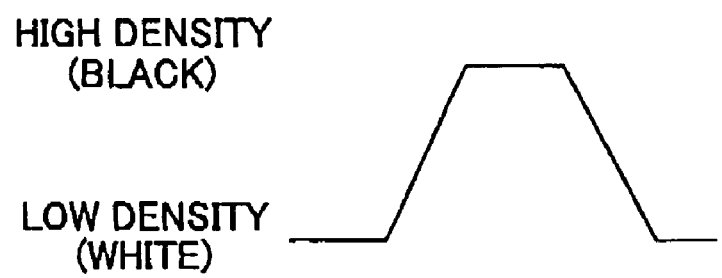
Figure 15C:
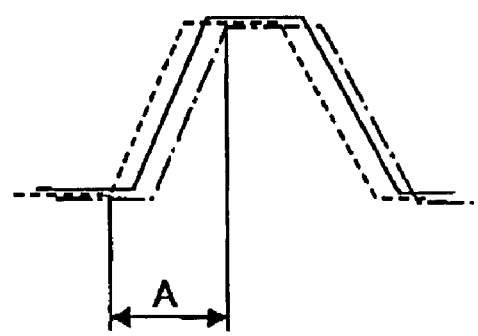

In FIG. 15, (a) indicates a picture density signal, and ideally, a black density signal is the black when the height of the RGB density signal and of the level corresponds. However, actual image data is the focused image data produced by the CCD 207 with the lens 206, it is what digitized the image signal of the CCD 207. In FIG. 15, (b) becomes the height waveform of an ideal.

However, as the common scanner, since the three-line CCD sensor is used, and each picture of R, G, and B of image data is not read simultaneously in time, but each line sensor of R, G, and B is arranged at equal intervals and it cannot read simultaneously in time, a reading position gap will surely arise. For example, R and G showing the black of level change shown in (b) of FIG. 15, and B each color density signal shift relatively, as shown in (c) of FIG. 15. If this gap is large, a color gap will appear in the peripheral portions of the black region.

1.6.3 Color-Separation Unit 325*a*

The color determining unit 325 detects a chromatic color region of an image. The input data R, G, and B is changed into the signal of c, m, y, and w for a color determining (white) in color-separation unit 25*a*. As the example of the color separation, the boundary of each color of R, G, and B in one pixel, the difference of the maximum and the minimum value of each image data is defined as the RGB difference, and it is performed as follows Here, R, G, and B image data will become black if the number becomes large (it becomes deep).
1) R-Y color hue region boundary (ry)

$R-2*G+B>0$

2) Y-G color hue region boundary (yg)

$11*R-8*G-3*B>0$

3) G-C color hue region boundary (gc)

$1*R-5*G+4*B<0$

4) C-B color hue region boundary (cb)

$8*R-14*G+6*B<0$

5) B-M color hue region boundary (bm)

$9*R-2*G-7*B<0$

6) M-R color hue region boundary (mr)

$R+5*G-6*B<0$ 7) w (white) pixel determining for color determining:
if (R<thwa) & (G<thwa) & (B<thwa),
then it is determined as y=m=c=0 (where thwa is a threshold value).
8) Y pixel determining:
if (ry==1) & (yg==0) & (RGB difference>thy),
then it is determined as y=1 and m=c=0 (where thy is a threshold value).
9) G pixel determining:
if (yg==1) & (gc==0) & (RGB difference>thg),
then it is determined as c=y=1 and m=0 (where thg is a threshold value).
10) C pixel determining:
if (gc==1) & (cb==0) & (RGB difference>thc),
then it is determined as c=1 and m=y=0 (where thc is a threshold value).
11) B pixel determining:
if (cb==1) & (bm==0) & (RGB difference>thb),
then it is determined as m=c=1 and y=0 (where thb is a threshold value).
12) M pixel determining:
if (bm==1) & (mr==0) & (RGB difference>thm),
then it is determined as m=1 and y=c=0 (where thm is a threshold value).
13) R pixel determining:
if (mr==1) & (ry==0) & (RGB difference>thr),
then it is determined as y=m=1 and c=0 (where thr is a threshold value).
14) BK pixel determining:
it is determined as y=m=c=1 if any of the conditions of the above 7) through 13) are not met.

Furthermore, the determination of w pixel for color determining is performed. If the conditions (R<thw) & (G<thw) & (B<thw) are met, the object for color pixels is determined as w pixels and the signal is output as w (where thw is a threshold value).

Here, the priority of the above conditions 7) through 14) is given to the smaller one of the number. The threshold values thwa, thy, thm, thc, thr, thg and thb are the predetermined threshold values before the copy processing. The relation between thw and thwa is set as thw>tha.

The output signal is 1 bit of w of the color pixel detection for a color determining, and each further with 1-bit 3-bit data of c, m, and y. For every color hue region, changing the threshold value for every color hue here determines the threshold value according to the color hue region, when the chromatic range differs. This color separation is an example and may use what formula. The outputs c, m, y, and w of the color-separation unit 325*a* are supplied to the line memories 325*b*–325*e*. The data of the five lines are stored therein and they are supplied to the color pixel determining unit 325*f*.

1.6.4 Color Pixel Determining Unit 325*f*

Figure 6:
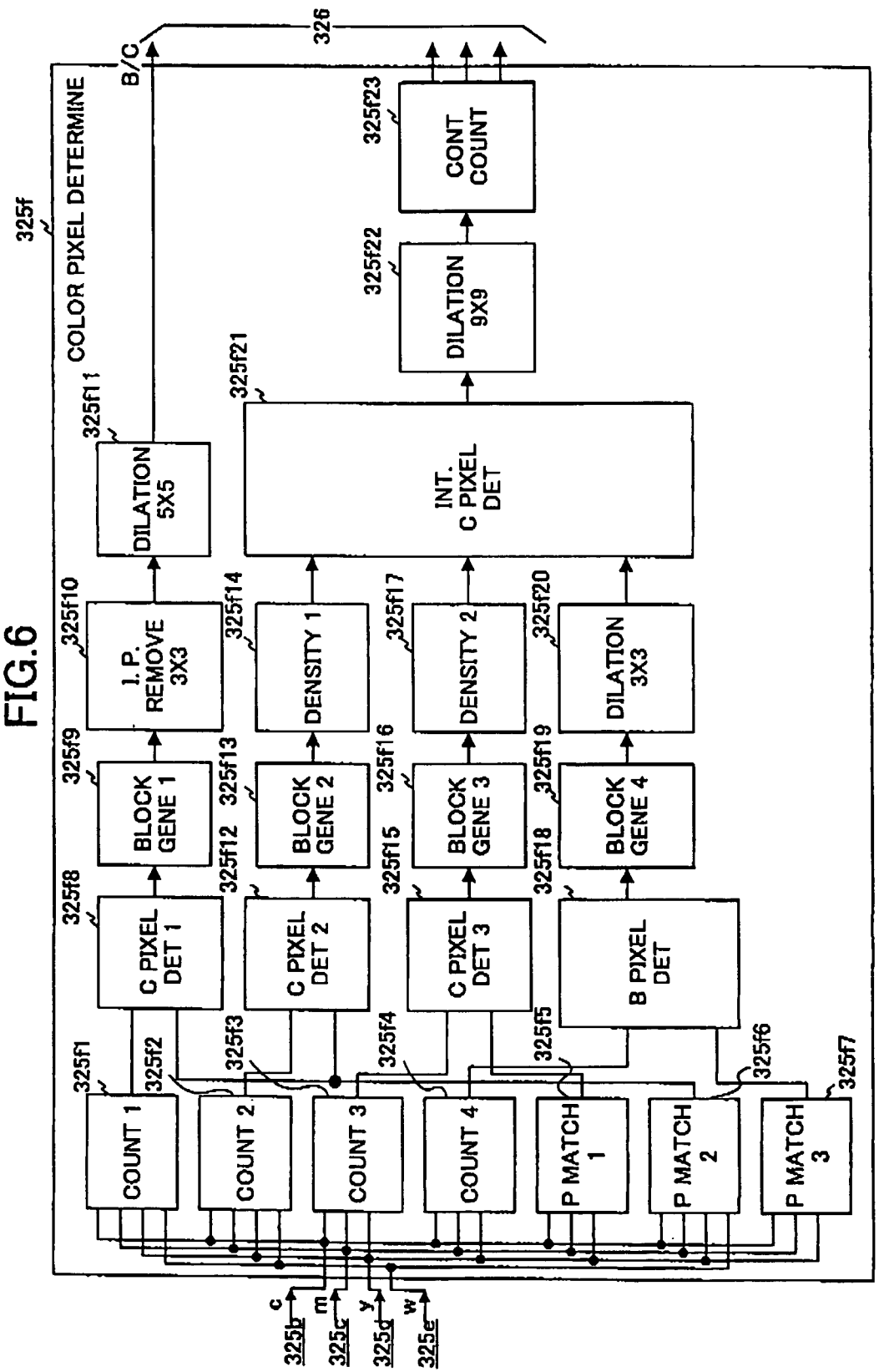
FIG. 6 is a block diagram of a color-pixel determination unit in the document recognition part in FIG. 4.

The configuration of the color pixel determining unit 325*f* is shown in FIG. 6. The data of c, m, y, and w for the five lines are supplied to each of the pattern matching sections 325*f*5–325*f*7, and the count sections 325*f*1–325*f*4. A description will now be given of the pattern matching unit 325*f*6 in the flow in which the B/C signal is determined.

Pattern Matching Unit 325*f*6

When w pixel for color pixels exists, the unit 325*f*6 rectifies it to c=m=y=0 of the pixel. By this compensation, the white level of the 5×5-pixel matrix centering on the target pixel becomes large.

Next, it is determined whether this 5×5-pixel matrix matches with the following pattern whether all of c, m, and y of the pixel which the target pixel judged by the color-separation unit 325*a* are (c=m=y=1) or all the pixels (color pixels) are other than zero (c=m=y=0).

1) Color Pixel Pattern Group 1-1 Pattern 1-1 (pm1)
D23 & D33 & D43

1-2 Pattern 1-2 (pm2)
D32 & D33 & D34

1-3 Pattern 1-3 (pm3)
D22 & D33 & D44

1-4 Pattern 1-4 (pm4)
D24 & D33 & D42

The center pixel (target pixel) is D33.

These patterns pm1–pm4 are shown in FIG. 16. The white circle on these patterns shows that at least one of c, m, and y is 1. The pattern matching is adopted for not gathering an isolated point. On the contrary, in case of a dot of a small area color detection is carried out, the center pixel is determined as (c=m=y=1) or the pixels (color pixel) are other than zero (c=m=y=0).

2) The Pattern Group for the Color Thin Line

Figure 17:
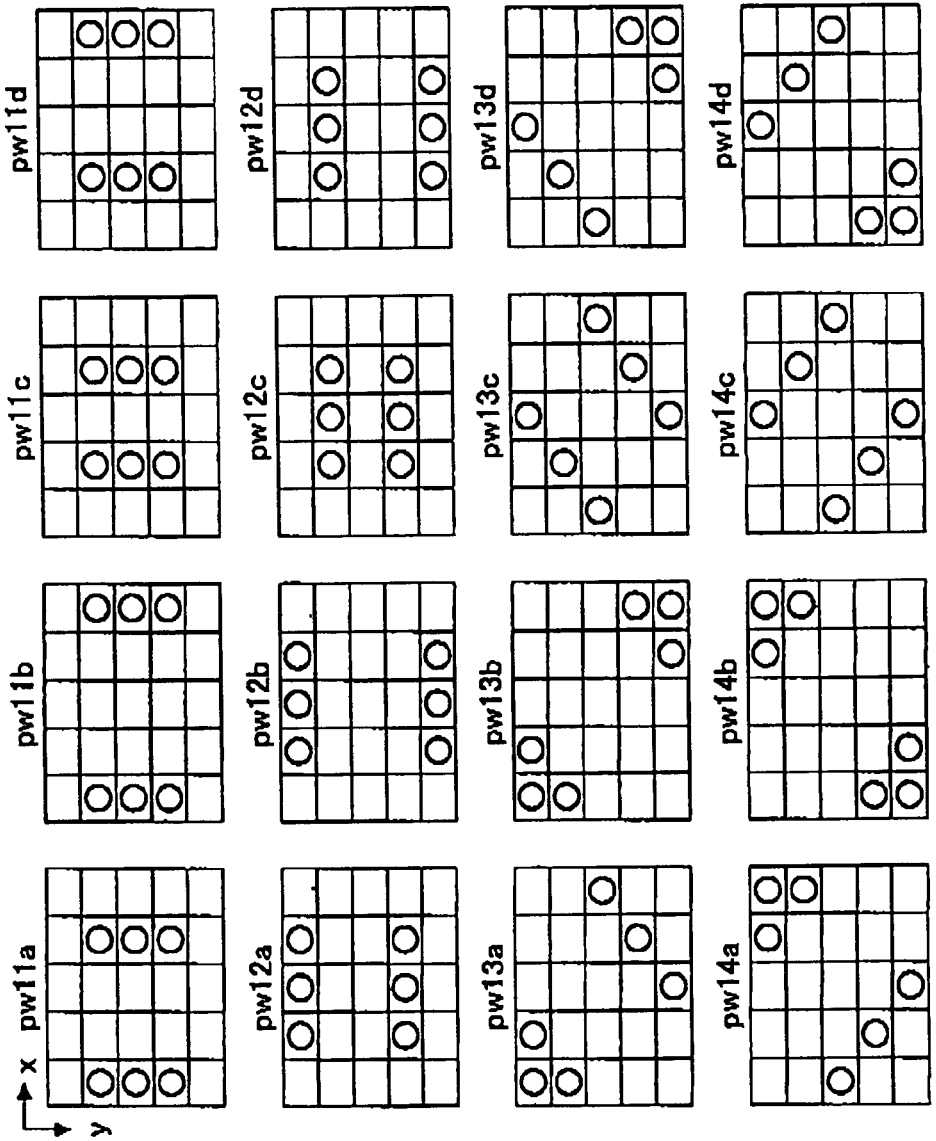
FIG. 17 is a diagram for explaining a set of color thin-line patterns used for detection of a color line surrounded by white regions.

The color thin line surrounded by white is detected. The pattern used for this is shown in FIG. 17. In FIG. 17, all of c, m, and y of the pixel which is indicated by the white circle are the pixels of 0. If the distribution of the data (c, m, y) of the 5×5-pixel matrix centering on the target pixel (center pixel) matches with either of the patterns pw11*a*–pw14*d* of FIG. 17, it is determined that the target pixel at that time (center pixel) is the color line pixel.

2-1) Pattern 2-1 (pw11*a*–pw11*d*)
((D12&D13&D14) & (D42&D43&D44)) #
((D12&D13&D14) & (D52&D53&D54)) #
((D22&D23&D42) & (D42&D43&D44)) #
((D22&D23&D42) & (D52&D53&D54))

2-2) Pattern 2-2 (pw12*a*–pw12*d*)
((D21&D31&D41) & (D24&D34&D44)) #
((D21&D31&D41) & (D25&D35&D45)) #
((D22&D23&D24) & (D24&D34&D44)) #
((D22&D23&D24) & (D25&D35&D45))

2-3) Pattern 2-3 (pw13*a*–pw13*d*)
((D11&D21&D12) & (D35&D44&D53)) #
((D11&D21&D12) & (D45&D44&D55)) #
((D13&D22&D31) & (D35&D44&D53)) #
((D13&D22&D31) & (D45&D44&D55))

2-4) Pattern 2-4 (pw14a–pw14d)
((D13&D24&D35) & (D41&D51&D52)) #
((D14&D15&D25) & (D41&D51&D52)) #
((D13&D24&D35) & (D31&D42&D53)) #
((D14&D15&D25) & (D31&D42&D53))

3) White Region Pattern Group

Figure 18:
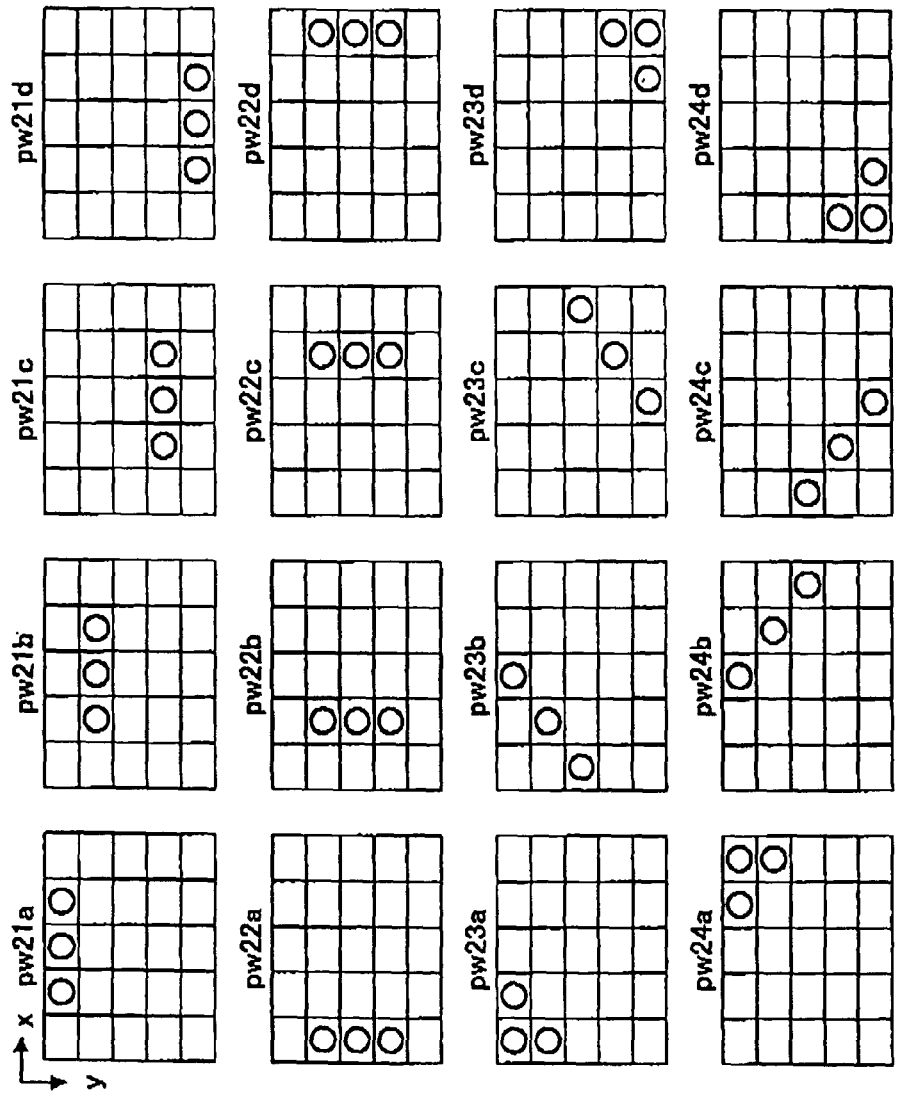
FIG. 18 is a diagram for explaining a set of patterns used for pattern matching f a region where c, m and y pixel values are set to zero.

For all of c, m, and y are 0, pattern matching is performed. The pattern used for this is shown in FIG. 18. In FIG. 18, all of c, m, and y of the pixel which is indicated by the white circle are the pixel of 0. If the distribution of the data (c, m, y) of the 5×5-pixel matrix centering on the target pixel (center pixel) matches with either of the patterns pw21a–pw24d of FIG. 18, it is determined that the target pixel at that time (center pixel) is a white region pixel.

3-1) Pattern 3-1 (pw21a–pw21d)
(D21&D31&D41) #
(D22&D32&D42) #
(D24&D34&D44) #
(D25&D35&D45).

3-2) Pattern 3-2 (pw22a–pw22d)
(D12&D13&D14) #
(D22&D23&D24) #
(D42&D43&D44) #
(D52&D53&D54).

3-3) Pattern 3-3 (pw23a–pw23d)
(D52&D51&D41) #
(D53&D42&D31) #
(D35&D24&D13) #
(D25&D15&D14).

3-4) Pattern 3-4 (pw24a–pw24d)
(D54&D55&D45) #
(D53&D44&D35) #
(D31&D22&D13) #
(D21&D11&D12).

4) Determination of the Color Pixel Candidate 2

It is detected that the pixel is a color pixel candidate 2 for color determining, if the pattern matching result extracted above is in agreement with the following patterns:
((pm1==1) &
((pw11==1) # (pw21!=1))) #
((pm2==1)
& ((pw12==1) # (pw22!=1))) #
((pm3==1) &
((pw13==1) # (pw23!=1))) #
((pm4==1) &
((pw14==1) # (pw24!=1))).

Here, the (pm1==1) means that the distribution is the pattern centering on the target pixel data matching with the pattern pm1. (pw11==1) means matching with either of the patterns pw11a–pw11d. (pw21!=1) means matching with either of the patterns pw21a–pw21d. & means the logical sum, and # means the logical product.

When a white region exists, this pattern matching by making into a color pixel candidate the color pixel surrounded by the white region, it does not consider as a color pixel. What is in agreement by color pixel pattern matching without a white region serves as a color pixel candidate.

1.6.5 Count Unit 325f1

The inside of the 5×5-pixel matrix centering on the target pixel, or the object for color determining when w pixels exist, c and m judged by the color-separation unit 325a of the pixel, and y data are rectified to c=m=y=0. By this compensation, the white level of this pixel matrix becomes large. And the number of c, m and y (c=1, m=1, y=1) of each pixel in this pixel matrix is counted. As for c, m and y, the difference of the maximum and the minimum value of the count value about each pixel is larger than thcnt and if the minimum value is under thmin, it is determined as the color pixel candidate 1. thcnt and thmin are predetermined threshold values before the copy processing.

Plain deployment is carried out at y, m, and c, the number is counted for every plain in the matrix of N×N pixels, and the minimum value is assumed to be black.

By this, even if the reading of a black pixel leaks, the compensation becomes possible. And the chromatic pixel is judged with the difference of maximum and the minimum value. By this, a black pixel rectifies the pixel from which it separated from the reading, and the chromatic pixel is extracted. The target pixel is made into the chromatic pixel if the chromatic pixel of a fixed pixel is in the 5×5-pixel matrix centering on a target pixel.

1.6.6 Color Pixel Determining Unit 325f8

Based on the outputs of the count unit 325f6 and the pattern matching unit 325f6, it is determined whether it is a color pixel by the color pixel determining units 325f8. It is the color pixel candidate 1 if it is detected as the color pixel candidate 1 and the color pixel candidate 2.

1.6.7 Block Generating Unit 325f9

Block generation is carried out by the block generating unit 325f9 based on the output of the color pixel determining unit 325f8. In a 4×4-pixel matrix, if block generation has the color pixel 11 pixels or more, it will output this whole 4×4-pixel matrix as the color pixel 1 block. The processing of the block output is carried out after the block generating unit 325f 9 makes the block data of 4×4 pixels.

1.6.8 Isolated Point Removal Unit 325f10

In the isolated point removal unit 325f10, the block data is processed so that, when there is no block of the color pixels adjacent to the target block, the block data are detected as the isolated points and they are removed as the isolated points.

1.6.9 Dilation Unit 325f11

In the dilation unit 325f11, when the isolated point removal unit 325f10 detects that the block of color pixel 1 exists, the dilation to the 5×5 pixel block is performed by the dilation unit 325f11. When the block exists, it expands to the 5×5 block. Expanding is the circumference of the color pixels. It is for not carrying out the black character processing for the neighborhood.

Here, the B/C signal that is set to L (chromatic) is output at the time of color pixel 1 block. Otherwise, the B/C signal that is set to H (non-chromatic) is output.

1.6.10 Count Unit 325F2

The inside of the 5×5-pixel matrix centering on the target pixel, or the object for color determining, when w pixels exist, the c and m judged by the color-separation unit 325a, and y data are rectified to c=m=y=0. By this compensation, the white level of this pixel matrix becomes large. And the number of c, m, and y1 (c=1, m=1, y=1) of each pixel in this pixel matrix is counted. As for the c, m, and y, when the difference of the maximum and the minimum of the count value for each, is larger than thacnt and the minimum value is below thamin, it is determined that the target pixel is a color pixel candidate 1. The threshold values thacnt and thamin are predetermined before the copy processing.

1.6.11 Color Pixel Determining Unit 325F12

Based on the outputs of the count unit 325/12 and the pattern matching unit 325/6, it is determined whether it is a color pixel by the color pixel determining unit 325/12. It is detected as the color pixel candidate 1 and the color pixel candidate 2, it is determined as the color pixel 2.

1.6.12 Block Generating Unit 325/13

The block generation is carried out based on the output of the color pixel determining unit 325/12 by the block generating unit 325/13. That is, in a 4×4-pixel matrix, if there is one or more blocks of the color pixel 2, it will be outputted, using this whole 4×4-pixel matrix as color pixel 2 block. The processing after the block generating unit 325/13 makes the block of 4×4 pixels, and the block unit output is provided.

1.6.13 Density Unit 325/14

For removal of the isolated block, the active conditions in the 3×3 block (the color pixel 2 block) will make the target block active block (the color pixel 2 block), if those with three or more pieces and target block become active (color pixel).

1.6.14 Count Unit 325/3

The number of c, m, and y (c=1, m=1, y=1) of each pixel in the 5×5-pixel matrix centering on the target pixel is counted. As for the c, m and y, if the difference of the maximum and the minimum value of the count value about each and the minimum value is more than tha1cnt, and counted is less than tha1min, it is determined as the color pixel candidate 3. The tha1cnt and tha1min are predetermined threshold values before the copy processing.

1.6.15 Pattern Matching Unit 325/5

The pixel (c, m, y) judged by the color pixel detection and the pattern matching by using a 5×5-pixel matrix for whether it is a color pixel. The matching patterns are the same as those of the pattern matching unit 325/6. Let the pixel which is in agreement by pattern matching be the color pixel candidate 4.

1.6.16 Color Pixel Determining Unit 325/15

If it is detected as the color pixel candidate 3 and the color pixel candidate 4, it is determined as the color pixel 3.

1.6.17 Block Generating Unit 325/16

The block generation is carried out based on the output of the color pixel determining unit 325/15 by the block generating unit 325/16. That is, in a 4×4-pixel matrix, if there are one or more blocks of the color pixel 3, it is outputted as the blocks using this whole 4×4-pixel matrix as the color pixel 3 block. The processing after the block generating unit 325/16 makes the 4×4 block, and carries out the block unit output.

1.6.18 Density Unit 325/17

For removal of isolated blocks, the active conditions in 3×3 block (the color pixel 3 block) will make the target block active block (the color pixel 3 block), if those with three or more pieces and target block become active (color pixel 3).

1.6.19 Count Unit 325/4

The number of c, m, and y1 (c=1, m=1, y=1) judged by color-separation unit 325a of each pixel in the 5×5-pixel matrix centering on the target pixel is counted. If the minimum value of each count value of c, m, and y becomes more than thabk, it will make a target pixel the black pixel candidate 1. thabk is a predetermined threshold value before the copy processing.

1.6.20 Pattern Matching Unit 325/7

The pattern matching is performed for the 5×5-pixel matrix centering on the target pixel and the pixel of c=m=y=1. The pattern matching is performed as follows.

1-1) Pattern 1-1 (pm1)
 D23&D33&D43

1-2) Pattern 1-2 (pm2)
 D32&D33&D34

1-3) Pattern 1-3 (pm3)
 D22&D33&D44

1-4) Pattern 1-4 (pm4)
 D42&D33& D24

The pixel patterns are indicated in FIG. 16 and the pixel that is indicated by the round mark all over the figure is a pixel of c=m=y=1. It is the target drawing when in agreement with one of these patterns. Let the target pixel be the black pixel candidate 2.

1.6.21 Non-chromatic Determining Unit 325/18

If the target pixel is detected as the black pixel candidate 1 and the black pixel candidate 2, it is determined as a black pixel.

1.6.22 Block Generating Unit 325/19

The block generation is carried out based on the outputs of the preceding units by the block generating unit 325/19. With the block generation here, in a 4×4-pixel matrix, if there are one or more blocks of black pixel 1, it will be outputted, using this whole 4×4-pixel matrix, as the black pixel block. The processing after the block generating unit 325/19 makes the 4×4 pixels 1 block, and carries out the block unit output.

1.6.23 Dilation Unit 325/20

The inside of 3×3 block's matrix or the target block is active (black pixel block) if the neighboring pixels becomes non active (non-black pixel) and the target block is non active (non-black pixel block), the determination is carried out.

1.6.24 Integrated Color Pixel Determining Unit 325/21

If it is detected by the color pixel determining unit 325/12 that the target block is active (color pixel 2) and it is detected by the non-chromatic determining unit 325/18 as that it is active (black pixel), the target block is determined as a color (color block). Moreover, when it is detected as being active (color pixel) by the color pixel determining unit 325/12, it is determined as a color (color pixel).

1.6.25 Dilation Unit 325/22

The target block will be made into active block if 1 block also has active block in the matrix of 9×9 block centering on target block in order to consider by 21 that a small character is continuation to block who judged with the color 325f of comprehensive color pixel determining units. Here, it is for filling the crevice between characters to make it expand greatly.

1.6.26 Continuation Count Unit 325F23

Figure 7:
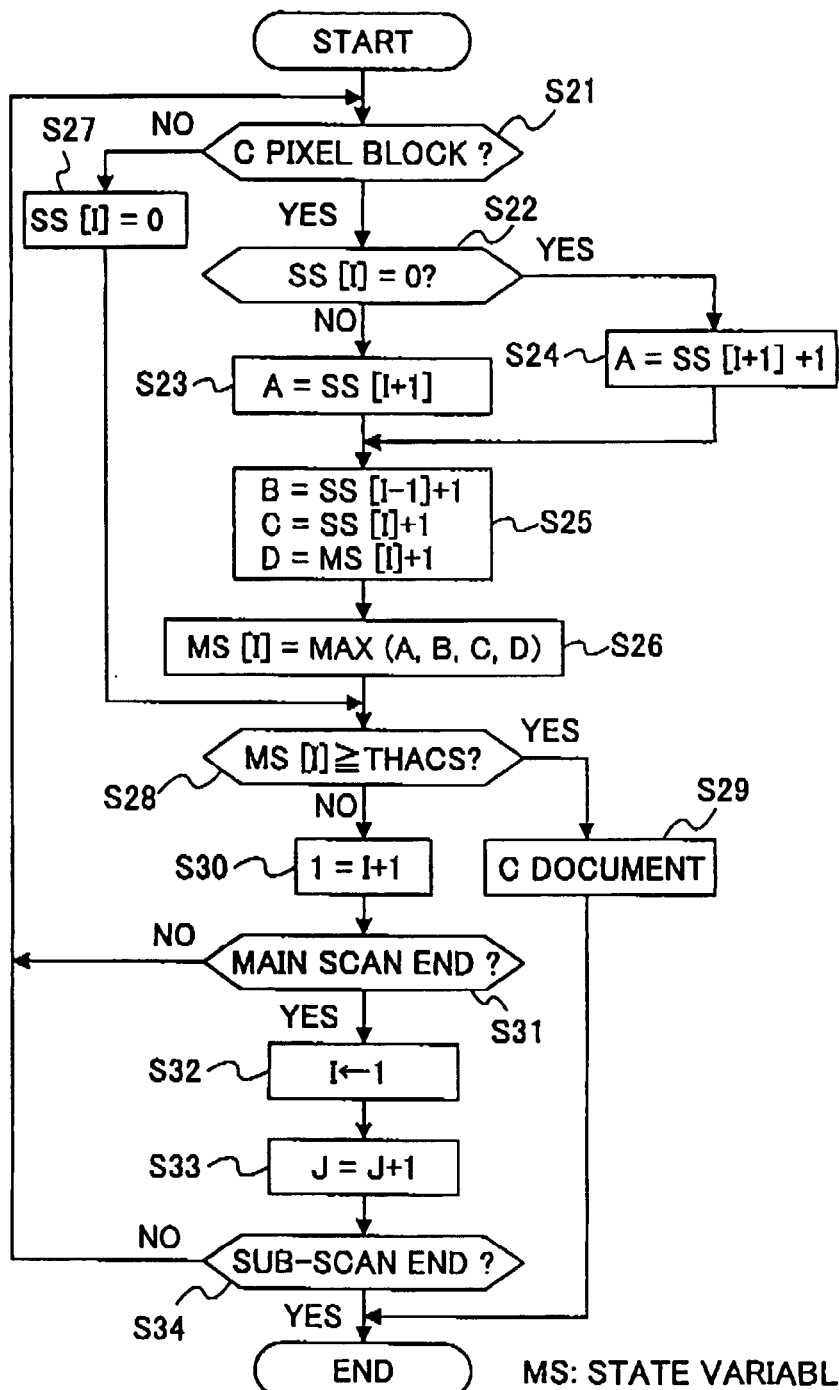
FIG. 7 is a flowchart for explaining a color document determination process which is performed based on the count value of a continuous counter in FIG. 6.

The continuation count unit 325/23 detects that the color pixel block's continuity is seen, and a color document or monochrome document is judged. By counting the number of continuation of the color pixels in the output data (color pixel block) of the dilation unit 325/22, it is determined whether it is a color document. The contents of this determination processing are shown in FIG. 7. When the color pixel block has a target pixel, with reference to the number of color pixel continuation of the pixels of the upper right and the left, the number of color pixel continuation of the target pixel is computed the upper left of the target pixel, and the top (Steps S21–26). Here, when the target pixel is made into c3 pixel of the 5×5-pixel distribution pattern MPp of FIG. 11, the pixel of the upper right and the left is the pixel of b2, b3, b4, and c2 the upper left and the top, respectively. When the color pixel block does not have a target pixel, the number of color pixel continuation which becomes zero is given to it (Steps S21–27). When the color pixel block has a target pixel, the number of color pixel continuation of the upper pixel (b3) of a target pixel (c3) is checked first (Step S22). The value which added 1 at the number of color pixel continuation of an upper right pixel (b4) at the reference value A as the number of color pixel continuation of an upper pixel (b3) is 0 is given (Step S24). The number of color pixel continuation of the upper right pixel (b4) is given to the reference value A as the number of color pixel continuation of an upper pixel (b3) is 0 (Step S23).

Next, the value which added 1 at the number of color pixel continuation of an upper left pixel (b2) is given to the reference value B, and the value which added 1 to the number of color pixel continuation of an upper pixel (b3) is given to the reference value C, and the value which added 1 to the number of color pixel continuation of a left pixel (c2) is given to the reference value D (Step S25).

And let the highest value of the reference values A, B, C, and D be the number of color pixel continuation of a target pixel (c3) (Step S26). When the number of color pixel continuation is given to the target pixel (c3) as mentioned above, it is the number of color pixel continuation. It confirms whether it is above the threshold value THACS (Step S28). When the number of color pixel continuation is larger than the THACS, it determined as a color document (Step S29). Then, the processing of the continuation count unit 325/23 is finished. When the number of color pixel continuation is below the threshold value THACS, the target pixel is updated to the scanning direction x and the next pixel of y, and the processing is repeated.

As a result of the processing about the whole document surface, when the number of color pixel continuation is below the threshold value THACS, it is determined to the last that (Step S30–34) and the document is a monochrome document.

Figure 19:
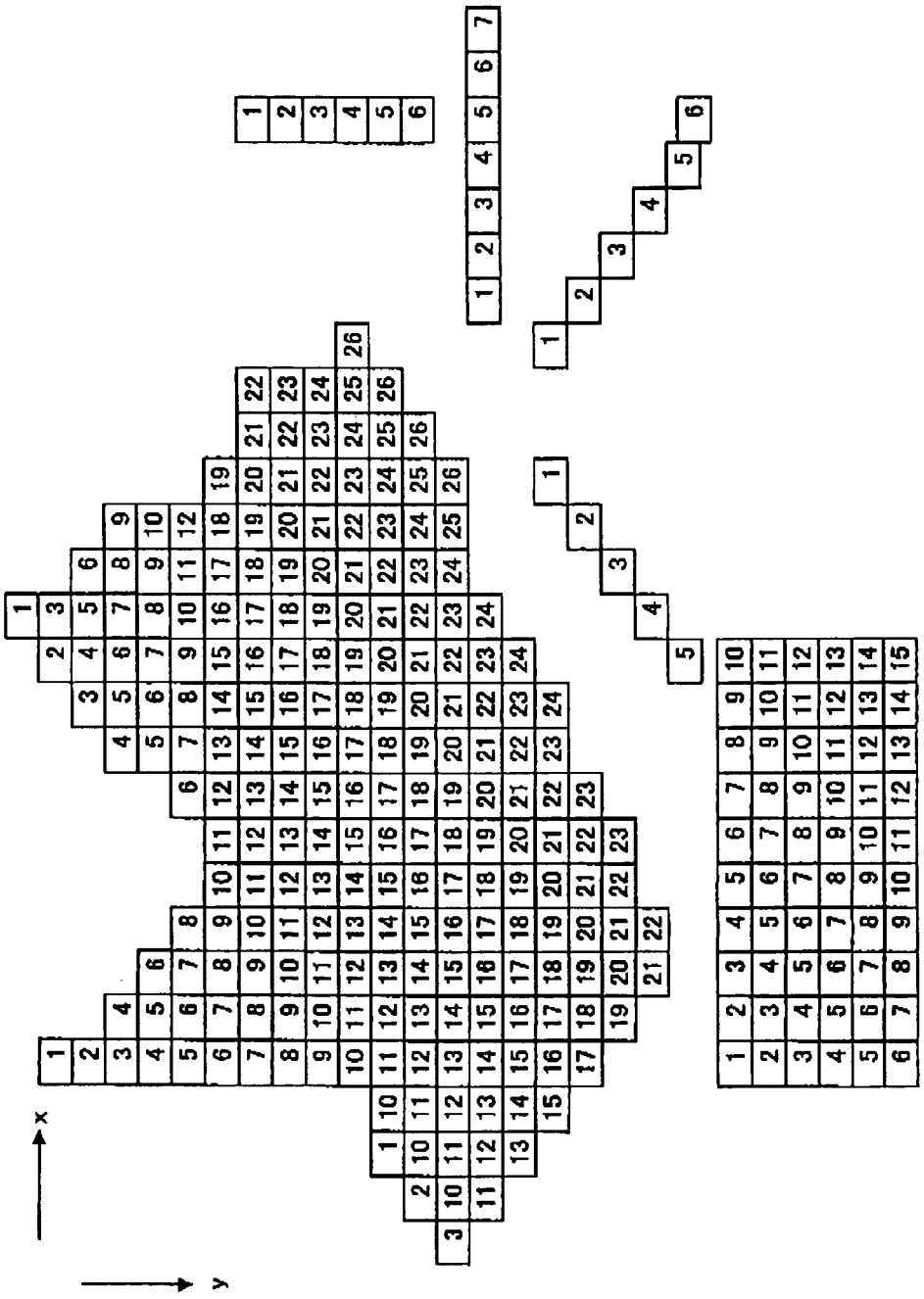
FIG. 19 is a diagram for explaining an example of a white-pixel continuation count.

The concrete data of the number of color pixel continuation is shown in FIG. 19. The small crossroads into which the number shown in FIG. 19 is put are color pixels, and the number is the number of color pixel continuation given to this pixel. The block with the small crossroads into which the number is put is connected is the color pixel group, and it is a color in one on the same document of the color pixel groups. When at least the one number of the pixel continuation becomes above the threshold value THACS, it is a color document. A color or monochrome determination is decided (Steps S28–29). It divided for making high determination accuracy of a color document or monochrome document with the color pixel determining units 325/8 to 325/15. Even if the color pixel determining for black character processing carries out an incorrect determining, it is local and is not so much conspicuous. However, the determination of a color document or monochrome document will influence the whole document, if an incorrect determining is carried out. Then, the count units 325/1–/4 are made independent. If the color-separation unit 325a is made independent although it is better to make it independent of color-separation unit 325a, since the memory of pattern matching units 325/5–/7 will increase, it is not desirable.

With the parameter (the color pixel candidates 1 and 3, black pixel candidate 1) of the count unit 325/1–/4, the increase in the amount of memories is lessened by having changed the parameter (color pixel 1–3) of the color pixel. The color pixel determining units 2 and 3 (325/12, 325/15) are formed for detecting the color with low density like the yellow of fluorescence.

1.6.27 Integrated Determination Unit 326

The integrated determination unit 326 includes the character determining unit 326a and the dilation processing unit 32, as shown in FIG. 4. It further includes the character-inside determination unit 326c and the decoding unit 326d.

1.6.28 Character Determining Unit 326A

The result of the edge extraction unit 322 is the edge region, and the result of the character determining unit 326a is the dot region. When the result of the white region extraction unit 323 is with a white region without a dot in the result of the appearance unit 324, it judges with character edge.

Figure 25:
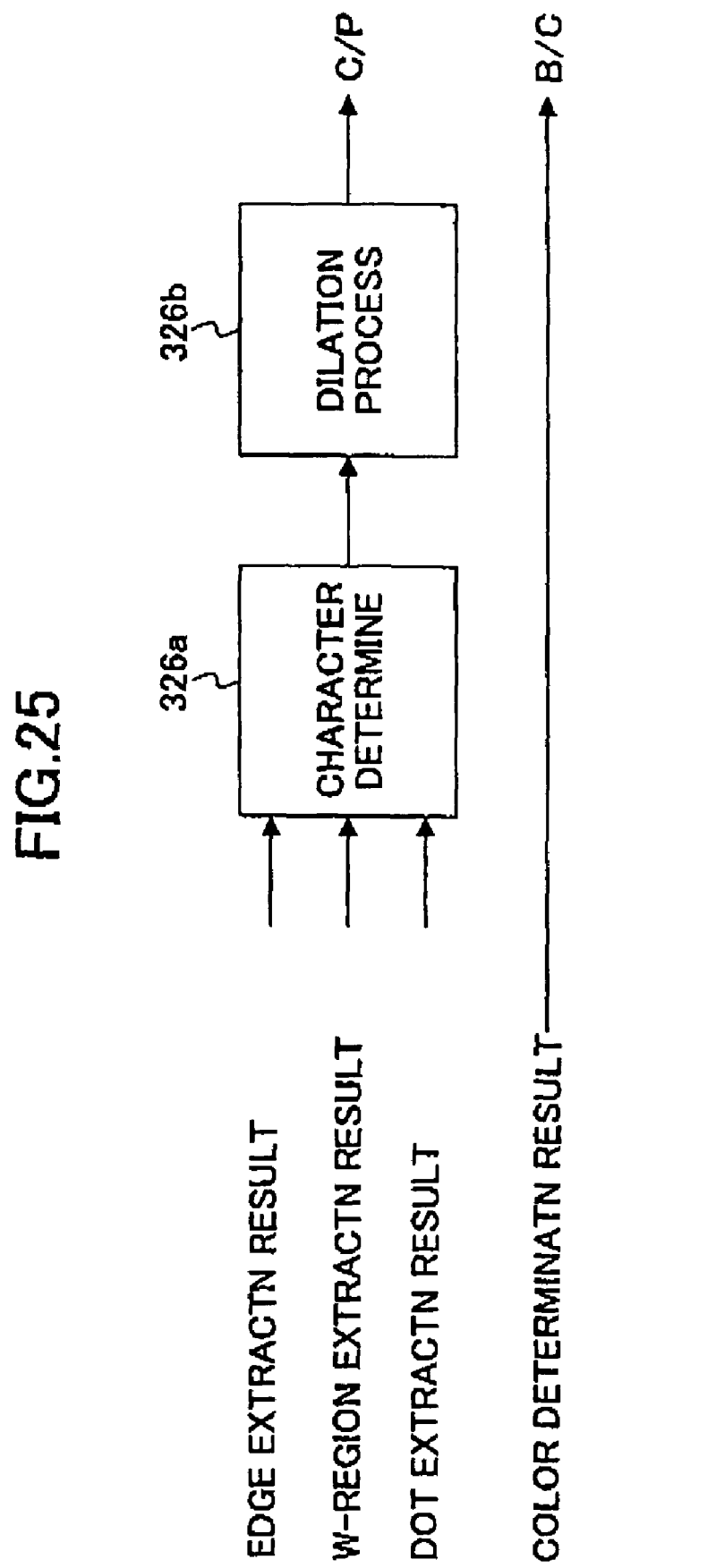
FIG. 25 is a diagram for explaining a process performed by an integrated determination unit in FIG. 4.

When that is not right, it judges with non-character edge (inside of a pattern or a character), and the result is outputted to dilation processing unit 326b, as shown in FIG. 25.

1.6.29 Dilation Processing Unit 326b

In the dilation processing unit 326b, the OR processing of a 8×8 block is carried out for the result of the character determining unit 326a, the AND processing of a 3×3 block is carried out after that, and the dilation processing of 4 blocks is performed. That is, one block of 8×8 block centering on the target block assumes that the target block is also it a character edge block that it is character edge, and decides target block with character edge as all 3×3 block centering on this target block is character edge, and it is considered that 3 block and a total of four block who adjoin it with target block are character edge.

It is because sense of incongruity may be felt according to the difference of processing, for example, black looks thin, when the non-black character region of a small region exists around the region of a black character in the case of a black character especially to carry out AND processing, after carrying out OR processing. In order to prevent this, the non-black character region is enlarged by OR processing. It has gone in order to make AND processing into the amount of dilation which should be desired. By the way, since scan is made for a color copying device to carry out the copy of one sheet 4 times, character determining results differ delicately for every scan. If a non-black character determining is carried out at the time of black imaging and a black character determining is especially carried out at the times other than black imaging, since this black character region will become thin, at the time of bk, OR processing of 8×8 block is carried out, the AND processing of 3×3 block is carried out after that, OR processing of 5×5 block is carried out at the time of imaging other than bk, and AND processing of 1×1 block is carried out after that.

Figure 20:
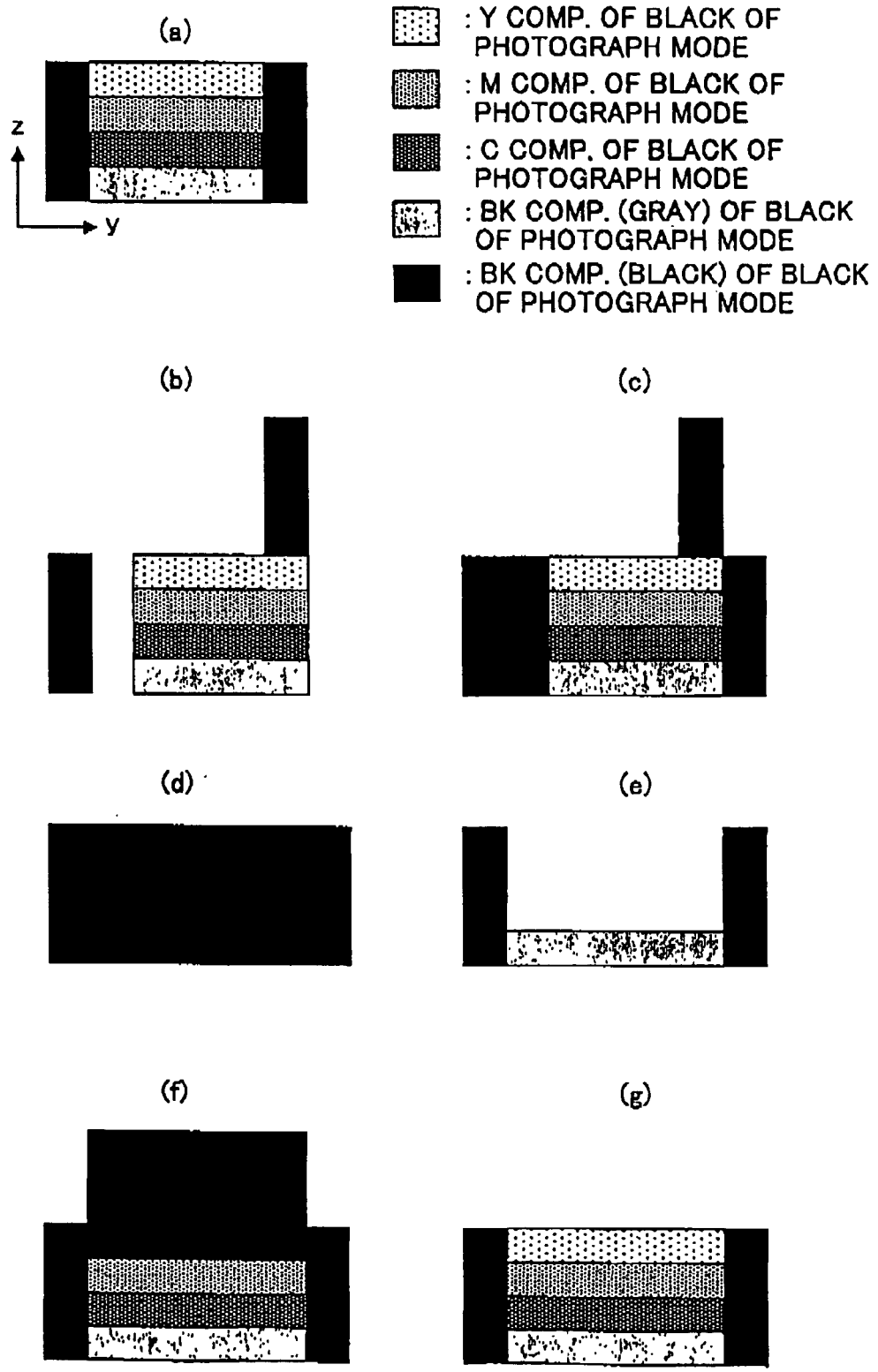
FIG. 20 is a diagram for explaining the overlapping of color toners used in color copying.

In addition, since the result becomes the same as that of processing before, it is saying that processing of what is not carried out, either and this is to say that AND processing of 1×1 is carried out. The result of dilation processing is outputted to 326d of decoding units as a character edge signal. Thus, by carrying out dilation processing, it is lost that separation results differ and the region of a character becomes thin. Although the amount of the central unit may become deep by this dilation processing, since density will be saturated to the edge of a character if the inside of a character is thin, there is no sense of incongruity. The overlap of the coloring agent by color copy is typically expanded to FIG. 20, and is shown in it. (d) of FIG. 20 shows the case of the ideal in which four colors carried out black character processing. (e) of FIG. 20 carries out black character processing of the four colors, only bk does not require compensation but the case where compensation started and it becomes thin except bk is shown. The suitable case where (f) of FIG. 20 carries out black character processing only of the bk by this preferred embodiment is shown, and (g) of FIG. 20 is bk by this preferred embodiment.

The amount of dilation has the same as (a) of FIG. 20, and it shows the ideal case in which the black character processing is performed. In FIG. 20, (b) indicates the case when the amount of dilation is the same, the black character processing is carried out and the printing position shifts (it escapes white). (c) of FIG. 20 indicates the case of the present embodiment where the amount of dilation of bk is large. The case in which the black character processing is performed and the printing position shifts.

1.6.30 Decoding Unit 326d

The C/P signal that is finally output by the decoding unit 326d is defined as follows.

| C/P Signal | Character Edge Signal | |
|---|---|---|
| 0 | None | |
| 1 | Exist | character edge region |

Moreover, the color determining unit 325 outputs the B/C signal, as shown in FIG. 4 and FIG. 25.

Referring back to FIG. 3, the C/P signal and the B/C signal, which the document recognition unit 320 generates A/C signal is the RGB filter unit 330, the color compensation unit 340, the size change unit 350, the CMYBk interchange unit 352, the UCR section 360, the CMYBk filter unit 370. It synchronizes with the Bk gamma compensation unit 380 and the gradation processing unit 390 for the image data. The RGB filter unit 330 is a filter which carries out the MTF compensation of the RGB data. It is each image data to the coefficient matrix corresponding to a pixel matrix and each coefficient of N×N. It includes the logic circuit which obtains the multiplication of weighted average value.

The color compensation unit 340 is the primary masking processing about the R, G and B data, and it is converted to the C, M and Y data The size change unit 350 performs the expansion or reduction of the main scanning direction x for the image data, or the same size processing is performed. The UCR section 360 is for raising color reappearance of the image data, and is color assistant. The common portions of the CMY data which are inputted from the UCR unit 340 (the color addition/removal process). The Bk data is generated and the C, M, Y and Bk data are outputted. When the C/P signal is not one (character edge region), or hen it is a character region or a pattern region, the skeleton black processing is performed.

When the C/P signal is 3 (character edge region), the full-black processing is performed. Furthermore, when the C/P signal of the data of C, M, and Y is 1 (character edge region) and the B/C signal is H (non-chromatic region). This is for expressing only of a black ingredient at the time of a black character. Moreover, the point is one color among C, M, Y, and Bk, and the output image signal IMG of the UCR section 360 is the field sequential output temporarily. That is, the full color (four colors) data is generated by performing document reading 4 times.

Moreover, since it is good by one Bk imaging at the time of monochrome copy, it is good at one document reading. If there is a determination mechanism of a color document and monochrome document, since it will end by the number of times of reading according to the document, it becomes unnecessary for an operator to judge and copy a color document or monochrome document according to a document.

In the above preferred embodiment, the B/C signal is a signal referred to the determination of a color document or a monochrome document. When the B/C signal is H (non-chromatic region) all over a document, the main controller 10 judges with monochrome document. The CMYBk filter unit 370 performs the smoothing and the clearness processing using the space filter of N×N size according to the frequency characteristic and the C/P signal of the color printer 400. The CMYBk gamma compensation unit 380 changes and processes a gamma curve according to the frequency characteristic and the C/P signal of a color printer 400. Using the gamma curve which reproduces a picture faithfully when a C/P signal is 0 (pattern region), when the C/P signal is 3 (character edge region), the gamma curve is made to stand and contrast is emphasized. The gradation processing unit 390 quantizes the dither processing, the error diffusion processing, etc. according to the gradation characteristic and the C/P signal of the color printer 400. At the time of Bk imaging, when a C/P signal is 0 (pattern region), the gradation serious consideration is processed, and when other, it is processing of resolution serious consideration. At the time of imaging other than Bk, when the C/P signal is 0 (pattern region), it is the gradation serious consideration. It processes, and when other, resolution serious consideration is processed. The image data which is processed more than is a color printer which has a buffer memory from the video control 359. It is given to the writing unit 400 synchronizing with the image data. The above IPU 300 at the time of pattern processing (C/P signal=0) of the RGB filter unit 330, the smoothing processing is carried out.

On the other hand, the edge emphasis processing is performed in the RGB filter unit 330, the full black processing is performed in the UCR section 360, in the CMYBk gamma compensation unit 380, the curve which is the contrast as important is chosen at the time of character processing (BIC signal=L and C/P signal=1), and it performs processing which is the resolution as important in the CMYBk filter unit 370 and the gradation processing unit 390.

Moreover, at the time of the picture formation of C, M, and Y except Bk, C, M, and Y data are not printed as black character processing (it is B/C signal=H at C/P signal=1). This is for preventing coloring for a position gap of the surroundings of a black character.

Moreover, from the time of a color character, the RGB filter unit 330 of Bk data at this time may perform edge emphasis strength, and may carry out it distinctly.

As described in the foregoing, the IPU 300 of the first preferred embodiment performs selectively one of the four kinds of image processing for each of a graphic pattern region, a character edge region, a character-on-graphic region and a character inside region.

2. Second Preferred Embodiment

In the second preferred embodiment, the image processing apparatus is configured so that the low-linear-density dot of 100 or less lines and the low-linear-density dot of 65 or more lines can be detected and suitable image processing can be performed according to the linear density of the detected dot. Fundamentally, the elements of the image processing apparatus are equivalent to the filter unit of 1.2.3, the dot extraction unit of 1.6.2, and the color determining unit of 1.6.2 in the first preferred embodiment. Hereinafter, only different features of the second preferred embodiment than the filter unit of 1.2.3, the dot extraction unit of 1.6.1 and the color determining unit of 1.6.2 of the first preferred embodiment will be explained.

In the present embodiment, the document recognition unit 320 is shown in FIG. 3. In addition, based on the density of R, G and B data, the image region where those data is addressed, a character edge region (edge region of a character or a line drawing), a dot region, a low-linear-density dot region, or a graphic pattern region (photograph or picture region which is a non-dot region or a non-dot region) is judged, and the C/P signal and the B/C signal are given to the main controller 10 through the RGB filter 330 and the interface 353. The C/P signal and the B/C signal are defined as follows.

C/P signal: a 2-bit signal.
"3" indicates a low-linear-density dot region.
"2" indicates a dot region.
"1" indicates a character edge region.
"0" indicates a pattern region.

B/C signal: a 1-bit signal.
H ("1") indicates a non-chromatic region.
L ("0") indicates a chromatic region.

2.1 Filter Unit 321

The filter unit 321 mainly rectifies the G image data generated by the scanner 200 in the extraction of the edge of a character. Here, the data read with the scanner 200 may be fading by the performance of a lens etc., and it covers an edge emphasis filter. However, it is not necessary to emphasize the image edge on a document simply and to emphasize the line pattern for gradation expression which has spread through a copying device widely here. If a line pattern is emphasized, since a pattern (gradation expression region by the line pattern) may be extracted as edge and an erroneous determination may finally be carried out to character edge, it is necessary to make it not emphasize. Moreover, as shown in FIG. 8, since repetition periodicity differs, the line-pattern A of 600 dpi and the line-pattern B of 400 dpi are difficult for making it not emphasize by the same filter coefficient. Therefore, according to the latter amount detection of the features (edge extraction, white region detection), either the maximum of the operation result of 2 coefficients or the minimum value is used. In addition, in FIG. 8, the sum with the black 1 block width which touches the white 1 block width of the main scanning direction x and it is a line pitch (width: constant pixels of a predetermined number), i.e., periodicity, white block width spreads at the time of a low density middle tone, and black block width becomes narrow. The white block width becomes narrow and black block width spreads as it becomes a high density middle tone.

In the present embodiment, as five pixels of the number of pixels 7x secondary scanning direction y of the main scanning direction x (the mechanical document scanning direction of a scanner 200), as shown to block of the filter 321 on FIG. 4, the pixel matrix of the filter processing unit 321 There are two coefficient groups (coefficient matrix) A and B which addressed each weighted coefficients a1–a7, b1–b7, c1–c7, d1–d7, and e1–e7 to each addressing to a pixel. The following coefficient group A is a coefficient for filter processing which controls emphasis of line-pattern A of 600 dpi of FIG. 8, and moreover emphasizes the edge of a character, and the coefficient group B is a coefficient for filter processing which controls emphasis of line-pattern B of 400 dpi of FIG. 8, and moreover emphasizes the edge of a character. As to these coefficient groups, it is the same as the coefficient groups A and B explained in the filter unit 321 of 1.2.3 of the first preferred embodiment.

In addition, in the filter unit 321, the coefficient group A and the coefficient group B are calculated, and the minimum value of the calculation result/16+ target pixel is supplied to the edge extraction unit 322, and the maximum value of the calculation result/16+ target pixel is supplied to the white region extraction unit 323.

The coefficients A and B are the Laplacians, they are the division by the predetermined coefficient (16), are added to the target pixel and rectified.

The minimum value of the calculation result is outputted to the edge extraction unit 322 for avoiding that the white level may not be extracted, when the structure of a character is carrying out the shape of line patter alignment. The maximum value of the calculation result is outputted to the white region extraction unit 323 for making it be easy to become a pattern by the time (for example, output of a copying device) of a pattern being the structure of a line pattern. It is made easier to make edge easier to gather in the edge extraction unit 322 by doing in this way, and to gather as a pattern in the white region detection unit 323. In the present embodiment, although the case of two coefficients has been described, the effect that at least three or more coefficients are the same is acquired.

In addition, although the mode which refers to G image data to edge processing is shown in FIG. 4, the present invention is not limited to only G image data. Another image signal or intensity signal may be applicable if the signal indicates a density of the image.

2.2 Dot Extraction Unit 324'

Figure 26:
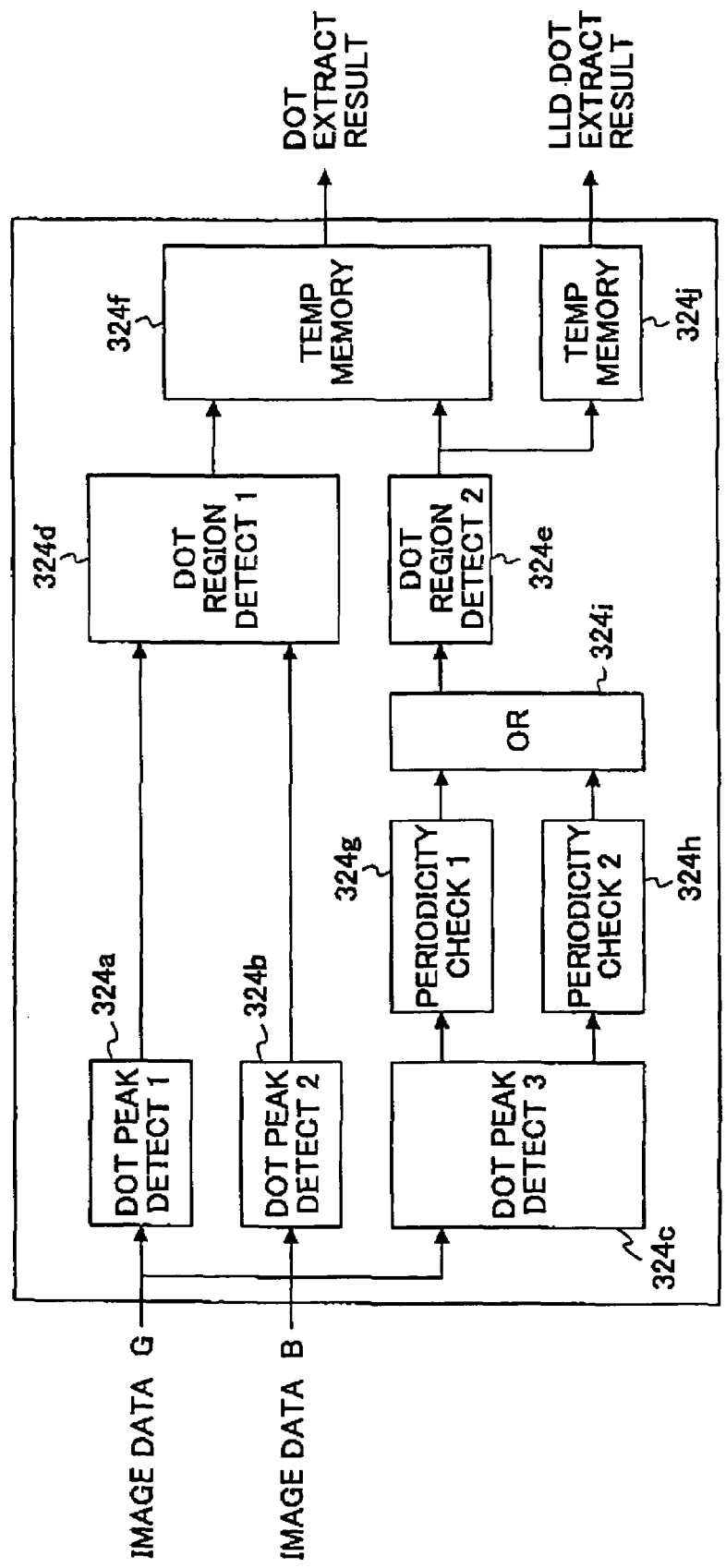
FIG. 26 is a block diagram of a dot extracting unit in a second preferred embodiment of the image processing apparatus of the present invention.

The dot extraction unit 324' in the present embodiment constitutes the dot extraction unit 324 (N) in FIG. 23, as shown in FIG. 26.

Namely, attain to the latter unit of 3rd dot peak detection unit 324c the 324g of the 1st periodicity check units, and the 324h of the 2nd periodicity check units is prepared in it in parallel. It constitutes so that OR circuit 324i may be prepared in 324h in series and the output of OR circuit 324i may be supplied to 2nd dot detection unit 324e 324g of both periodicity check units, and further, it constitutes so that the output of 2nd dot region detection unit 324e may be supplied to 2nd temporary memory means 324j.

The detection result of the low-linear-density dot of the 100 or less line and 65 lines or more is stored in the 2nd temporary memory means 324j.

With reference to FIG. 26, a description will be given of the detection processing of the 3rd dot peak detection unit 324c' in the 2nd preferred embodiment.

The third dot peak detection unit 324c' is provided to detect both the 100 or less lines and the more than 65 lines (newspaper dot).

The third dot peak detection unit 324c' includes the mask of a 7×7-pixel matrix (if become common and shown N×N pixel matrix) as a local region. Having adopted the matrix of 7×7 for separating a low-linear-density dot is based on the following reasons. That is, the periodicity will be set to 9.23 if it reads by 600 dpi by 65 lines at the time of zero screen angle. Here, since monochrome dots which the periodicity leaves most are at 45 deg screen angle, monochrome dot is doubled 1.41 and serves as a periodicity 13. If it is going to detect the peak of the dot of this periodicity 13, it will become the matrix of 13/2=6.5. And since a dot is divided and detected in a mountain and a valley (a dot with deep density, and thin dot), the matrix size of a dot serves as the maximum matrix 50%.

Then, there should just be a matrix corresponding to one half of the periodicity. By such reason, it considers as the pixel matrix of 7×7.

When the 7×7 pixel matrix is shown in the pattern of (c) in FIG. 24, the density Lc of the center pixel group used as the target pixel is the maximum or the minimum as compared with the density groups L1–L8 of the neighboring pixels. And when the following conditions are met:

$abs(2Lc-L1-L8)>=Lth$ and $abs(2Lc-L2-L7)>=Lth$ and $abs(2Lc-L3-L6)>=Lth$ and $abs(2Lc-L4-L5)>=Lth$ the center pixel (Lc) of the mask is detected as a peak dot pixel. The "abs" function means taking an absolute value, and "Lth" is a threshold value (fixed value).

Here, it outputs to the first periodicity check unit 234g by making a peak dot pixel in case the center pixel (Lc) of the mask is the maximum value into a peak dot pixel (the upper peak). Moreover, it outputs to the second periodicity check 324h by making a peak dot pixel in case the center pixel (Lc) of the mask is the minimum value into a peak dot pixel (the lower peak).

Specifically, the neighboring pixels are the pixels which are shown in FIG. 24(a) and which carried out the neighboring pixels distribution pattern. When one of the peak dot pixel detection based on the neighboring pixels distribution pattern detects with a peak dot pixel, the detected signal with which a peak dot pixel is expressed to the target pixel at that time (center pixel d4) is given. Two patterns are used because it corresponds to the rate of dot area of a dot broadly.

With reference to the neighboring pixels, it asks for the density of Lc as follows.
Lc=Min (d4, d3, d4, c4, e4)

At the time of this Lc being the maximum one of the neighboring pixels, the pattern is as follows.
L1=Max (a1, a2, b1)
L2=Max (a3, a4, a5)
L3=Max (a6, a7, c7)
L4=Max (c1, d1, e1)
L5=Max (c7, d7, e7)
L6=Max (f1, g1, g2)
L7=Max (g3, g4, g5)
L8=Max (g6, g7, f7)

In the above pattern, it means making maximum of the density of pixels a1, a2, and b1 into the value of L1 of the peak dot pixel detection operation in L1=Max (a1, a2, b1). Lc=Min (d4, d3, d4, c4, e4) means the minimum value of the density (image data) of d4, d3, d4, c4, and e4.

Moreover, Lc=Max (d4, d3, d4, c4, e4).

At the time of this Lc being the minimum value of the neighboring pixels, the pattern is as follows.
L1=Min (a1, a2, b1)
L2=Min (a3, a4, a5)
L3=Max (a6, a7, c7)
L4=Max (c1, d1, e1)
L5=Max (c7, d7, e7)
L6=Max (f1, g1, g2)
L7=Max (g3, g4, g5)
L8=Max (g6, g7, f7)

Moreover, since the expansion or reduction of the sub-scanning direction y is performed by controlling the document scanning speed of the scanner 200, and the image data with expansion or reduction of the sub-scanning direction y given is provided by the scanner 200. Then, at the time of reduction, the pattern (b) shown in FIG. 24 is used. At the time of expansion, the pattern (a) shown in FIG. 24 is used.

The calculation formula of the third dot peak detection unit 324c' is not calculated by 1-pixel data, but is calculated by a plural-pixel data (operation of min and max), and the target pixel for the plural pixels is referred to.

It is not determined by 1 pixel in this way and the periodicity becomes large for the dot of a low-linear-density. The present embodiment refers to the neighboring pixels, and it will lessen the influence of a noise and will reduce the amount of arithmetic operations. The calculation formula can be used in common for other blocks, and the configuration of the apparatus also becomes easy.

In the first periodicity check 1 unit 324g, the periodicity of an upper-peak dot and an upper-peak dot is checked. That is, the interval of the upper-peak dots of the one-dimensional main scanning direction is checked. Since the peak dot detection is made for 100 or less lines of the linear density, the number of upper-peak dots is 8 or more. For the case of less than eight, an erroneous determination of the small character is likely to be carried out. This embodiment is a case at the time of 600 dpi reading.

Figure 27:
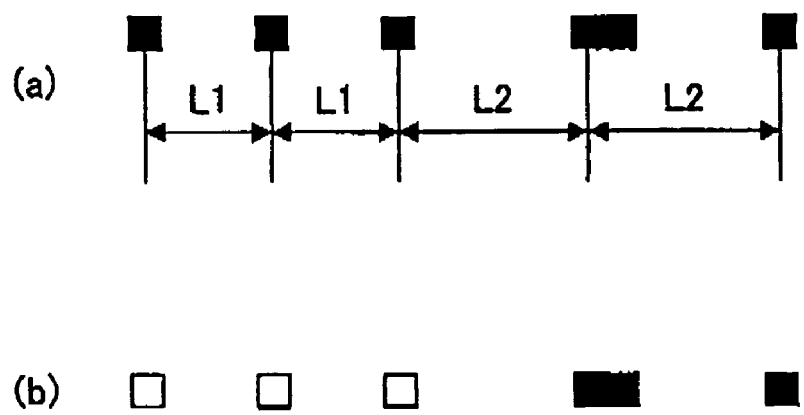
FIG. 27 is a diagram for explaining a process performed by a third dot peak detector in the second preferred embodiment.

For example, since the case where L1 is a character with the small upper-peak dot of L1 interval if L2 are 10 in 6 is most as shown in FIG. 27(a), the upper-peak dot is removed. Since the case where L2 interval is a low-linear-density dot is most, the removal is not carried out. When the low-linear-density dot is made into 100 or less lines, the threshold value of the periodicity determining can be calculated as follows.

That is, by 100 lines, if it reads by 600 dpi at the time of zero degree screen angle, the periodicity will become 6. Since monochrome dots are 45 degree screen angle when a low-linear-density dot is limited only to black and white, since only monochrome document generally exists, the periodicity of the monochrome dot will be 8.46 by multiplying the periodicity of the zero degree case by 1.41.

Since this is the dot of 100 or less lines when the periodicity is eight or less, it repeals input data here. Thereby, what was in the state of a dot as shown in FIG. 27(a) is rectified by repealing eight or less periodicity in the 324g of the 1st periodicity check units by the state of saying that there is no dot as shown in FIG. 27(b).

In addition, the periodicity 8 is a periodicity chosen on the above reading conditions, and it cannot be overemphasized that it can change suitably according to design conditions.

Moreover, in the second periodicity check unit 324h, a lower-peak dot is detected similar to the first periodicity check unit 324g. Periodicity detection of an upper-peak dot and periodicity detection of a lower-peak dot are independently performed. In about 50% of the ratio of dot area, an upper-peak dot and a lower-peak dot appear alternately, and the exact periodicity does not appear.

Thus, the outputs of the first periodicity check unit 324g and the second periodicity check unit 324h in which the periodicity check has been performed are supplied to the OR circuit 324i, and the logical sum of the two data is taken by the Or circuit 324i, and then the logical sum is supplied to the second dot region detection unit 324e.

In the second dot region detection unit 324e, OR processing of the output of the first and second periodicity check units 324g and 324h is performed, and the calculation of the upper and lower peak dot pixels is performed for every 2-dimensional small region of a predetermined size. The total number of the upper and lower peak dot pixels calculated is considered as a count value P for the small region.

When the count value P is larger than the threshold value Pth, it is determined that all the pixels of the small region are a dot region. Or, in the case of the processing of each pixel unit, only the center pixel of the small region is determined as being a dot region. The determination result is stored in the temporary memory 324f.

Furthermore, in the second dot region detection unit 324e, the logical sum of the outputs of the first and second periodicity check units 324g and 324e is taken, and the calculation of the upper and lower peak dot pixels is performed for every 2-dimensional small region of a predetermined size. The sum of the upper and lower peak dot pixels calculated is considered as a count value P for the small region. When the count value P is larger than the threshold value Pth, it is determined that all the pixels of the small region are a dot region. Or, in the case of the processing of each pixel unit, only the center pixel of the small region is determined as being a dot region. The determination result is stored in the second temporary memory 324j.

When either the determination result of the first dot region detection unit 324d or the determination result of the second dot region detection unit 324e is a dot region, the threshold value Pth is adaptively changed according to the dot/non-dot determining result of the processed region in the vicinity of the small region currently observed (the feature information on surrounding). In the present embodiment, two values TH1 and TH2 (however, TH1>TH2) are prepared as the threshold value Pth. The value of one of these is chosen by the determination result of the processed region, which is temporarily stored in the temporary memory 324d as the target small character region.

That is, since the possibility of being a line drawing region is high when a nearby region is judged to be a non-dot region, in order to reduce incorrect detection, TH1 to which conditions become severe is chosen as threshold value Pth. On the other hand, since a possibility of being a dot region is high when judged with a region being a dot region soon, TH2 to which conditions become loose is used as threshold value Pth. In addition, TH1 is chosen as an initial value of threshold value Pth.

The distribution of the small region is shown in AMP on FIG. 14. Each of S1–S4 of the small region distribution pattern AMP is a small region (block) with the size of 4×4 pixels, and suppose that they are the small regions in which the small region S4 is being observed and the processing of the small regions S1, S2 and S3 is finished.

When it is determined that all of the small regions S1, S2, and S3 are a dot region, the threshold value Th2 is used as the threshold value Pth for the determination of the small region S4 of interest. When it is determined that at least one of the small regions S1, S2 and S3 is a non-dot region, the threshold value TH1 is chosen as the threshold value Pth. When it is determined that the small region is a dot region, the dot region detection signal ht "1" is output by the dot extraction unit 324. Otherwise the dot region detection signal ht "0" is output by the dot extraction unit 324.

2.3 Integrated Determination Unit 326

Figure 28:
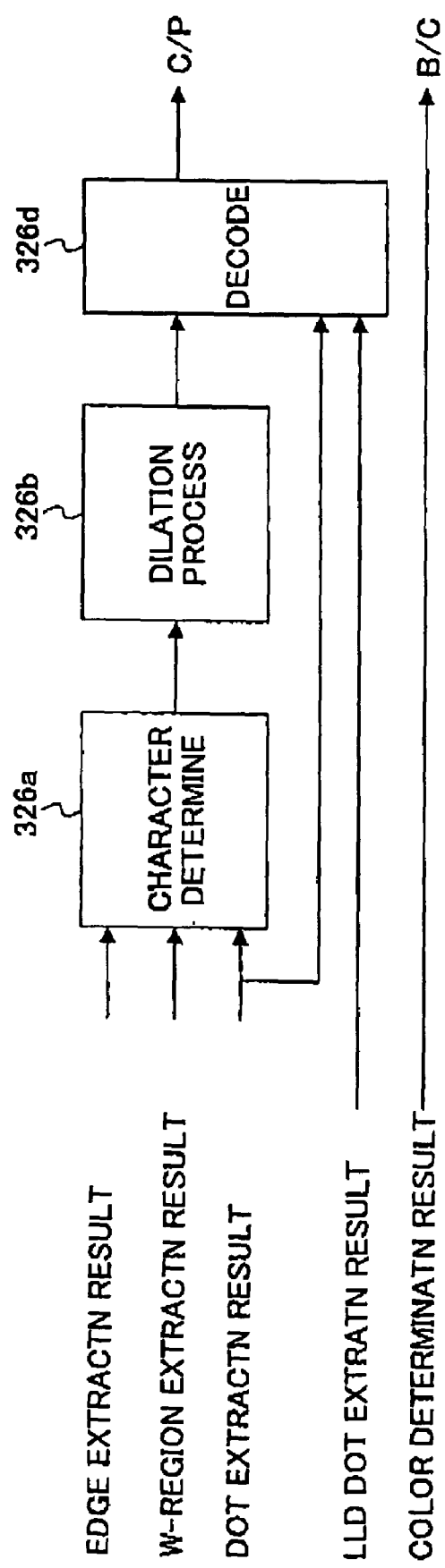
FIG. 28 is a diagram for explaining a process performed by an integrated determination unit in the second preferred embodiment.

The integrated determination unit 326 includes the character determining unit 326a, the dilation processing unit 326b, the character-inside determination unit 326c, and the decoding unit 326d, as shown in FIG. 4. FIG. 28 shows a process performed by the integrated determination unit 326 of the present embodiment.

2.3.1 Character Determining Unit 326a

The character determining unit 326a determines "with character edge" when the result of the edge extraction unit 322 is "with edge" and the result of the white region extraction unit 323 is "with white region" and the result of the dot extraction unit 324 is "without dot". Otherwise, the character determining unit 326a determines "with non-character edge (graphic pattern or character inside). The result is outputted to the dilation processing unit 326b, as shown in FIG. 28.

2.3.2 Dilation Processing Unit 326b

The dilation processing unit 326b carries out OR processing of the 8×8 blocks for the result of the character determining unit 326b, and thereafter carries out AND processing of the 3×3 blocks, and performs dilation processing of the 4 blocks. When one block of the 8×8 blocks centering on the target block is a character edge, the target block is also determined as being a character edge block. When all the 3×3 blocks centering on the target block is a character edge, the target block is determined as being a character edge. And it is determined that the target block and the three blocks adjacent to the target block, or a total of four blocks, are a character edge.

The AND processing is performed after the OR processing is performed because there is the case of a black character in which the sense of incongruity in the resulting image may occur according to the difference of the image processing methods if the non-black character small regions exist around the black character region. In such a case, the black character looks too thin. In order to prevent this problem, the non-black character region is enlarged by the OR processing, and them the AND processing is performed to obtain the desired amount of dilation.

By the way, since scan is made for a color copying device to carry out the copy of one sheet 4 times, character determining results differ delicately for every scan. If a non-black character determining is carried out at the time of black imaging and a black character determining is especially carried out at the times other than black imaging, this black character region will become thin. At the time of a black character determining, OR processing of 8×8 block is carried out, and AND processing of 3×3 block is performed after that. At the time of imaging of a non-black character, OR processing of 5×5 block is carried out, and AND processing of 1×1 block is performed after that. In addition, since the result becomes the same as that of processing before, it is saying that processing of what is not carried out, either the AND processing of 1×1 block is carried out. The result of dilation processing is outputted to decoding 326d as a character edge signal.

Thus, by carrying out the dilation processing, it is lost that separation results differ and the region of a character becomes thin. Although the amount of the center pixel of a character may become deep by this dilation processing, the inside of the character is saturated to the edge of the character, and the sense of incongruity does not occur.

FIG. 20 shows the overlapping of color toners used in a typical color copying. In FIG. 20, (d) indicates the case of the ideal overlapping in which the black character processing is carried out for the four colors. In FIG. 20, (e) indicates another case in which the black character processing is carried out for the four colors, and the compensation is not performed only for the bk color but it is performed for the other colors. In this case, there is a problem that the black character may become thin.

In FIG. 20, (f) indicates a suitable case in which the black character processing according to the present embodiment is performed only for the bk color. In FIG. 20, (g) indicates a suitable case in which the black character processing according to the present embodiment is performed only of the bk color, and the the compensation is not performed only for the bk color but it is performed for the other colors.

In FIG. 20, (a) indicates the ideal case in which the amount of dilation is the same and the black character processing is performed. In FIG. 20, (b) indicates the case in which the amount of dilation is the same and the black character processing results in a deviation of the print position (white is included). In FIG. 20, (c) indicates the case in which the amount of dilation for the bk color is large and the black character processing of the present embodiment results in a deviation of the print position.

2.3.3 Decoding Unit 326d

The C/P signal which is finally output by the decoding unit 326d is as in the following tables:

| C/P Signal | Character Edge Signal | Dot Extract Result | LLD Extract Result | Kind of Region |
|---|---|---|---|---|
| 0 | None | None | None | graphic |
| 1 | Exist | X | X | char. edge |
| 2 | None | Exist | None | dot |
| 3 | None | None | Exist | LLD dot | wherein "X" indicates "don't care".

Referring back to FIG. 3, the C/P signal and the B/C signal, which are generated by the document recognition unit 320, are supplied, in a cascaded manner synchronized with the image data, to the RGB filter unit 330, the color compensation unit 340, the size change 350, the interface 352 unit, the UCR section 360, the CMYBk filter unit 370, the CMYBk gamma compensation unit 380, and the gradation processing unit 390.

The RGB filter unit 330 is a filter which carries out the MTF compensation of the RGB data, and it includes a coefficient matrix corresponding to an N×N pixel matrix, and includes a logic circuit which multiplies the respective coefficients of the coefficient matrix by each of the pixels of the image data and obtains a weighted average value thereof.

When the C/P signal indicates "1" (a character edge region), the coefficient matrix for clearness processing is used. When the C/P signal indicates "0", "2" or "3" (a graphic pattern region, a low-linear-density dot region or a dot region), the coefficient matrix for smoothing processing is used. The weighted average value is calculated and it is supplied to the color compensation unit 340.

The effect of smoothing provided by the smoothing filter is high for a low-linear-density dot region, intermediate for a dot region, and low for a graphic pattern region. This is because the dot structure will remain if the smoothing does not strengthen the dot, and it becomes the cause of moire. Furthermore, it is necessary to make the dot of a low linear density flat and smooth more strongly than the dot of a high linear density.

The color compensation unit 340 changes the R, G, and B data into the C, M, and Y data by the primary masking processing etc. The size change unit 350 performs expansion and reduction, or same size processing for the image data in the main scanning direction x.

The UCR section 360 is provided for raising color reappearance of the image data, and it carries out the UCR processing of the common portions of the C, M and Y data supplied from the color compensation unit 340, and generates Bk data. The UCR section 360 outputs the resulting C, M, Y and Bk data.

When the C/P signal indicates the value other than "1" (character edge region), the skeleton black processing is performed (when it is a character inside region or a graphic pattern region). When the C/P signal is "3" (low-linear-density dot region), the full black processing is performed. When the C/P signal indicates "1" (character edge region) and the B/D signal indicates H (non-chromatic region), the data of C, M, and Y is erased. This is because the representation of the image is made with only the black component.

Moreover, the temporary point is one color among C, M, Y and Bk, and the output image signal IMG of the UCR section 360 is the field sequential one-color output. The full color (four colors) data is generated by performing the document reading 4 times. Moreover, since it is good by one Bk imaging at the time of monochrome copy, it is good at one document reading. If there is the determination mechanism of a color document or a monochrome document, it will end by the number of times of reading according to the document, and it becomes unnecessary for the operator to judge and copy the color or monochrome document according to the document. In the present embodiment, the B/C signal is the signal referred to the determination of the color document or the monochrome document. When the B/C signal is H (non-chromatic region) in all over the document, the main controller 10 determines the monochrome document.

The CMYBk filter unit 370 performs the smoothing and clearness processing by using the space filter of N×N matrix size according to the frequency characteristic and the C/P signal of the color printer 400. The CMYBk gamma compensation unit 380 changes and processes the gamma curve according to the frequency characteristic and the C/P signal of the color printer 400. Using the gamma curve which reproduces the image faithfully when the C/P signal does not indicates "1" (except a character edge region), when the C/P signal indicates "1" (character edge region), the gamma curve is made to stand and the contrast is emphasized.

The gradation processing unit 390 performs the quantization of the dither processing, the error diffusion processing and the like according to the gradation characteristic and the C/P signal of the color printer 400. At the time of the Bk imaging, when the C/P signal does not indicate "1" (except a character edge region), the gradation intensified processing is performed. Otherwise, the resolution intensified processing is performed. At the time of imaging other than Bk, wben the C/P signal indicates "0" (graphic pattern region), the gradation intensified processing is performed. Otherwise, the resolution intensified processing is performed.

The image data which is thus processed is supplied to the color printer 400 from the video control unit 359 having the buffer memory by synchronizing with the image data writing operation.

In the above-described IPU 300, when the image data is other than a character region (C/P signal=except 1), the smoothing processing is performed by the RGB filter unit 330, the skeleton black processing is performed by the UCR section 360, the linearity (gradation) intensified gamma curve is selected by the CMYBk gamma compensation unit 380, and the gradation intensified processing is performed by the CMYBk filter unit 370 and the gradation processing unit 390.

On the other hand, when the image data is a character region (the B/C signal=L and the C/P signal=1), the edge emphasis processing is performed by the RGB filter unit 330, the full black processing is performed by the UCR section 360, the contrast intensified gamma curve is selected by the CMYBk gamma compensation unit 380, and the resolution intensified processing is performed by the CMYBk filter unit 370 and the gradation processing unit 390.

Moreover, when the image data is a black character region (the B/C signal=H and the C/P signal=1), at the time of the image formation of C, M, and Y colors except Bk, the C, M, and Y color data are not printed during the black character processing. This is because the coloring at the surrounding regions of the black character is avoided. Moreover, at the time of the black character processing, the RGB filter 330 of the Bk data may perform the edge emphasis processing more intensively than in the color character processing.

As described in the foregoing, the IPU 300 of the second preferred embodiment performs selectively one of the four kinds of image processing for each of a graphic pattern region, a character edge region, a dot region and a low-linear-density dot region.

The present invention is not limited to the above-described embodiments, and variations and modifications may be made without departing from the scope of the present invention.

Further, the present invention is based on Japanese priority application No. 2001-157506, filed on May 25, 2001, and Japanese priority application No. 2002-137710, filed in May 13, 2002, the entire contents of which are hereby incorporated by reference.

What is claimed is:

1. An image processing apparatus which processes image data and outputs the processed image data, comprising:
   a maximum/minimum density detecting unit detecting whether a first pixel has a maximum or minimum density among a group of pixels;
   a determination unit determining whether the absolute value of a difference between the average density of pairs of pixels and the density of the first pixel is larger than a predetermined threshold value, wherein said pairs of pixels are within said group of pixels, and wherein said first pixel is located between the pixels of said pairs of pixels;
   a peak pixel detecting unit detecting a peak pixel when said first pixel has a maximum or minimum density among said group of pixels and the absolute value of the difference between the average density of said pairs of pixels and the density of the first pixel is larger than the predetermined threshold value; and
   a dot region detecting unit for detecting a dot region based on a relationship between the number of peak pixels in a two-dimensional target region and the number of peak pixels in two-dimensional neighboring regions of the target region.

2. An image forming apparatus, comprising: the image processing apparatus of claim 1; and an image output device printing an image based on image data processed by the image processing apparatus.

3. The image forming apparatus of claim 2 further comprising a control unit which analyzes an externally supplied print command and controls the image output device to perform the printing of the image based on the processed image data in accordance with the print command.

4. A color copier, comprising: the image processing apparatus of claim 1; an image reading device reading image data from a document by color separation and supplying the image data to the image processing apparatus; and an image printing device forming a reconstructed image based on processed image data output by the image processing apparatus and printing the reconstructed image.

5. An image processing apparatus which processes image data and outputs the processed image data, comprising:
   a determination unit determining whether the absolute value of a difference between the average density of pairs of pixels at positions symmetrical with respect to a center pixel and the density of the center pixel is larger than a predetermined threshold value;
   a peak pixel detection unit detecting a peak pixel when the center pixel has a maximum or minimum density among a group of pixels, and the absolute value of the difference between the average density of the pairs of pixels and the density of the center pixel is larger than the predetermined threshold;
   a dot region detecting unit detecting a dot region based on a relationship between the number of peak pixels in a two-dimensional target region and the number of peak pixels in two-dimensional neighboring regions of the target region;
   a low-linear-density dot region detecting unit detecting a low-linear-density dot region based on the relationship of the number of peak pixels between the target region and each neighboring region; and
   an image processing switching unit for switching processing in response to outputs from said detecting units.

6. The image processing apparatus of claim 5 wherein the image processing switching unit includes a first filter for image processing of a dot region and a second filter for image processing of a low-linear-density dot region, the second filter having smoothing coefficients larger than smoothing coefficients of the first filter.

7. The image processing apparatus of claim 5, wherein the determination unit responds to densities of a center group of adjacent pixels surrounding the center pixel and densities of a circumferential group of pairs of circumferential pixels at positions symmetrical with respect to the center pixel.

8. The image processing apparatus of claim 7, wherein the pixels of the circumferential group are chosen according to a ratio of copy expansion or reduction which is specified by a document scanning speed.

* * * * *